United States Patent
Kimura et al.

(10) Patent No.: US 11,451,273 B2
(45) Date of Patent: Sep. 20, 2022

(54) TRANSMISSION DEVICE, METHOD, AND RECORDING MEDIUM

(71) Applicant: Sony Corporation, Tokyo (JP)

(72) Inventors: Ryota Kimura, Tokyo (JP); Hiroki Matsuda, Tokyo (JP); Yukitoshi Sanada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/980,843

(22) PCT Filed: Mar. 7, 2019

(86) PCT No.: PCT/JP2019/009085
§ 371 (c)(1),
(2) Date: Sep. 15, 2020

(87) PCT Pub. No.: WO2019/181535
PCT Pub. Date: Sep. 26, 2019

(65) Prior Publication Data
US 2021/0021308 A1    Jan. 21, 2021

(30) Foreign Application Priority Data

Mar. 22, 2018 (JP) .............................. JP2018-054418
Jan. 10, 2019 (JP) .............................. JP2019-002854

(51) Int. Cl.
*H04L 27/00* (2006.01)
*H04B 7/0456* (2017.01)

(52) U.S. Cl.
CPC .................. *H04B 7/0456* (2013.01)

(58) Field of Classification Search
CPC .................. H04B 7/0456; H04L 27/00; H04L 25/03929; H04L 25/03343; H04L 1/0612; H04L 27/0008
USPC ........................................................ 375/299
See application file for complete search history.

(56) References Cited

U.S. PATENT DOCUMENTS

| 8,825,565 B2 * | 9/2014 | Marianetti, II | G06N 5/047 706/12 |
| 2001/0055296 A1 * | 12/2001 | Akiyama | H04L 27/2647 370/344 |
| 2015/0207551 A1 | 7/2015 | Kang et al. | |

(Continued)

FOREIGN PATENT DOCUMENTS

JP    2018-504026 A    2/2018

OTHER PUBLICATIONS

International Search Report and Written Opinion dated Apr. 16, 2019 for PCT/JP2019/009085 filed on Mar. 7, 2019, 7 pages including English Translation of the International Search Report.

*Primary Examiner* — Helene E Tayong
(74) *Attorney, Agent, or Firm* — Xsensus LLP

(57) ABSTRACT

A mechanism of modulation in a more appropriate spatial domain is to be provided.
A transmission device includes a signal processing unit that applies a precoding matrix on the basis of a first bit sequence to a complex signal point sequence converted from a second bit sequence, and the precoding matrix applied to the complex signal point sequence corresponds to the first bit sequence in a predetermined combination of a first bit sequence candidate and each element of a set of precoding matrices.

21 Claims, 38 Drawing Sheets

(56) References Cited

U.S. PATENT DOCUMENTS

2016/0094318 A1* 3/2016 Shattil ................ H04L 27/01
375/267
2017/0338869 A1* 11/2017 Wu ................ H04L 25/03942

* cited by examiner

FIG.15
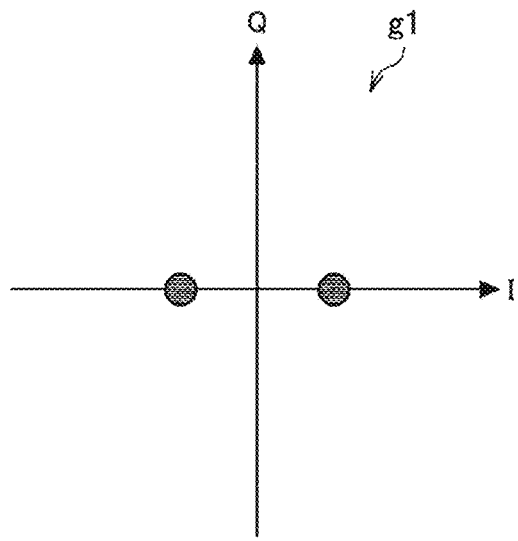
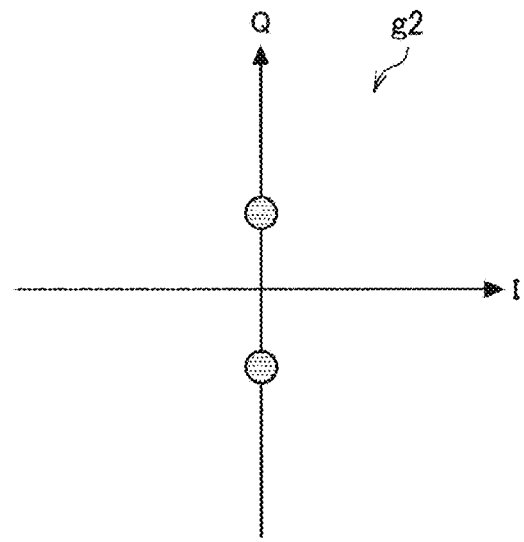
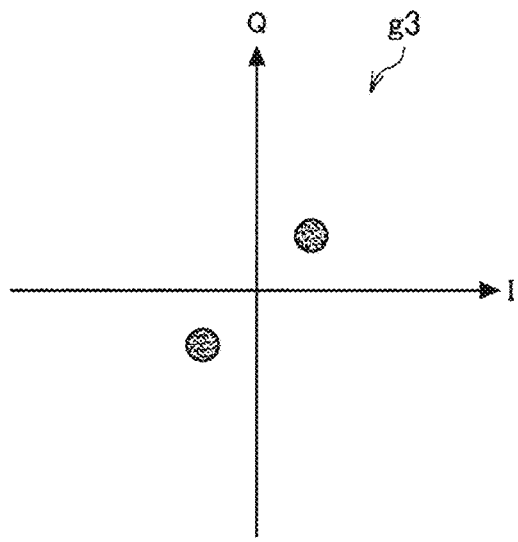
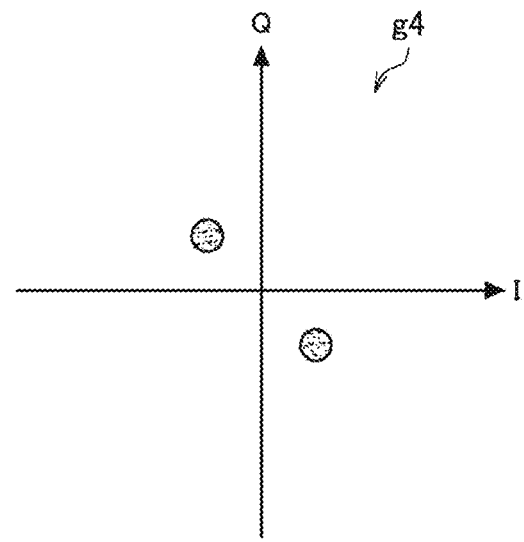

FIG.16
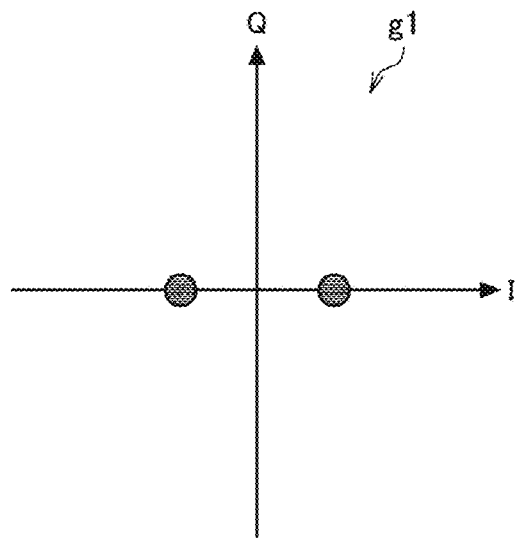
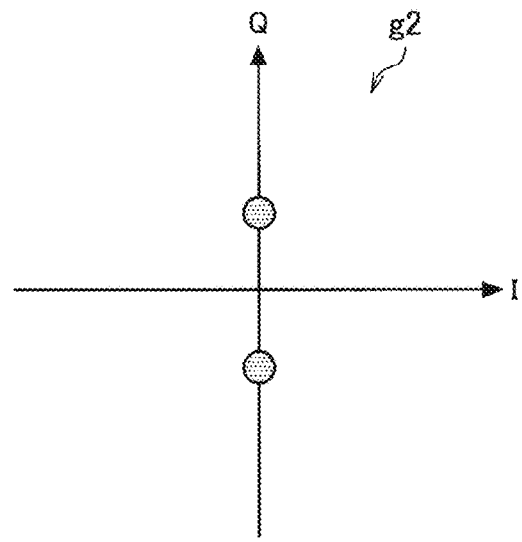
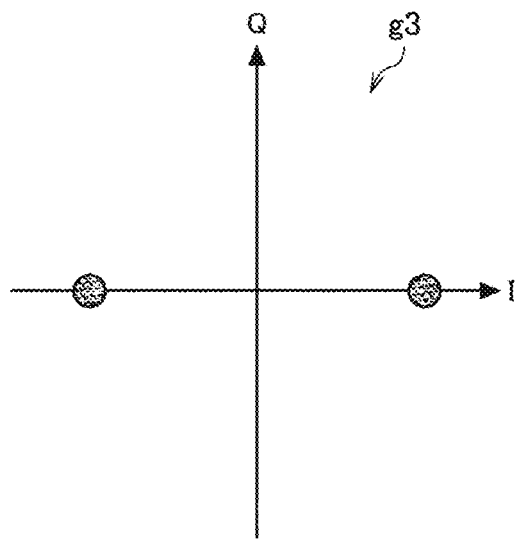
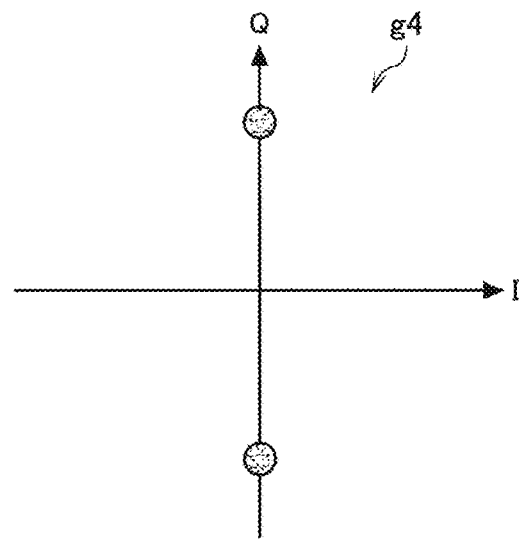

FIG.17
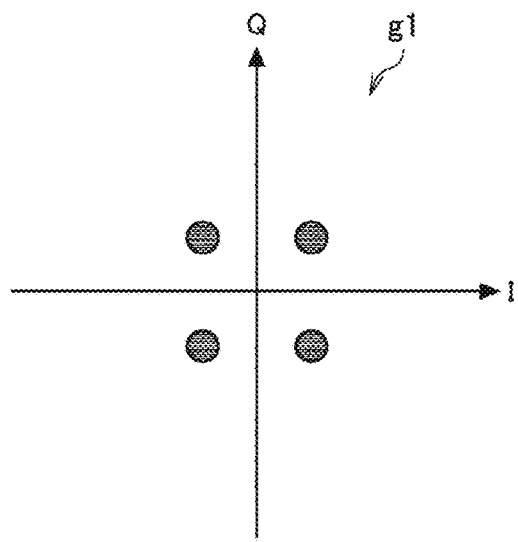
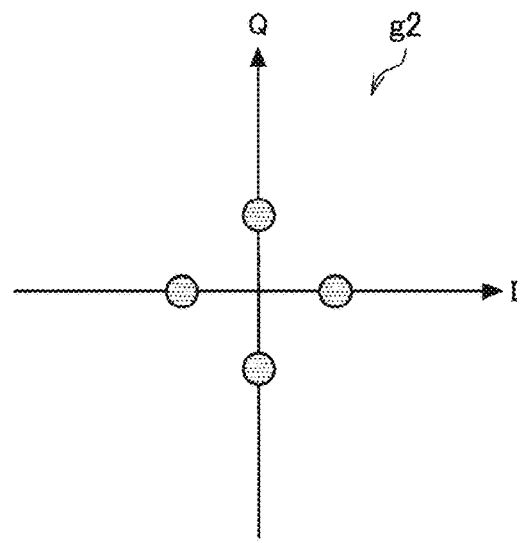
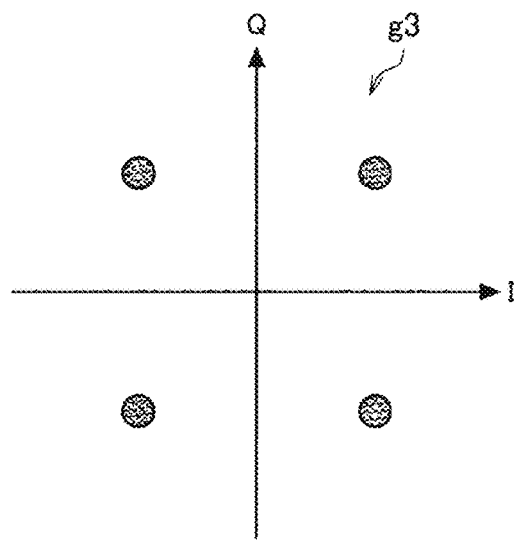
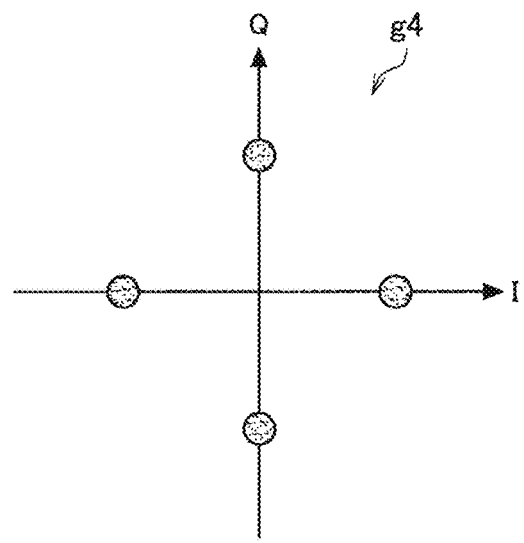

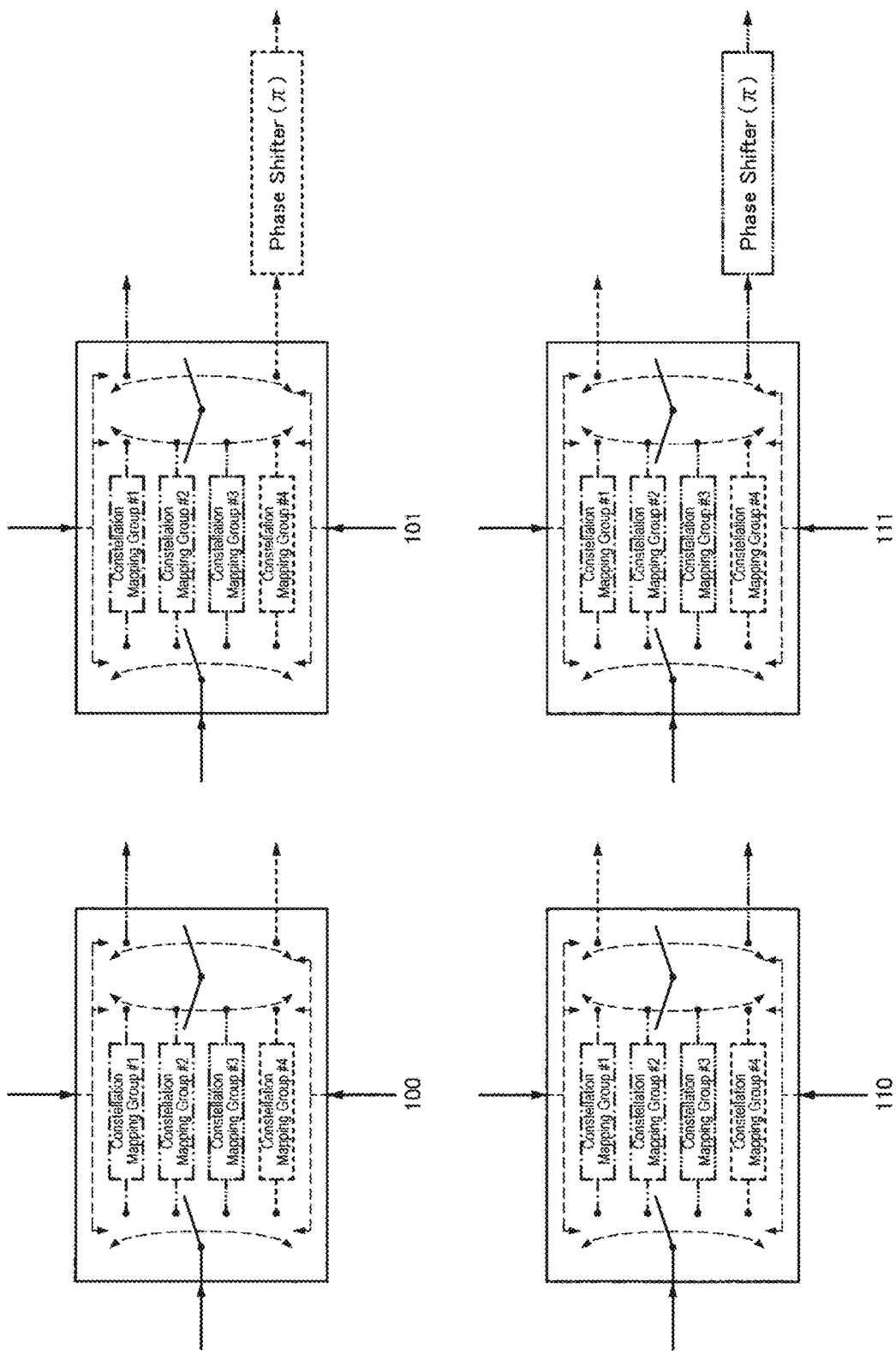

TRANSMISSION DEVICE, METHOD, AND RECORDING MEDIUM

CROSS-REFERENCE TO RELATED APPLICATIONS

The present application is based on PCT filing PCT/JP2019/009085, filed Mar. 7, 2019, which claims priority to JP 2018-054418, filed Mar. 22, 2018, and JP 2019-002854, filed Jan. 10, 2019, the entire contents of each are incorporated herein by reference.

FIELD

The present disclosure relates to a transmission device, method, and recording medium.

BACKGROUND

The current wireless communication environment is facing the problem of a sharp increase in data traffic. Consequently, various technologies for improving resource efficiency have been proposed. For example, Patent Literature 1 below discloses a technology that imposes information on which antenna to use from among a plurality of transmission antennas as a modulation technology.

CITATION LIST

Patent Literature

Patent Literature 1: U.S. Patent Application Publication No. 2015/0207551

SUMMARY

Technical Problem

One issue with the technology proposed in Patent Literature 1 above is the large burden on the analog/RF circuit because of an increase in the peak-to-average power ratio (PAPR) in association with antenna switching.

Accordingly, the present disclosure proposes a mechanism of modulation in a more appropriate spatial domain.

Solution to Problem

According to the present disclosure, a transmission device is provided that includes: a signal processing unit that applies a precoding matrix on the basis of a first bit sequence to a complex signal point sequence converted from a second bit sequence, wherein the precoding matrix applied to the complex signal point sequence corresponds to the first bit sequence in a predetermined combination of a first bit sequence candidate and each element of a set of precoding matrices.

Moreover, according to the present disclosure, a transmission device is provided that includes: a signal processing unit that performs a spatial layer mapping that maps a complex signal point sequence converted from a second bit sequence to at least one of a plurality of spatial layers on the basis of a first bit sequence, wherein a mapping pattern with respect to spatial layers corresponds to the first bit sequence in a plurality of predetermined combinations of a first bit sequence candidate and the mapping pattern.

Moreover, according to the present disclosure, a method, executed by a processor, is provided that includes: applying a precoding matrix on the basis of a first bit sequence to a complex signal point sequence converted from a second bit sequence, wherein the precoding matrix applied to the complex signal point sequence corresponds to the first bit sequence in a predetermined combination of a first bit sequence candidate and each element of a set of precoding matrices.

Moreover, according to the present disclosure, a method, executed by a processor, is provided that includes: performing a spatial layer mapping that maps a complex signal point sequence converted from a second bit sequence to at least one of a plurality of spatial layers on the basis of a first bit sequence, wherein a mapping pattern with respect to spatial layers corresponds to the first bit sequence in a plurality of predetermined combinations of a first bit sequence candidate and the mapping pattern.

Moreover, according to the present disclosure, a recording medium is provided that stores a program for causing a computer to function as: a signal processing unit that applies a precoding matrix on the basis of a first bit sequence to a complex signal point sequence converted from a second bit sequence, wherein the precoding matrix applied to the complex signal point sequence corresponds to the first bit sequence in a predetermined combination of a first bit sequence candidate and each element of a set of precoding matrices.

Moreover, according to the present disclosure, a recording medium is provided that stores a program for causing a computer to function as: a signal processing unit that performs a spatial layer mapping that maps a complex signal point sequence converted from a second bit sequence to at least one of a plurality of spatial layers on the basis of a first bit sequence, wherein a mapping pattern with respect to spatial layers corresponds to the first bit sequence in a plurality of predetermined combinations of a first bit sequence candidate and the mapping pattern.

Advantageous Effects of Invention

According to the present disclosure as described above, a mechanism of modulation in a more appropriate spatial domain is provided. Note that the above effects are not necessarily limited, and it is possible to obtain any of effects described in this specification or other effects that can be detected from this specification together with or instead of the above effects.

BRIEF DESCRIPTION OF DRAWINGS

FIG. 15 is a diagram illustrating an example of a plurality of complex signal point sets used in the second spatial modulation method.

FIG. 16 is a diagram illustrating an example of the characterization of a plurality of complex signal point sets used in the second spatial modulation method.

FIG. 17 is a diagram illustrating an example of the characterization of a plurality of complex signal point sets used in the second spatial modulation method.

FIG. 38B is a diagram illustrating an example of combinations of first bit sequence candidates and spatial mapping patterns according to the second modification.

DESCRIPTION OF EMBODIMENTS

Figure 1:
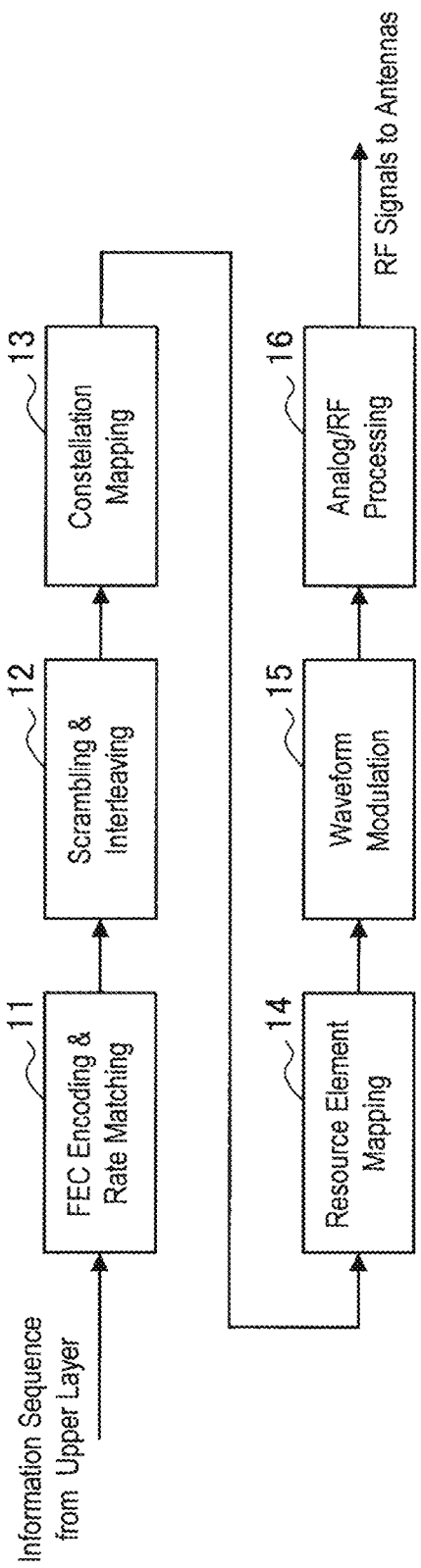
FIG. 1 is a block diagram schematically illustrating an example of signal processing by a transmission device according to an embodiment of the present disclosure.

Hereinafter, preferred embodiments of the present disclosure will be described in detail with reference to the accompanying drawings. In this specification and the drawings, constituent elements having substantially the same functional configuration are denoted by the same reference numerals, and redundant description is omitted.

Note that the descriptions will be made in the following order.

1. Introduction
  1.1. Overview of transmission process
  1.2. MIMO transmission of related art
  1.3. Technical problem
  1.4. Overview of proposed technology
2. Exemplary configuration
  2.1. Exemplary system configuration
  2.2. Exemplary configuration of transmission device
  2.3. Exemplary configuration of reception device 3. Technical features
3.1. Modulation method using precoding matrix
3.1.1. Details about modulation method using precoding matrix
3.1.2. Set of precoding matrices
3.2. New spatial modulation method
3.2.1. First spatial modulation method
3.2.2. Second spatial modulation method
3.3. Reception process
3.4. Modifications
3.4.1. First modification
3.4.2. Second modification
4. Application examples
5. Conclusion

1. INTRODUCTION 1.1. Overview of Transmission Process

FIG. 1 is a block diagram schematically illustrating an example of signal processing by a transmission device according to an embodiment of the present disclosure. As illustrated in FIG. 1, the signal processing by the transmission device according to the embodiment includes a forward error correction (FEC) encoding and rate matching block 11, a scrambling and interleaving block 12, a constellation mapping block 13, a resource element mapping block 14, a waveform modulation block 15, and an analog/RF processing block 16. Referring to FIG. 1, an input information sequence (for example, a bit sequence) from a higher layer is processed, and a radio frequency (RF) signal is output.

The FEC encoding and rate matching block 11 applies FEC encoding (the application of codes such as convolutional codes, block codes, turbo codes, LDPC codes, and/or polar codes) and rate matching (such as bit repetition and/or bit puncturing) to the input information sequence. The scrambling and interleaving block 12 applies scrambling and interleaving to the input information sequence output from the FEC encoding and rate matching block 11. The constellation mapping block 13 converts the input information sequence output from the scrambling and interleaving block 12 into a complex signal point sequence on the basis of a predetermined constellation (complex signal point set). In the mapping from a bit sequence to complex signal points (which may also be referred to as complex symbols or complex signal symbols), a variety of constellations such as $2^m$ frequency shift keying (FSK), $2^m$ amplitude shift keying (ASK), $2^m$ phase shift keying (PSK), and $2^m$ quadrature amplitude modulation (QAM) may be used. The resource element mapping block 14 maps each of the complex signal points included in the complex signal point sequence output from the constellation mapping block 13 to a resource element. The waveform modulation block 15 performs waveform modulation on each of the complex signal points placed in resource elements by the resource element mapping block 14. The analog/RF processing block 16 performs analog processing and RF processing.

Here, a resource element refers to a single unit of a resource (that is, a unit resource), the resource being specified by at least one of a frequency resource (such as a subcarrier, a subchannel, or a resource block), a temporal resource (such as a symbol, a slot, or a frame), a spatial resource (such as an antenna, an antenna port, a spatial layer, or a spatial stream), or a code pattern (such as a spread code pattern, an interleave pattern, or a scramble pattern).

1.2. MIMO Transmission of Related Art

Typical MIMO Transmission of Related Art

Figure 2:
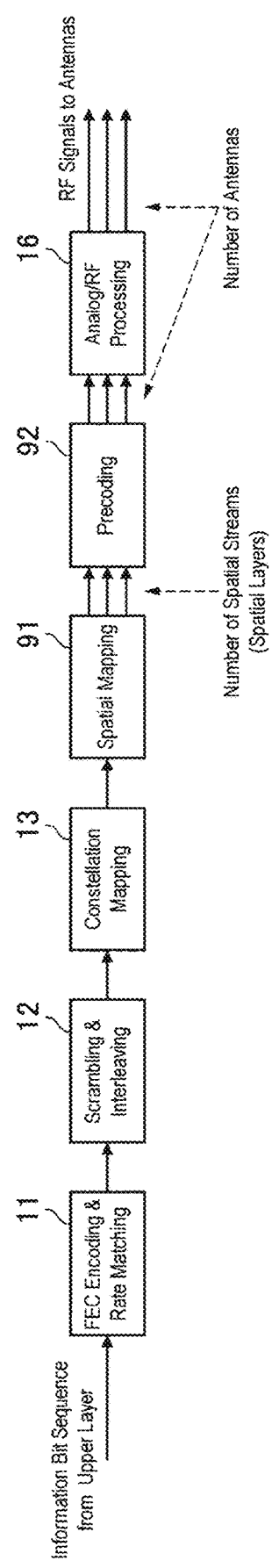
FIG. 2 is a block diagram schematically illustrating an example of signal processing in typical MIMO transmission of the related art.

FIG. 2 is a block diagram schematically illustrating an example of signal processing in typical MIMO transmission of the related art. As illustrated in FIG. 2, signal processing in typical MIMO transmission of the related art includes an FEC encoding and rate matching block 11, a scrambling and interleaving block 12, a constellation mapping block 13, a spatial mapping block 91, a precoding block 92, and an analog/RF processing block 16. Referring to FIG. 2, an input information sequence (for example, a bit sequence) from a higher layer is processed, and a number of RF signals equal to the number of antennas (or the number of antenna ports) is output.

The spatial mapping block 91 performs serial-to-parallel conversion of each of the complex signal points included in the complex signal point sequence output from the constellation mapping block 13 into one or more spatial streams or spatial layers (hereinafter collectively referred to as spatial layers). The precoding block 92 performs precoding defined by a complex number element on the complex signal points of the spatial stream(s) output from the spatial mapping block 91. The precoded complex signal points are processed by the analog/RF processing block 16 and transmitted from the antenna(s). The other processing blocks are as described with reference to FIG. 1.

Spatial Modulation Method of Related Art

As a modification of MIMO, a modulation method that imposes information on which antenna to use from among a plurality of transmission antennas has been proposed in Patent Literature 1 above. Such a modulation method that imposes information on modulation in the spatial domain is also referred to as spatial modulation method.

Figure 3:
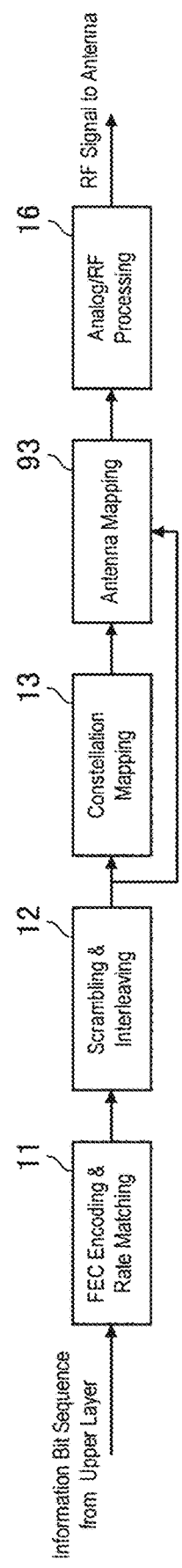
FIG. 3 is a block diagram schematically illustrating an example of signal processing in typical spatial modulation method of the related art.

FIG. 3 is a block diagram schematically illustrating an example of signal processing in typical spatial modulation method of the related art. As illustrated in FIG. 3, signal processing in typical spatial modulation of the related art includes an FEC encoding and rate matching block 11, a scrambling and interleaving block 12, a constellation mapping block 13, an antenna mapping block 93, and an analog/RF processing block 16. Referring to FIG. 3, an input information sequence (for example, a bit sequence) from a higher layer is processed, and RF signals (or the number of antenna ports) is output.

The antenna mapping block 93 selects an antenna to use from among a plurality of transmission antennas. In the spatial modulation method of the related art, information is imposed on which antenna has been selected by the antenna mapping block 93 as the antenna to use. For this reason, the antenna used to transmit signals may be switched frequently.

1.3. Technical Problem

In MIMO transmission of the related art, the number of spatial streams is increased to raise the transmission data rate. On the other hand, in MIMO transmission of the related art, the number of transmission streams is basically constrained by the number of reception antennas on the reception device side. Specifically, a condition that the number of transmission streams is less than or equal to the number of reception antennas is imposed. For this reason, when the miniaturization of communication devices is considered, there is a physical limit on the improvement in MIMO performance and data rate.

Also, in the case of the spatial modulation method of the related art, instead of not using all of the transmission antennas, the antenna used to transmit a signal is switched in units of the modulation symbol time. This causes the switching on/off of signals in the analog/RF circuit, and is considered to be extremely problematic in view of the peak-to-average power ratio (PAPR).

1.4. Overview of Proposed Technology

In the proposed technology, information can be imposed on modulation in the spatial domain more appropriately compared to the spatial modulation method of the related art and the typical MIMO transmission of the related art described above. The proposed technology is categorized into a modulation method using a precoding matrix and a new spatial modulation method.

In the modulation method using a precoding matrix, information is imposed on which precoding matrix from among a plurality of precoding matrices to apply to the complex signal point sequence. In MIMO of the related art, information is not imposed on a precoding matrix.

Consequently, modulation using a precoding matrix makes it possible to attain an improvement in MIMO resource efficiency (that is, frequency utilization efficiency) and better transmission and reception characteristics.

In the new spatial modulation method, information is imposed on a mapping pattern of a complex signal point sequence with respect to spatial layers when mapping the complex signal point sequence to the spatial layers. With this arrangement, it is possible to attain an improvement in MIMO resource efficiency and better transmission and reception characteristics, similarly to the modulation method using a precoding matrix.

2. EXEMPLARY CONFIGURATION

2.1. Exemplary System Configuration

Figure 4:
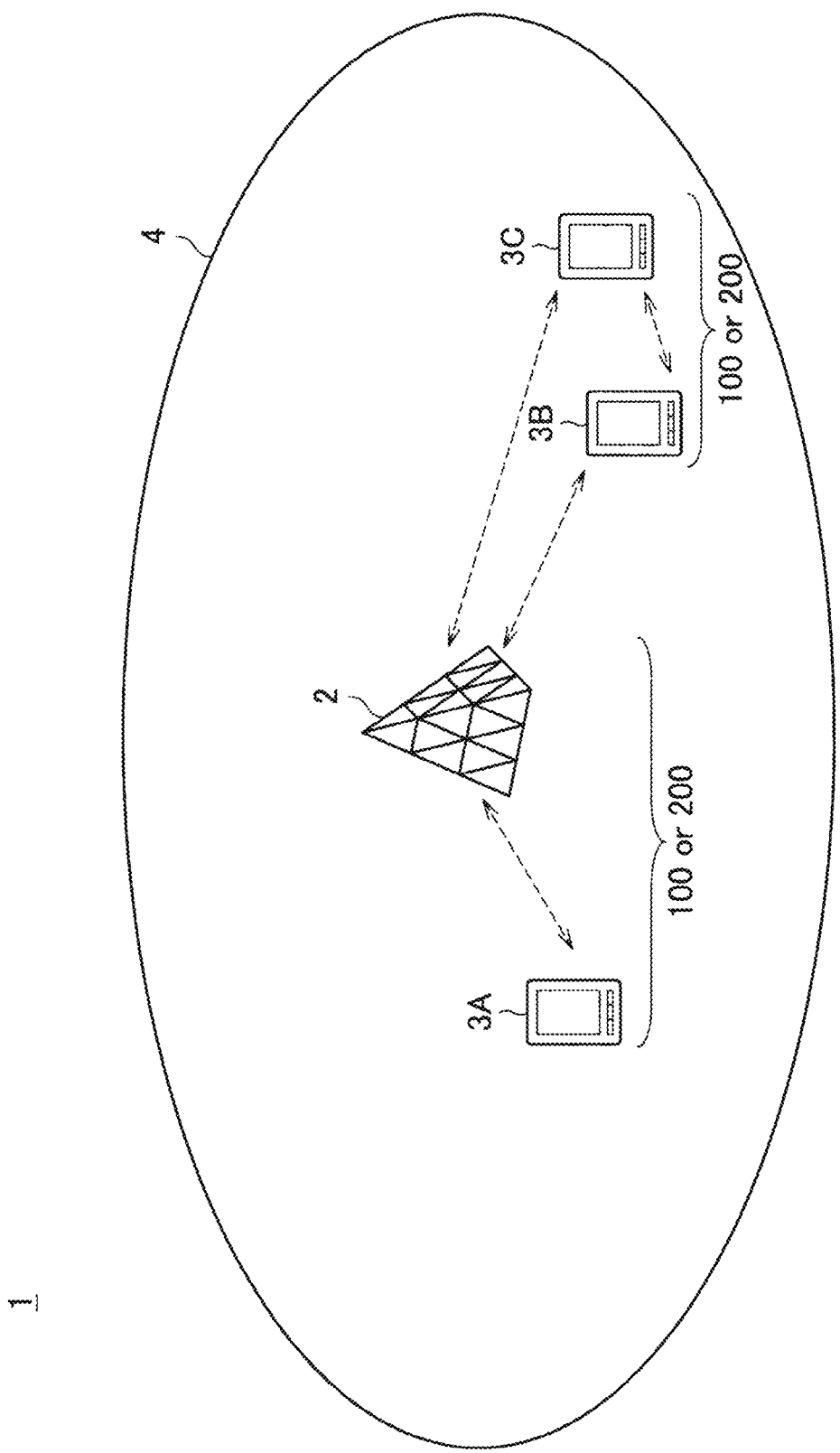
FIG. 4 is a diagram schematically illustrating an example of an overall configuration of a system according to the embodiment.

FIG. 4 is a diagram schematically illustrating an example of an overall configuration of a system 1 according to the embodiment. As illustrated in FIG. 4, the system 1 includes a base station 2 and terminal devices 3 (3A, 3B, and 3C).

The base station 2 operates a cell 4, and provides wireless service to one or more terminal devices positioned inside the cell 4. For example, the base station 2 provides wireless service to the terminal devices 3A to 3C. The cell 4 may be operated in accordance with any wireless communication system, such as LTE or New Radio (NR) for example. The base station 2 is connected to a core network not illustrated. The core network is further connected to a packet data network (PDN).

The terminal devices 3 communicate wirelessly on the basis of control by the base station 2. For example, the terminal device 3A transmits an uplink signal to the base station 2, and receives a downlink signal from the base station 2. Also, the terminal devices 3B and 3C use usable radio resources set by the base station 2 to transmit and receive sidelink signals. The terminal devices 3 may also be what is referred to as user equipment (UE). The terminal devices 3 may also be referred to as users.

In the present embodiment, the base station 2 and the terminal devices 3 may function as a transmission device 100 or a reception device 200. For example, the terminal device 3A functions as the transmission device 100 in relation to the transmission of an uplink signal, and functions as the reception device 200 in relation to the reception of a downlink signal. On the other hand, the base station 2 functions as the transmission device 100 in relation to the transmission of a downlink signal, and functions as the reception device 200 in relation to the reception of an uplink signal. Also, the terminal devices 3B and 3C function as the transmission device 100 in relation to the transmission of a sidelink signal, and function as the reception device 200 in relation to the reception of a sidelink signal.

2.2. Exemplary Configuration of Transmission Device

Figure 5:
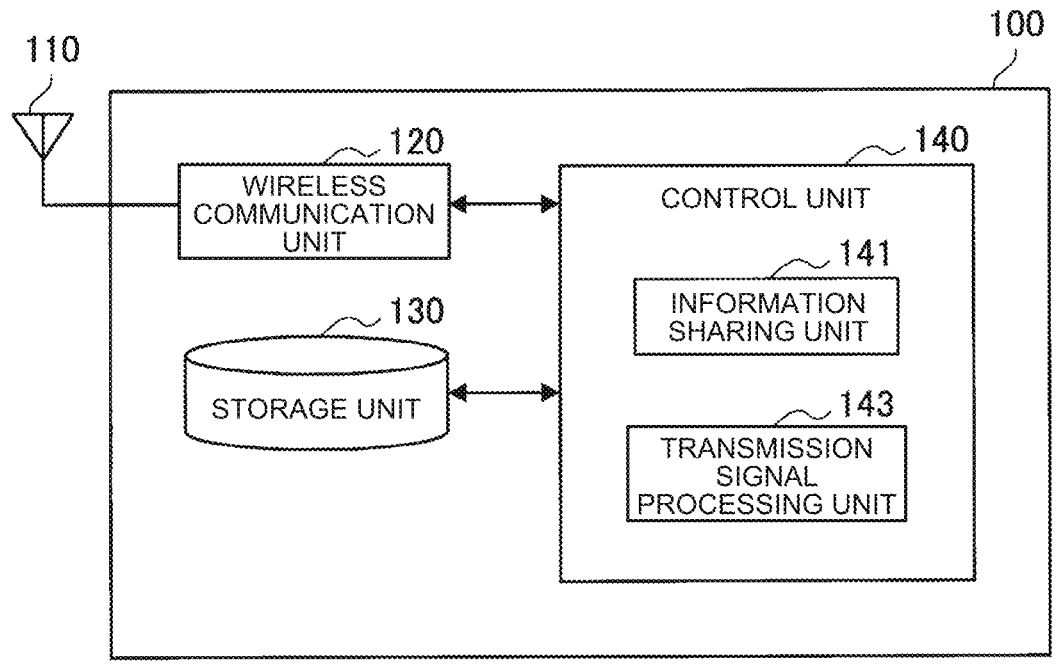
FIG. 5 is a block diagram illustrating an example of a configuration of the transmission device according to the embodiment.

FIG. 5 is a block diagram illustrating an example of a configuration of the transmission device 100 according to the embodiment. Referring to FIG. 5, the transmission device 100 is provided with an antenna unit 110, a wireless communication unit 120, a storage unit 130, and a control unit 140.

(1) Antenna Unit 110

The antenna unit 110 emits a signal output by the wireless communication unit 120 into space as a radio wave. Additionally, the antenna unit 110 converts a radio wave from space into a signal, and outputs the signal to the wireless communication unit 120.

(2) Wireless Communication Unit 120

The wireless communication unit 120 transmits signals. For example, the wireless communication unit 120 transmits an uplink signal, a downlink signal, or a sidelink signal to the reception device 200.

(3) Storage Unit 130

The storage unit 130 temporarily or permanently stores programs and various data for the operation of the transmission device 100.

(4) Control Unit 140

The control unit 140 provides various functions of the transmission device 100. The control unit 140 includes an information sharing unit 141 and a transmission signal processing unit 143. The information sharing unit 141 has a function of sharing parameters used in transmission processing by the transmission device 100 with the reception device 200. The transmission signal processing unit 143 has a function of performing signal processing for a signal to transmit to the reception device 200. The content of the signal processing is the content summarized with reference to FIG. 1 for example. The detailed content of the signal processing will be described later. Note that the control unit 140 may additionally include other constituent elements besides the above constituent elements. In other words, the control unit 140 may also perform operations other than the operations of the above constituent elements.

2.3. Exemplary Configuration of Reception Device

Figure 6:
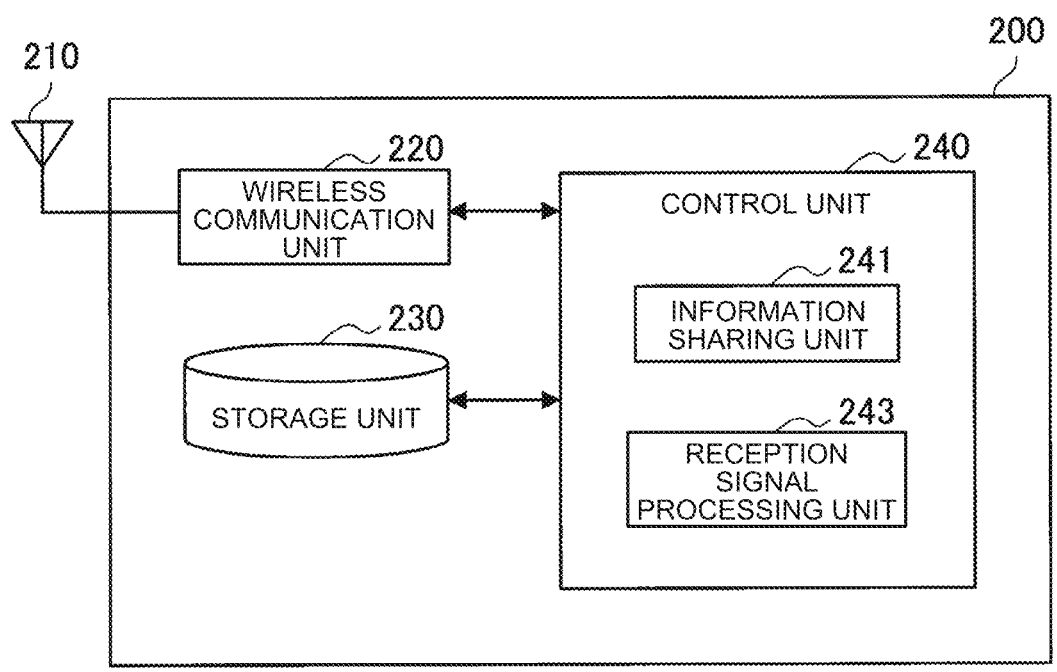
FIG. 6 is a block diagram illustrating an example of a configuration of a reception device according to the embodiment.

FIG. 6 is a block diagram illustrating an example of a configuration of a reception device 200 according to the embodiment. Referring to FIG. 6, the reception device 200 is provided with an antenna unit 210, a wireless communication unit 220, a storage unit 230, and a control unit 240.

(1) Antenna Unit 210

The antenna unit 210 radiates a signal output by the wireless communication unit 220 into space as a radio wave. In addition, the antenna unit 210 converts a radio wave in space into a signal and outputs the signal to the wireless communication unit 220.

(2) Wireless Communication Unit 220

The wireless communication unit 220 receives signals. For example, the wireless communication unit 220 receives an uplink signal, a downlink signal, or a sidelink signal to the transmission device 100.

(3) Storage Unit 230

The storage unit 230 temporarily or permanently stores programs and various data for the operation of the reception device 200.

(4) Control Unit 240

The control unit 240 provides various functions of the reception device 200. The control unit 240 includes an information sharing unit 241 and a reception signal processing unit 243. The information sharing unit 241 has a function of sharing parameters used in transmission processing by the transmission device 100 with the transmission device 100. The reception signal processing unit 243 has a function of performing signal processing for a signal received from the transmission device 100. The content of the signal processing will be described later. Note that the control unit 240 may additionally include other constituent elements besides the above constituent elements. In other words, the control unit 240 may also perform operations other than the operations of the above constituent elements.

3. TECHNICAL FEATURES

In the present embodiment, the modulation using a precoding matrix and/or the new spatial modulation are performed. In either modulation method, information can be imposed on the modulation in the spatial domain. The transmission device 100 generates a complex signal point sequence on the basis of a first bit sequence and a second bit sequence, and performs the modulation using a precoding matrix and/or the new spatial modulation. The first bit sequence is information imposed by the modulation using a precoding matrix and/or the new spatial modulation. The second bit sequence is information imposed on the complex signal points.

Hereinafter, FIG. 7 will be referenced to describe an example of signal processing according to the present embodiment.

Figure 7:
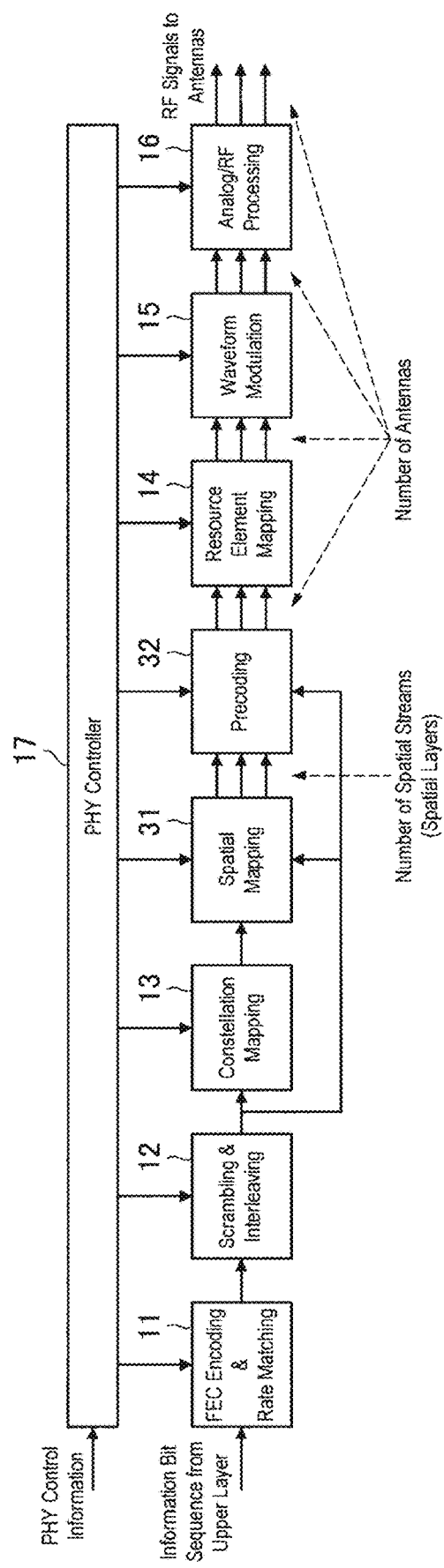
FIG. 7 is a block diagram illustrating a detailed example of signal processing by the transmission device according to the embodiment.

FIG. 7 is a block diagram illustrating a detailed example of signal processing by the transmission device 100 according to the embodiment. As illustrated in FIG. 7, the signal processing by the transmission device 100 according to the present embodiment includes a spatial mapping block 31 and a precoding block 32 between the constellation mapping block 13 and the resource element mapping block 14 of the signal processing described with reference to FIG. 1.

Furthermore, the signal processing by the transmission device 100 includes a physical controller 17.

The physical controller 17 controls the processing by each processing block on the basis of input physical control information.

The function of the constellation mapping block 13 is as described earlier. That is, the constellation mapping block 13 converts the bit sequence output from the scrambling and interleaving block 12 into a complex signal point sequence on the basis of a predetermined constellation (complex signal point set). Except for the second spatial modulation method described later, the bit sequence input into the constellation mapping block 13 typically corresponds to the second bit sequence. In the constellation mapping block 13, the second bit sequence is converted into a complex signal point sequence.

The spatial mapping block 31 has a function similar to the spatial mapping block 91 described earlier. In the case where the new spatial modulation is adopted, in the spatial mapping block 31, spatial layer mapping according to the first bit sequence is performed.

The precoding block 32 has a function similar to the precoding block 92 described earlier. In the case were the modulation method using a precoding matrix is adopted, in the precoding block 32, a precoding matrix according to the first bit sequence is applied.

Hereinafter, each modulation method will be described in detail.

3.1. Modulation Method Using Precoding Matrix

3.1.1. Details about Modulation Method Using Precoding Matrix

The modulation method using a precoding matrix is a modulation method that imposes information on the precoding matrix to apply to the complex signal point sequence.

The transmission device 100 generates a complex signal point sequence and applies a precoding matrix to the generated complex signal point sequence on the basis of the first bit sequence and the second bit sequence. More specifically, the transmission device 100 applies a precoding matrix on the basis of the first bit sequence to the complex signal point sequence converted from the second bit sequence. The second bit sequence is information to impose on the complex signal points. The first bit sequence is information to impose on the precoding matrix.

$N_{SL,max}$ denotes the maximum number of spatial layers usable for transmission, $N_{SL}$ denotes the number of spatial layers actually used for transmission, and $N_{TX}$ denotes the number of antennas (or antenna ports) used for transmission. The process of precoding for each of predetermined unit symbol times can be thought of as a process that multiplies a complex or real vector input of size $N_{SL} \times 1$ or $N_{SL,max} \times 1$ by a precoding matrix (a complex matrix or a real matrix) of size $N_{TX} \times N_{SL}$ or $N_{TX} \times N_{SL,max}$, and outputs a complex or real vector of size $N_{TX} \times 1$. In other words, provided that s is the input vector an P is the precoding matrix, the output vector is expressed by the following formula.

$$x = Ps \qquad (1)$$

The transmission device 100 according to the present embodiment applies a precoding matrix corresponding to the first bit sequence to the complex signal point sequence. More specifically, the precoding matrix applied to the complex signal sequence corresponds to the first bit sequence in a predetermined combination of a first bit sequence candidate and each element of a set of precoding matrices (that is, each precoding matrix). With this arrangement, information (that is, the first bit sequence) is imposed on the point of which precoding matrix is to be applied from among the plurality of precoding matrices included in the set of precoding matrices.

Provided that $N_P$ is the number of precoding matrices, the number of bits (the number of information bits or the number of coded bits) $N_{B,P}$ in a bit sequence that can be imposed on a precoding matrix is expressed by the following formula.

$$N_{B,P} = \text{floor}\{\log_2(N_P)\} \qquad (2)$$

For example, in the case where $N_P=4$, the number of bits that can be imposed on a precoding matrix is 2 bits. In the case where $N_P=8$, the number of bits that can be imposed on a precoding matrix is 3 bits. In the case where $N_P=16$, the number of bits that can be imposed on a precoding matrix is 4 bits. To eliminate waste in the number of matrices, it is desirable to set $N_P=2^k$. Here, k is any positive integer. Note that the number of bits in a bit sequence that can be imposed on a precoding matrix corresponds to the number of bits in the first bit sequence.

It is desirable for the combinations of the first bit sequence candidate and each element of the set of precoding matrices to be stored in the transmission device 100 and the reception device 200 as a lookup table, for example. Examples of the lookup table are illustrated in Tables 1 and 2. In the tables, $P_i$ is the ith precoding matrix in a set of precoding matrices that includes $N_P$ precoding matrices. It is desirable for the lookup table to be defined for each size of the precoding matrix. In other words, it is desirable for the lookup table to be defined for each combination of $N_{TX}$ and $N_{SL}$ (or $N_{TX}$ and $N_{SL,max}$).

TABLE 1

Examples of lookup table
(In case where first bit sequence is 1-bit)

| First bit sequence candidates$^{b(i)}$ | Precoding matrix |
|---|---|
| 0 | $P_1$ |
| 1 | $P_2$ |

TABLE 2

Examples of lookup table
(In case where first bit sequence is 2-bit)

| First bit sequence candidates$^{b(i),b(i+1)}$ | | Precoding matrix |
|---|---|---|
| 0 | 0 | $P_1$ |
| 0 | 1 | $P_2$ |
| 1 | 0 | $P_3$ |
| 1 | 1 | $P_4$ |

3.1.2. Set of Precoding Matrices

Hereinafter, conditions that the set of precoding matrices used in the precoding according to the present embodiment should satisfy will be described in detail.

(1) Mutual Orthogonality

It is desirable for the precoding matrices included in the set of precoding matrices to be mutually orthogonal. Mutual orthogonality means when any two precoding matrices $P_k$ and $P_l$ (where $l \neq k$) are chosen from the set of precoding matrices, there is at most one non-zero element in each row and each column of $P_k P_l^T$. Note that $P_l^T$ is the transpose matrix of $P_l$.

Furthermore, it is desirable for the elements at a specific position in a plurality of precoding matrices included in the set of precoding matrices to be equal to each other. More specifically, it is desirable for at least one element in a specific position (for example, the kth row and the lth column) to have the same common value among the precoding matrices included in the set of precoding matrices. With this arrangement, an effect of avoiding the output becoming the same in the case of applying different precoding matrices $P_a$ and $P_b$ (where $b \neq a$) to different inputs $s_m$ and $s_n$ (where $n \neq m$) is expected. In other words, an effect of keeping the relationship in the following formula from holding true is expected.

$$P_a s_m = P_b s_n \quad (3)$$

Hereinafter, specific examples of generating the precoding matrices will be described.

First Example of Generating Precoding Matrices

In the case where $N_{SL}=N_{TX}$ or $N_{SL,max}=N_{TX}$, the transmission device 100 may use matrices based on a Fourier transform matrix or an inverse Fourier transform matrix (hereinafter collectively referred to as the base matrix) of size $N_{TX} \times N_{TX}$ as the precoding matrices. $P(N_{TX})$ denotes the base matrix of size $N_{TX} \times N_{TX}$, and $W^{kl}$ denotes the element in the kth row and the lth column of the base matrix. Here, k and l are integers satisfying $0 \leq k, l < N_{TX}$.

In the case where a Fourier transform matrix is treated as the base, $W^{kl}$ is expressed by the following formula.

$$W = \exp\left(-\frac{j2\pi}{N_{TX}}\right) \quad (4)$$

In the case where an inverse Fourier transform matrix is treated as the base, $W^{kl}$ is expressed by the following formula.

$$W = \exp\left(\frac{j2\pi}{N_{TX}}\right) \quad (5)$$

The precoding matrices may also be matrices obtained by substituting a specific row or a specific column of the base matrix. For example, in the case where the precoding matrices are generated by substituting the columns of a Fourier transform matrix, the number $N_P$ of precoding matrices that can be generated is expressed by the following formula.

$$N_P \leq N_{TX}! = \prod_{k=1}^{N_{TX}} k \quad (6)$$

In the case where the precoding matrices are generated by substituting the rows of a Fourier transform matrix, the number $N_P$ of precoding matrices that can be generated is likewise expressed by the following formula.

$$N_P \leq N_{TX}! = \prod_{k=1}^{N_{TX}} k \quad (7)$$

Second Example of Generating Precoding Matrices

In the case where $N_{SL}=N_{TX}$ or $N_{SL,max}=N_{TX}$, the transmission device 100 may also use matrices based on a Hadamard matrix of size $N_{TX} \times N_{TX}$ as the precoding matrices. In this case, it is desirable for $N_{TX}$ to be the value of a power of 2 (that is, $N_{TX}=2^k$). $P(N_{TX})$ denotes a Hadamard matrix of size $N_{TX} \times N_{TX}$. The Hadamard matrix may be generated by an operation like the following formula for example.

$$P(1) = [1] \quad (8)$$
$$P(2) = \begin{bmatrix} 1 & 1 \\ 1 & -1 \end{bmatrix}$$

-continued $$P(N_{TX} = 2^k) = \begin{bmatrix} P(2^{(k-1)}) & P(2^{(k-1)}) \\ P(2^{(k-1)}) & -P(2^{(k-1)}) \end{bmatrix}$$

In addition, normalization may also be considered, and the Hadamard matrix may also be generated by an operation like the following formula.

$$P(N_{TX} = 2^k) = \begin{cases} [1] & , k = 0 \\ \frac{1}{\sqrt{2}} \begin{bmatrix} P(2^{(k-1)}) & P(2^{(k-1)}) \\ P(2^{(k-1)}) & -P(2^{(k-1)}) \end{bmatrix} & , k > 0 \end{cases} \quad (9)$$

The precoding matrices may also be matrices obtained by substituting a specific row or a specific column of the Hadamard matrix. For example, in the case where the precoding matrices are generated by substituting the columns of the Hadamard matrix, the number $N_p$ of precoding matrices that can be generated is expressed by the following formula.

$$N_P \leq_{N_{TX}} P_{N_{TX}} = N_{TX}! = \prod_{k=1}^{N_{TX}} k \quad (10)$$

In the case where the precoding matrices are generated by substituting the rows of the Hadamard matrix, the number $N_p$ of precoding matrices that can be generated is expressed by the following formula.

$$N_P \leq N_{TX}! = \prod_{k=1}^{N_{TX}} k \quad (11)$$

Third Example of Generating Precoding Matrices

In the case where $N_{SL}=1$ or $N_{SL,max}=1$, the transmission device 100 may use the respective rows or columns of a Fourier transform matrix, an inverse Fourier transform matrix, or a Hadamard matrix of size $N_{TX} \times N_{TX}$ as the precoding matrices. In this case, the number $N_P$ of precoding matrices (precoding vectors) that can be generated is expressed by the following formula.

$$N_P = N_{TX} \quad (12)$$

(2) Satisfying Other Predetermined Conditions

The precoding matrices included in the set of precoding matrices do not have to be mutually orthogonal. The conditions that the precoding matrices should satisfy in this case are described below.

First Condition

It is desirable for the elements at a specific position in a plurality of precoding matrices included in the set of precoding matrices to be equal to each other. More specifically, it is desirable for at least one element in a specific position (for example, the kth row and the lth column) to have the same common value among the precoding matrices included in the set of precoding matrices. With this arrangement, an effect of avoiding the output becoming the same in the case of applying different precoding matrices $P_a$ and $P_b$ (where $b \neq a$) to different inputs $s_m$ and $s_n$ (where $n \neq m$) is expected. In other words, an effect of keeping the relationship in the following formula from holding true is expected.

$$P_a s_m = P_b s_n \quad (13)$$

Note that it is desirable for this condition to be satisfied specifically in the case where an element of the precoding matrices corresponds to one of the PSK signal points, or the case where elements in the precoding matrices have the same amplitude as each other. This is because the problem of the precoding output becoming the same as described above occurs in the case where an element of the precoding matrices corresponds to one of the PSK signal points or the case where elements in the precoding matrices have the same amplitude as each other. For this reason, this condition does not have to be satisfied in the case where an element of the precoding matrices corresponds to one of the QAM signal points or the case where the precoding matrices contain elements with different amplitudes, for example.

Second Condition

It is desirable for the elements of a precoding matrix included in the set of precoding matrices to correspond to PSK or QAM. More specifically, in the case of using PSK as a base, it is desirable for the values that appear to be expressible as a change in the phase amount of a predetermined interval. Also, in the case of using QAM as a base, it is desirable for the values that appear to be expressible as a change in the phase amount of a predetermined interval and as a change in the amplitude of a predetermined interval. In other words, it is desirable for two different elements in a precoding matrix included in the set of precoding matrices to at least have a phase difference that is an integer multiple of a first value or an amplitude ratio that is an integer multiple or an integral submultiple of a second value. The first value and the second value are any values.

Satisfying this condition makes it possible to reduce the error rate when the reception device 200 detects which precoding matrix the transmission device 100 used.

Table 3 is an example of a set of precoding matrices satisfying the above limitations. Referring to Table 3, the first and second elements of the precoding matrices share common values. Also, each element is defined as a change in the phase amount of $\pi/4$ (that is, corresponds to QPSK). Note that a normalization term may be further applied (by multiplication or division) to each precoding matrix in Table 3.

TABLE 3

Example of lookup table using set of precoding matrices including non-orthogonal precoding matrices (In case where $N_{TX} = 4$, $N_{SL} = 1$, and first bit sequence is 3-bit)

| Bit sequence imposed on precoding matrix b(i), b(i + 1), b(i + 2) | | | Precoding matrix |
|---|---|---|---|
| 0 | 0 | 0 | $P_1 = \begin{bmatrix} 1 \\ 1 \\ 1 \\ 1 \end{bmatrix}$ |
| 0 | 0 | 1 | $P_2 = \begin{bmatrix} 1 \\ 1 \\ 1 \\ j \end{bmatrix}$ |
| 0 | 1 | 0 | $P_1 = \begin{bmatrix} 1 \\ 1 \\ 1 \\ -1 \end{bmatrix}$ |

TABLE 3-continued

Example of lookup table using set of precoding
matrices including non-orthogonal precoding matrices
(In case where $N_{TX} = 4$, $N_{SL} = 1$, and first bit sequence is 3-bit)

| Bit sequence imposed on precoding matrix b(i), b(i + 1), b(i + 2) | | | Precoding matrix |
|---|---|---|---|
| 0 | 1 | 1 | $P_4 = \begin{bmatrix} 1 \\ 1 \\ 1 \\ -j \end{bmatrix}$ |
| 1 | 0 | 0 | $P_5 = \begin{bmatrix} 1 \\ 1 \\ j \\ 1 \end{bmatrix}$ |
| 1 | 0 | 1 | $P_6 = \begin{bmatrix} 1 \\ 1 \\ j \\ j \end{bmatrix}$ |
| 1 | 1 | 0 | $P_7 = \begin{bmatrix} 1 \\ 1 \\ j \\ -1 \end{bmatrix}$ |
| 1 | 1 | 1 | $P_8 = \begin{bmatrix} 1 \\ 1 \\ j \\ -j \end{bmatrix}$ |

Third Condition

In the case where a plurality of sets of precoding matrices is defined, it is desirable for a set of precoding matrices with fewer elements (that is, fewer precoding matrices) to be a subset of a set of precoding matrices with more elements. A plurality of sets of precoding matrices with different numbers of elements may be defined for the number of transmission antennas and the number of spatial layers. For example, a set of first precoding matrices containing $N_{P,2}$ precoding matrices and a set of second precoding matrices containing $N_{P,2}$ precoding matrices (where $N_{P,2} > N_{P,2}$) may be defined. In this case, it is desirable for the second precoding matrices to include the first precoding matrices. In other words, it is desirable for the first precoding matrices to be a subset of the second precoding matrices.

Satisfying this condition makes it possible reduce the effective size of the lookup table, and makes it possible to reduce the amount of memory used in the transmission device 100 and the reception device 200.

Fourth Condition

It is desirable for the elements of the precoding matrices to be non-zero. If this condition is satisfied, the transmission signals are distributed among $N_{TX}$ usable antennas (or antenna ports). Consequently, this prevents a situation in which the signals are concentrated on only specific antennas while the other antennas are off, like the spatial modulation of the related art. With this arrangement, in the present embodiment, variations in the power level of each antenna can be moderated, thereby making it possible to achieve an improvement in the PAPR as a result. In other words, it is possible to raise the efficiency of the analog/RF circuit (for example, the amplifier) of the transmission device 100.

3.2. New Spatial Modulation Method

The new spatial modulation method is a modulation method that imposes information on a mapping pattern of a complex signal point sequence with respect to spatial layers (hereinafter also referred to as a spatial mapping pattern) when mapping the complex signal point sequence to the spatial layers.

First, as prerequisite knowledge, spatial mapping will be described for the case where modulation according to the new spatial modulation method is not performed, or in other words for the case where information is not imposed on a mapping pattern with respect to the spatial layers.

In the case where the modulation according to the new spatial modulation method is not performed, the transmission device 100 performs serial-to-parallel conversion of the complex signal point sequence to $N_{SL}$ spatial layers. For example, the transmission device 100 performs serial-to-parallel conversion by mapping the $(nN_{SL}+i-1)$th complex signal point (where n is an integer, and i is an integer such that $1 \leq i \leq N_{SL}$) of the complex signal point sequence to the ith spatial layer. The mechanism of serial-to-parallel conversion will be described with reference to FIG. 8.

Figure 8:
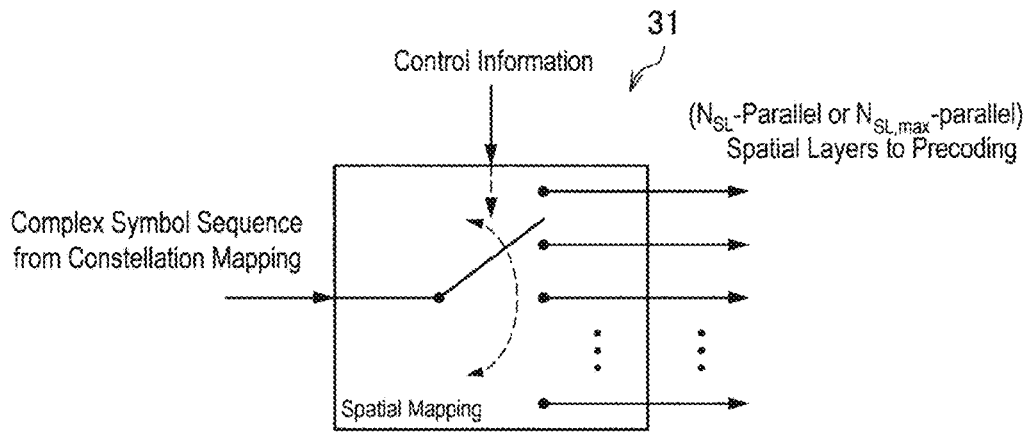
FIG. 8 is a diagram illustrating an example of signal processing in a case where modulation according to a new spatial modulation method is not performed.

FIG. 8 is a diagram illustrating an example of signal processing in a case where modulation according to a new spatial modulation method is not performed. As illustrated in FIG. 8, in the spatial mapping block 31, the complex signal point sequence output from the constellation mapping block 13 is mapped to one of $N_{SL}$ or $N_{SL,max}$ spatial layers, and output to the precoding block 32.

In this way, in the case where the new spatial modulation is not performed, serial-to-parallel conversion of the complex signal point sequence to a plurality of spatial layers is performed, but information is not imposed on the mapping pattern with respect to the spatial layers. On the other hand, with the new spatial modulation, information is imposed on the mapping pattern with respect to the spatial layers.

In the case where modulation according to the new spatial modulation method is performed, the transmission device 100 generates a complex signal point sequence and maps the generated complex signal point sequence to spatial layers on the basis of the first bit sequence and the second bit sequence. In detail, the transmission device 100 performs spatial layer mapping that maps a complex signal point sequence converted from the second bit sequence to at least one of a plurality of spatial layers on the basis of the first bit sequence. The second bit sequence is information to impose on the complex signal points. The first bit sequence is information to impose on the mapping pattern of the complex signal point sequence with respect to the spatial layers.

In the new spatial modulation method, the mapping pattern with respect to spatial layers corresponds to the first bit sequence in a plurality of predetermined combinations of a first bit sequence candidate and the mapping pattern. The new spatial modulation method is categorized into a first spatial modulation method and a second spatial modulation method having different methods of imposing information on the mapping pattern with respect to spatial layers. Hereinafter, each of these methods will be described in detail. Note that in the following, unless specifically noted otherwise, spatial modulation is taken to refer to modulation according to the new spatial modulation method according to the proposed technology.

3.2.1. First Spatial Modulation Method

In the first spatial modulation method, the mapping pattern with respect to spatial layers is a pattern indicating which spatial layers among the plurality of spatial layers the non-zero complex signal points are to be mapped to. In the first spatial modulation method, the non-zero complex signal points are mapped to one or more spatial layers among the plurality of spatial layers. Additionally, information (that is, the first bit sequence) is imposed on which spatial layers among the plurality of spatial layers the non-zero complex signal points are to be mapped to.

In the first spatial modulation method, $N_{SL} < N_{SL,max}$. Among the $N_{SL,max}$ spatial layers which may possibly be used, information is imposed on which $N_{SL}$ spatial layers are actually used. In this case, the number of combinations of how to use the spatial layers is expressed by the following formula.

$$\binom{N_{SL,max}}{N_{SL}} \quad (14)$$

The number of bits imposed on how to use the spatial layers is expressed by the following formula.

$$\text{floor}\left[\log_2\left\{\binom{N_{SL,max}}{N_{SL}}\right\}\right] \quad (15)$$

The first spatial modulation method may also be considered to be a modulation method in which information is imposed on the on/off states of the spatial layers.

(1) Specific Example of First Spatial Modulation method

First Specific Example

Hereinafter, a first specific example of the first spatial modulation method will be described with reference to FIG. 9.

Figure 9:
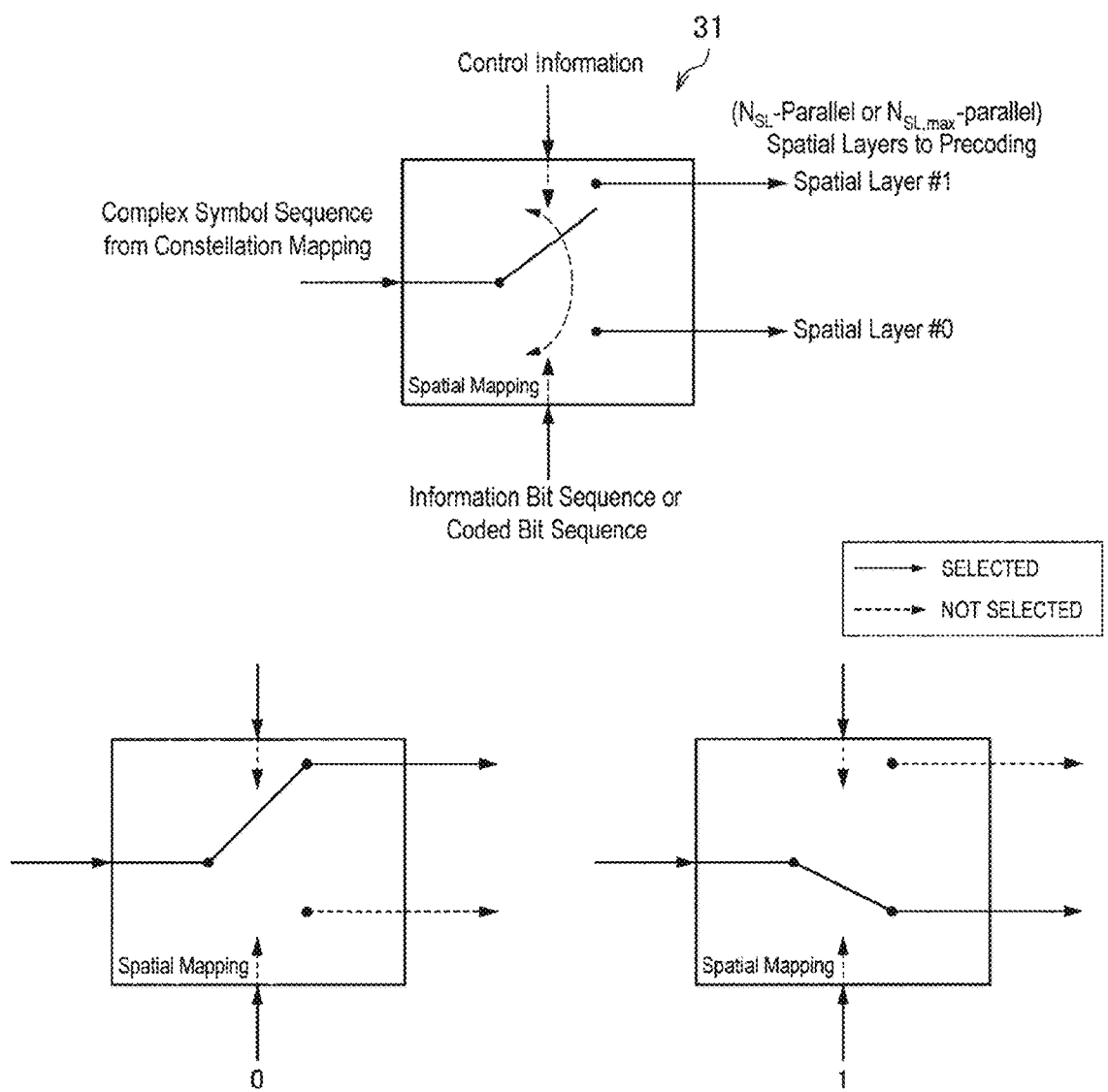
FIG. 9 is a diagram illustrating an example of combinations of first bit sequence candidates and spatial mapping patterns according to a first spatial modulation method.

FIG. 9 is a diagram illustrating an example of combinations of first bit sequence candidates and spatial mapping patterns according to a first spatial modulation method. In the example illustrated in FIG. 9, each complex signal point included in a complex signal point sequence is mapped to one of two spatial layers (that is, $N_{SL,max}=2$, $N_{SL}=1$). In this case, 1-bit information is imposed on the spatial mapping pattern. Specifically, "0" is expressed by mapping a complex signal point to the spatial layer #1. "1" is expressed by mapping a complex signal point to the spatial layer #2. In other words, if "0" is input as the first bit sequence, the complex signal point modulated from the second bit sequence is mapped to the spatial layer #1. If "1" is input as the first bit sequence, the complex signal point modulated from the second bit sequence is mapped to the spatial layer #2.

Here, 1 bit is input into the spatial mapping block 31 at each timing of a complex signal point, and a spatial mapping pattern is selected at each timing of a complex signal point. In other words, for each complex signal point, the spatial layer to be mapped to is switched according to the 1-bit first bit sequence.

Second Specific Example

Hereinafter, a second specific example of the first spatial modulation method will be described with reference to FIG. 10.

Figure 10:
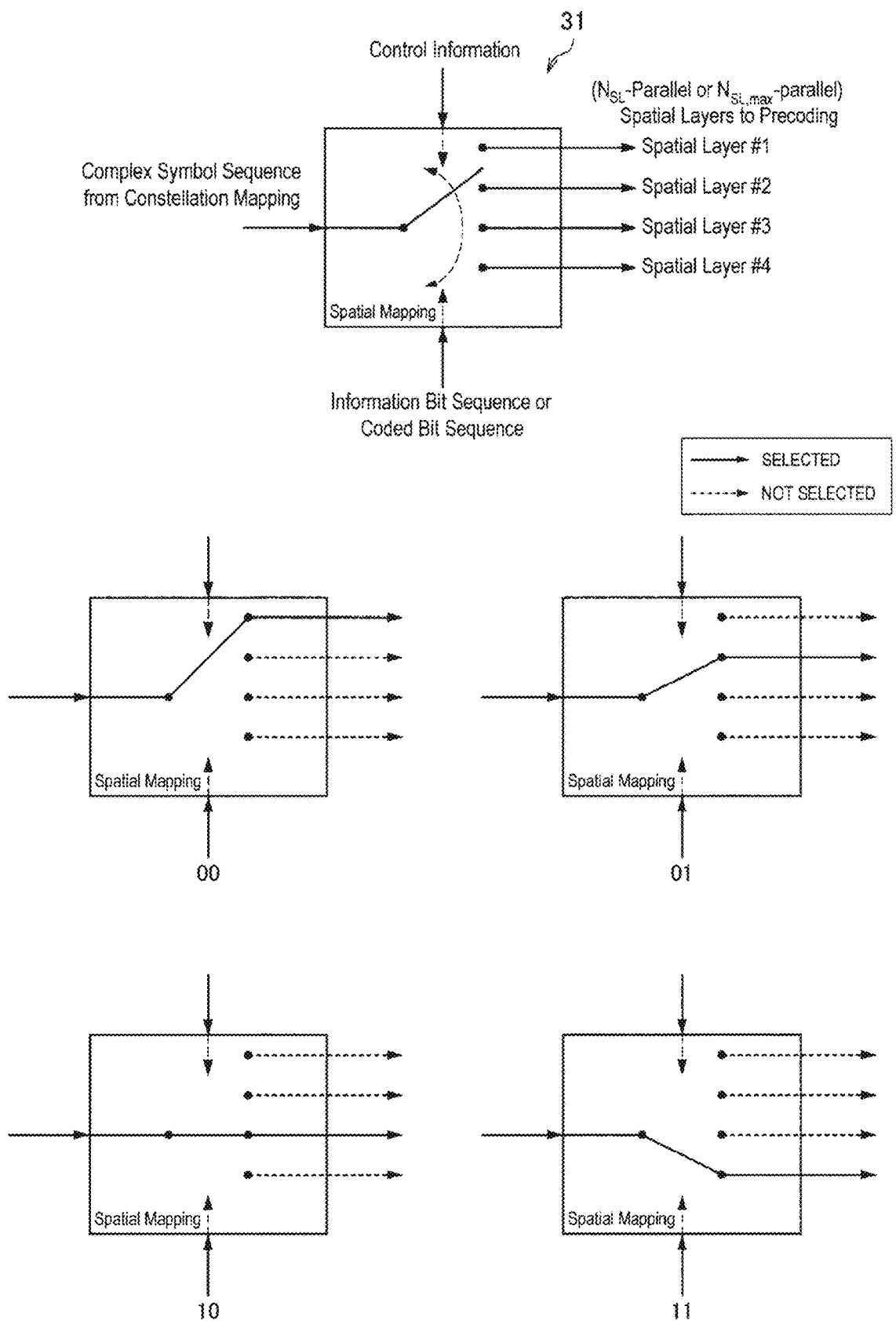
FIG. 10 is a diagram illustrating an example of combinations of first bit sequence candidates and spatial mapping patterns according to the first spatial modulation method.

FIG. 10 is a diagram illustrating an example of combinations of first bit sequence candidates and spatial mapping patterns according to a first spatial modulation method. In the example illustrated in FIG. 10, each complex signal point included in a complex signal point sequence is mapped to one of four spatial layers (that is, $N_{SL,max}=4$, $N_{SL}=1$). In this case, 2-bit information is imposed on the spatial mapping pattern. Specifically, "00" is expressed by mapping a complex signal point to the spatial layer #1. "01" is expressed by mapping a complex signal point to the spatial layer #2. "10" is expressed by mapping a complex signal point to the spatial layer #3. "11" is expressed by mapping a complex signal point to the spatial layer #4. In other words, if "00" is input as the first bit sequence, the complex signal point modulated from the second bit sequence is mapped to the spatial layer #1. If "01" is input as the first bit sequence, the complex signal point modulated from the second bit sequence is mapped to the spatial layer #2. If "10" is input as the first bit sequence, the complex signal point modulated from the second bit sequence is mapped to the spatial layer #3. If "11" is input as the first bit sequence, the complex signal point modulated from the second bit sequence is mapped to the spatial layer #4.

Here, 2 bits are input into the spatial mapping block 31 at each timing of a complex signal point, and a spatial mapping pattern is selected at each timing of a complex signal point. In other words, for each complex signal point, the spatial layer to be mapped to is switched according to the 2-bit first bit sequence.

Third Specific Example

Hereinafter, a third specific example of the first spatial modulation method will be described with reference to FIG. 11.

Figure 11:
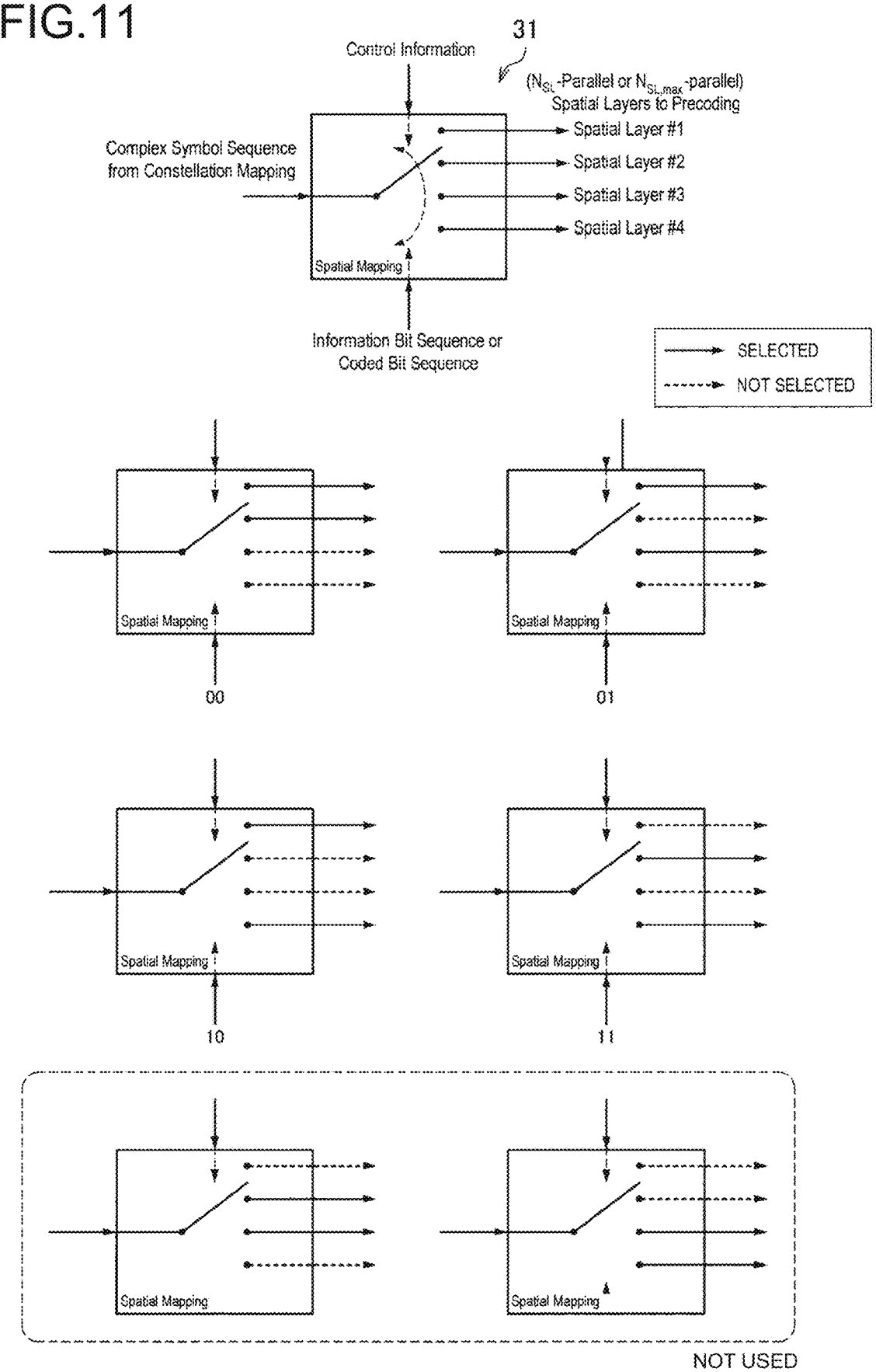
FIG. 11 is a diagram illustrating an example of combinations of first bit sequence candidates and spatial mapping patterns according to the first spatial modulation method.

FIG. 11 is a diagram illustrating an example of combinations of first bit sequence candidates and spatial mapping patterns according to a first spatial modulation method. In the example illustrated in FIG. 11, each complex signal point included in a complex signal point sequence is mapped to one of four spatial layers (that is, $N_{SL,max}=4$, $N_{SL}=1$). In this case, 2-bit information is imposed on the spatial mapping pattern. Specifically, "00" is expressed by mapping the first complex signal point to the spatial layer #1 and mapping the second complex signal point to the spatial layer #2. "01" is expressed by mapping the first complex signal point to the spatial layer #1 and mapping the second complex signal point to the spatial layer #3. "10" is expressed by mapping the first complex signal point to the spatial layer #1 and mapping the second complex signal point to the spatial layer #4. "11" is expressed by mapping the first complex signal point to the spatial layer #2 and mapping the second complex signal point to the spatial layer #4. In other words, if "00" is input as the first bit sequence, the two complex signal points modulated from the second bit sequence are respectively mapped to the spatial layer #1 or #2. If "01" is input as the first bit sequence, the two complex signal points modulated from the second bit sequence are respectively mapped to the spatial layer #1 or #3. If "10" is input as the first bit sequence, the two complex signal points modulated from the second bit sequence are respectively mapped to the spatial layer #1 or #4. If "11" is input as the first bit sequence, the two complex signal points modulated from the second bit sequence are respectively mapped to the spatial layer #2 or #4.

Here, 2 bits are input into the spatial mapping block 31 at each timing of a complex signal point, and a spatial mapping pattern is selected at each timing of a complex signal point.

In other words, for each complex signal point, the spatial layer to be mapped to is switched according to the 2-bit first bit sequence.

Note that the two spatial mapping patterns in the lower row of FIG. 11 are not associated with first bit sequence candidates, and are not used. It is desirable to predetermine which spatial mapping patterns are to be used and which are not to be used. This arrangement obtains an effect of lowering the computational load on the reception device 200 side and also improving the error rate by eliminating the unused spatial mapping patterns.

(2) Considerations

In the first spatial modulation method, zero may also be output as a value in a spatial layer to which a complex signal point is not mapped ("NOT SELECTED" in FIGS. 9 to 11). In the case where zero is output, it is possible to decide the size of the precoding matrix to be applied in the downstream precoding block 32 on the basis of $N_{SL,max}$ rather than $N_{SL}$.

The number of bits that can be carried per unit complex signal point time by complex modulation and spatial modulation is expressed by the following formula.

$$N_{B,CM,SM} = mN_{SL} + \text{floor}\left[\log_2\left\{\binom{N_{SL,max}}{N_{SL}}\right\}\right] \quad (16)$$

Note that the number of bits that can be carried per unit complex signal point time in the case where spatial modulation is not performed (that is, in the case where information is not imposed on the spatial mapping pattern) is expressed by the following formula. This corresponds to setting $N_{SL,max}=N_{SL}$ in Formula (16) above.

$$N_{B,CM,SM} = mN_{SL} \quad (17)$$

If the modulation from the second bit sequence to complex signal points, the modulation using the precoding matrix described above, and the spatial modulation are considered, the number of bits $N_{B,TTL}$ that can be carried per unit complex signal point time in the present embodiment is expressed by the following formula.

$$N_{B,TTL} = N_{B,CM,SM} + N_{B,P} \quad (18)$$

$$= mN_{SL} + \text{floor}\left[\log_2\left\{\binom{N_{SL,max}}{N_{SL}}\right\}\right] + \text{floor}\{\log_2(N_P)\}$$

If waveform modulation such as OFDMA, DFT-Spread-OFDMA, and SC-FDMA are also considered, the number of bits $N_{B,TTL}$ that can be carried per unit complex signal point time in the present embodiment changes further according to properties such as the number of subcarriers, for example. Specifically, provided that $N_{SC}$ is the number of subcarriers, the number of bits $N_{B,TTL}$ that can be carried per unit complex signal point time in the present embodiment is expressed by the following formula.

$$N_{B,TTL} = N_{SC}(N_{B,CM,SM} + N_{B,P}) \quad (19)$$

$$= mN_{SC}N_{SL} + N_{SC}\text{floor}\left[\log_2\left\{\binom{N_{SL,max}}{N_{SL}}\right\}\right] +$$

$$N_{SC}\text{floor}\{\log_2(N_P)\}$$

3.2.2. Second Spatial Modulation Method 3.2.2.1. Details about Second Spatial Modulation Method (1) Overview In the second spatial modulation method, the mapping pattern with respect to spatial layers is a pattern indicating which complex signal point set from among a plurality of complex signal point sets contains, as elements, each of the complex signal points mapped to two or more spatial layers among the plurality of spatial layers. In the second spatial modulation method, the complex signal points are mapped to two or more spatial layers among the plurality of spatial layers. Additionally, the first bit sequence is expressed according to which complex signal point set contains the complex signal points that are mapped to which spatial layer among the plurality of spatial layers. In other words, information (that is, the first bit sequence) is imposed on which complex signal point set is mapped to which spatial layer among the plurality of spatial layers.

In the first spatial modulation method, complex signal points are not mapped to at least one or more spatial layers (in other words, zero is mapped to one or more spatial layers). Because the spatial layer(s) to which a complex signal point is not mapped does not carry a complex signal point, the resource efficiency of the spatial layers may be lowered.

In contrast, in the second spatial modulation method, complex signal points are also mapped to the spatial layer(s) to which zero is mapped in the first spatial modulation method. Consequently, the second spatial modulation method is capable of improving the resource efficiency compared to the first spatial modulation method.

Signal processing according to the second spatial modulation method will be described with reference to FIG. 12.

Figure 12:
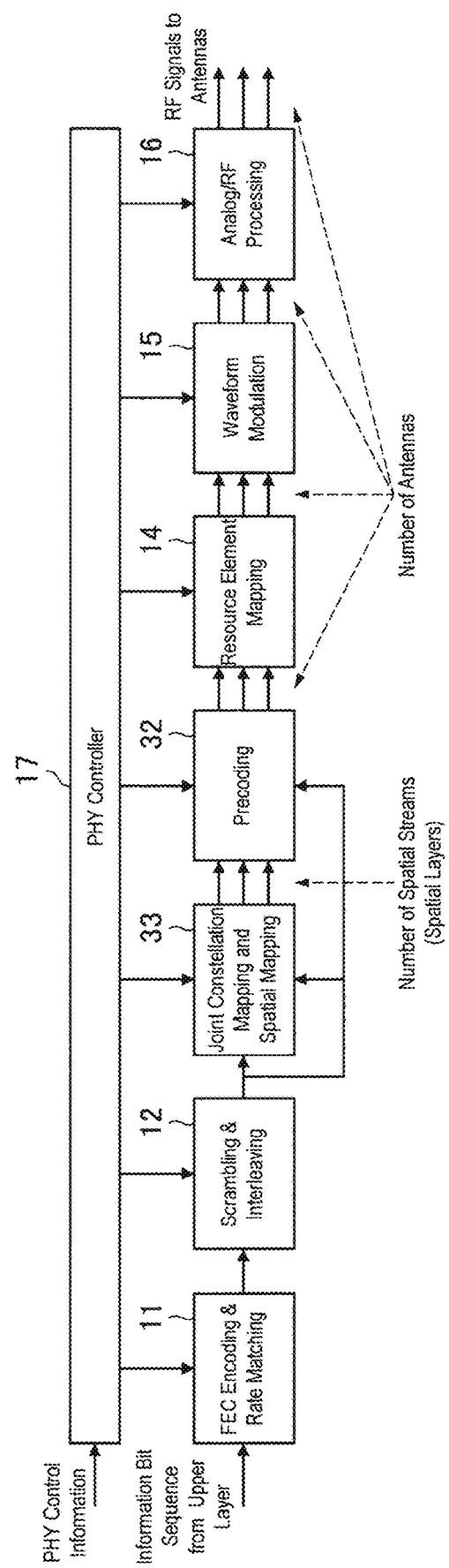
FIG. 12 is a block diagram illustrating a detailed example of signal processing by the transmission device according to the embodiment.

FIG. 12 is a block diagram illustrating a detailed example of signal processing by the transmission device 100 according to the embodiment. As illustrated in FIG. 12, the signal processing by the transmission device 100 according to the present embodiment includes a joint constellation mapping and spatial mapping block 33 and a precoding block 32 between the scrambling and interleaving block 12, and the resource element mapping block 14 of the signal processing described with reference to FIG. 1. Furthermore, the signal processing by the transmission device 100 includes a physical controller 17.

The physical controller 17 controls the processing by each processing block on the basis of input physical control information.

The joint constellation mapping and spatial mapping block 33 has functions similar to the constellation mapping block 13 and the spatial mapping block 91 described above. In addition, the joint constellation mapping and spatial mapping block 33 converts the second bit sequence into a complex signal point sequence using a plurality of complex signal point sets according to the first bit sequence, and performs spatial layer mapping according to the first bit sequence.

G denotes the number of complex signal point sets used in modulation. g denotes any complex signal point set among the G complex signal point sets. In the second spatial modulation method, information is imposed on which complex signal point set g among the G complex signal point sets is mapped to which spatial layers. $N_{SL,g}$ denotes the number of spatial layers to which the complex signal point set g is mapped. In the case where G=2, provided that $N_{SL,1}$ is the number of spatial layers to which a complex signal point set #1 is mapped, it is desirable that the number of spatial layers $N_{SL,2}$ to which a complex signal point set #2 is mapped satisfies the following formula.

$$N_{SL,2} \le N_{SL,max} - N_{SL,1} \quad (20)$$

It is also desirable for the relationship in the following formula to be satisfied.

$$\sum_{g=1}^{G} N_{SL,g} \le N_{SL,max} \quad (21)$$

(2) Modulation of Second Bit Sequence to Complex Signal Points

The second bit sequence (information bits or coded bits) is demarcated every m bits, and each m-bit partial sequence is converted (modulated) into a complex signal point (a real or complex number of signal points). Such conversion is also referred to as constellation mapping. Here, m is the modulation level of the complex signal points. Also, m may be considered to be the number of bits per complex signal point that a complex signal point can carry, or the number of bits expressed by a complex signal point.

The bit sequence to be converted is converted to a complex signal point corresponding to the bit sequence to be converted from among a plurality of complex signal points included in a predetermined complex signal point set. For the conversion, any complex signal point set, such as $2^m$ FSK, $2^m$ ASK, $2^m$ PSK, or $2^m$ QAM, may be used. Specific conversion tables are illustrated in Tables 7 to 11 described later.

(3) Specific Example of Second Spatial Modulation Method

First Specific Example

Hereinafter, a first specific example of the second spatial modulation method will be described with reference to FIG. 13.

Figure 13:
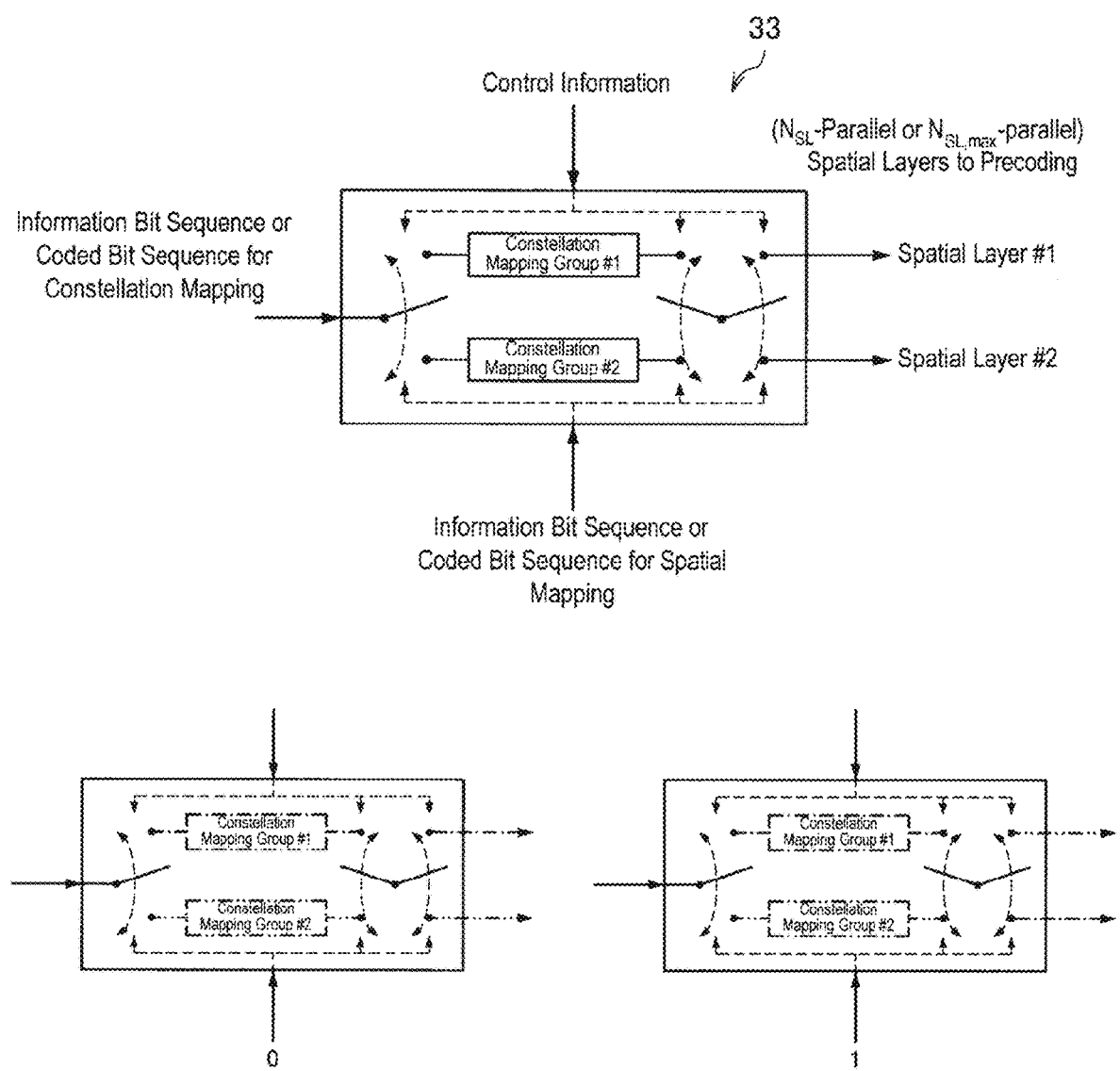
FIG. 13 is a diagram illustrating an example of combinations of first bit sequence candidates and spatial mapping patterns according to a second spatial modulation method.

FIG. 13 is a diagram illustrating an example of combinations of first bit sequence candidates and spatial mapping patterns according to a second spatial modulation method. In the example illustrated in FIG. 13, a complex signal point belonging to the complex signal point set #1 is mapped to one of two spatial layers, and a complex signal point belonging to the complex signal point set #2 is mapped to the other spatial layer (that is, $N_{SL,max}=2$, $N_{SL,1}=1$, $N_{SL,2}=1$, and G=2). In this case, 1-bit information is imposed on the spatial mapping pattern. Specifically, "0" is expressed by mapping the complex signal point set #1 to the spatial layer #1 and mapping the complex signal point set #2 to the spatial layer #2. "1" is expressed by mapping the complex signal point set #1 to the spatial layer #2 and mapping the complex signal point set #2 to the spatial layer #1.

In other words, if "0" is input as the first bit sequence, the first partial sequence of the second bit sequence is converted into a complex signal point using the complex signal point set #1 and mapped to the spatial layer #1, and the second partial sequence of the second bit sequence is converted into a complex signal point using the complex signal point set #2 and mapped to the spatial layer #2. In other words, if "1" is input as the first bit sequence, the first partial sequence of the second bit sequence is converted into a complex signal point using the complex signal point set #2 and mapped to the spatial layer #2, and the second partial sequence of the second bit sequence is converted into a complex signal point using the complex signal point set #1 and mapped to the spatial layer #1.

Second Specific Example

Hereinafter, a second specific example of the second spatial modulation method will be described with reference to FIG. 14.

Figure 14:
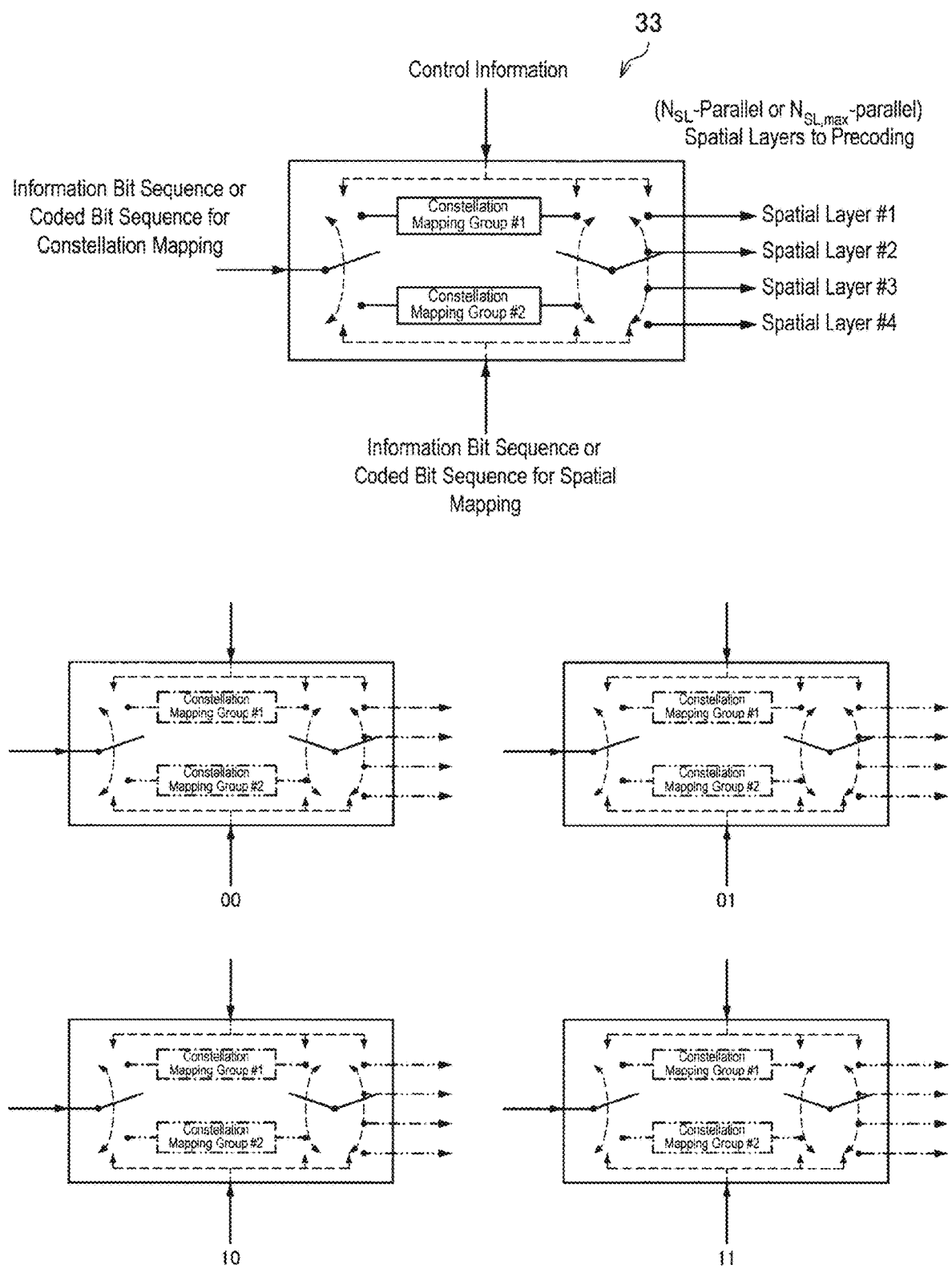
FIG. 14 is a diagram illustrating an example of combinations of first bit sequence candidates and spatial mapping patterns according to the second spatial modulation method.

FIG. 14 is a diagram illustrating an example of combinations of first bit sequence candidates and spatial mapping patterns according to a second spatial modulation method. In the example illustrated in FIG. 14, a complex signal point belonging to the complex signal point set #1 is mapped to one of four spatial layers, and a complex signal point belonging to the complex signal point set #2 is mapped to the other three spatial layers (that is, $N_{SL,max}=4$, $N_{SL,1}=1$, $N_{SL,2}=3$, and G=2). In this case, 2-bit information is imposed on the spatial mapping pattern. Specifically, "00" is expressed by mapping the complex signal point set #1 to the spatial layer #1 and mapping the complex signal point set #2 to other spatial layers. "01" is expressed by mapping the complex signal point set #1 to the spatial layer #2 and mapping the complex signal point set #2 to other spatial layers. "10" is expressed by mapping the complex signal point set #1 to the spatial layer #3 and mapping the complex signal point set #2 to other spatial layers. "11" is expressed by mapping the complex signal point set #1 to the spatial layer #4 and mapping the complex signal point set #2 to other spatial layers.

In other words, if "00" is input as the first bit sequence, the first partial sequence of the second bit sequence is converted into a complex signal point using the complex signal point set #1 and mapped to the spatial layer #1, and the remaining partial sequences of the second bit sequence are successively converted into complex signal points using the complex signal point set #2 and mapped to the remaining spatial layers. If "01" is input as the first bit sequence, the first partial sequence of the second bit sequence is converted into a complex signal point using the complex signal point set #1 and mapped to the spatial layer #2, and the remaining partial sequences of the second bit sequence are successively converted into complex signal points using the complex signal point set #2 and mapped to the remaining spatial layers. If "10" is input as the first bit sequence, the first partial sequence of the second bit sequence is converted into a complex signal point using the complex signal point set #1 and mapped to the spatial layer #3, and the remaining partial sequences of the second bit sequence are successively converted into complex signal points using the complex signal point set #2 and mapped to the remaining spatial layers. If "11" is input as the first bit sequence, the first partial sequence of the second bit sequence is converted into a complex signal point using the complex signal point set #1 and mapped to the spatial layer #4, and the remaining partial sequences of the second bit sequence are successively converted into complex signal points using the complex signal point set #2 and mapped to the remaining spatial layers.

Note that it is desirable for the spatial layers to which different complex signal point sets are mapped to not overlap each other inside a predetermined complex signal point symbol time.

3.2.2.2. Complex Signal Point Sets (1) Characteristics of Plurality of Complex Signal Point Sets Hereinafter, the plurality of complex signal point sets used in the second spatial modulation method will be described in detail.

At least one of the plurality of complex signal sets used for modulation includes the complex signal points expressed by at least one of $2^m$ FSK, $2^m$ ASK, $2^m$ PSK, or $2^m$ QAM as elements, where m is an integer equal to or greater than zero. It is desirable for at least one complex signal point set among the plurality of complex signal point sets used for modulation to contain $2^m$ elements or $1+2^m$ elements. However, in the case where the complex signal point set contains $1+2^m$ elements, the complex signal point set includes zero (0+0j) as an element. At least one complex signal point set among the plurality of complex signal point sets used for modulation may contain one element. However, in the case where the complex signal point set contains one element, the complex signal point set includes zero (0+0j) as an element.

The plurality of complex signal point sets used for modulation have different characteristics from each other. On the basis of the characteristics, the reception device 200 is capable of identifying which complex signal point set among the plurality of complex signal point sets each complex signal point included in the received complex signal point sequence belongs to. Hereinafter, the characteristics of the plurality of complex signal point sets used for modulation will be described.

No Overlapping Elements

It is desirable for the plurality of complex signal point sets used for modulation not to have elements that overlap with each other. For example, in the case where a complex signal point set g1 and a complex signal point set g2 are used for modulation, it is desirable for any complex signal point $s_{g1,a}$ belonging to the complex signal point set g1 not to overlap with any complex signal point $s_{g2,b}$ belonging to the complex signal point set g2. In other words, it is desirable for the relationship in the following formula to hold true.

$$s_{g1,a} \neq s_{g2,b}, \text{ if } g_1 \neq g_2, \forall a, \forall b \tag{22}$$

However, in the case where the complex signal point sets include zero (s=0+j0) as a complex signal point, the zero may overlap between different complex signal point sets.

Arithmetically Expressible

Given any two complex signal point sets included in the plurality of complex signal point sets used in a complex signal point sequence, it is desirable for an element of one to be expressed by applying a predetermined calculation to an element of the other. Furthermore, given any two complex signal point sets included in the plurality of complex signal point sets used in a complex signal point sequence, it is desirable for all of the elements included in one to be expressed by applying a common predetermined calculation to elements of the other. Specifically, it is desirable for the plurality of complex signal point sets used in a complex signal point sequence to exist in a linear relationship with each other. That is, given any two complex signal point sets included in the plurality of complex signal point sets used in a complex signal point sequence, it is desirable for an element of one to be expressed by performing a linear operation on an element of the other. The predetermined calculation may include at least one of an amplitude change, a phase rotation, a linear shift, or a substitution.

Same Number of Bits

It is desirable for the plurality of complex signal point sets used in a complex signal point sequence to have the same number of elements as each other or at most a difference of 1 in the number of elements between each other.

(2) Examples of Characterization of Plurality of Complex Signal Point Sets

First Example

FIG. 15 is a diagram illustrating an example of a plurality of complex signal point sets used in the second spatial modulation method. FIG. 15 illustrates complex signal point sets g1 to g4 given different amounts of phase rotation using binary phase shift keying (BPSK) as a base. Because BPSK is the base, m=1. Given any two complex signal point sets among the complex signal point sets g1 to g4, an element of one is expressed by applying a phase rotation to an element of the other. For example, focusing on the complex signal point sets g1 and g2, the element $s_{g1,a}$ of the complex signal point set g1 is defined using the element $s_{g2,b}$ of the complex signal point set g2 according to the following formula.

$$s_{g1,a} = \exp(j\theta_{g1,g2}) s_{g1,b} \tag{23}$$

Here, $\theta_{g1,g2}$ is a real number, and is the difference in the amount of phase rotation applied to each of the complex signal point sets g1 and g2. In other words, $\theta_{g1,g2}$ is the phase difference between the complex signal points $s_{g1,a}$ and $s_{g2,b}$. The value of $\theta_{g1,g2}$ may be shared in common among all of the elements included in the complex signal point sets g1 and g2.

To characterize G complex signal point sets using the phase difference $\theta$ from BPSK as a base, it is desirable for the relationship $\theta=\pi^*(g-1)/G$ to hold true regarding the value of the phase difference $\theta$ of each complex signal point set g from BPSK as a base. Here, g=1, ..., G. Note that in FIG. 15, this relationship holds true.

Second Example

FIG. 16 is a diagram illustrating an example of the characterization of a plurality of complex signal point sets used in the second spatial modulation method. FIG. 16 illustrates complex signal point sets g1 to g4 given at least one of different amounts of phase rotation or different amplitude change using binary phase shift keying (BPSK) as a base. Because BPSK is the base, m=1. Given any two complex signal point sets among the complex signal point sets g1 to g4, an element of one is expressed by applying at least one of a phase rotation or amplitude change to an element of the other. For example, focusing on the complex signal point sets g1 and g2, the element $s_{g1,a}$ of the complex signal point set g1 is defined using the element $s_{g2,b}$ of the complex signal point set g2 according to the following formula.

$$s_{g1,a} = |Z_{g1,g2}| \exp(j\theta_{g1,g2}) s_{g1,b} \tag{24}$$

Here, $\theta_{g1,g2}$ is a real number, and is the difference in the amount of phase rotation applied to each of the complex signal point sets g1 and g2. In other words, $\theta_{g1,g2}$ is the phase difference between the complex signal points $s_{g1,a}$ and $s_{g2,b}$. $Z_{g1,g2}$ is a complex number, a real number, or a pure imaginary number, and is the difference in the amount of amplitude change applied to each of the complex signal point sets g1 and g2. In other words, $Z_{g1,g2}$ is the amplitude difference between the complex signal points $s_{g1,a}$ and $s_{g2,b}$. The values of $\theta_{g1,g2}$ and $Z_{g1,g2}$ may be shared in common among all of the elements included in the complex signal point sets g1 and g2.

To characterize G complex signal point sets using the phase difference and the amplitude different from BPSK as a base, it is desirable for the relationship G=Gp*Ga to hold true in the case where Gp complex signal point sets are characterized by a phase difference and Ga complex signal point sets are characterized by an amplitude difference. Note that in FIG. 16, Gp=2 and Ga=2. It is desirable for the relationship θ=π*(g−1)/Gp to hold true regarding the value of the phase difference θ of each complex signal point set g from BPSK as a base. Here, g=1, . . . , Gp. Note that in FIG. 16, this relationship holds true.

Third Example

FIG. 17 is a diagram illustrating an example of the characterization of a plurality of complex signal point sets used in the second spatial modulation method. FIG. 17 illustrates complex signal point sets g1 to g4 given at least one of different amounts of phase rotation or different amplitude change using quadrature phase shift keying (QPSK) as a base. Because QPSK is the base, m=2. Given any two complex signal point sets among the complex signal point sets g1 to g4, an element of one is expressed by applying at least one of a phase rotation or amplitude change to an element of the other.

To characterize G complex signal point sets using the phase difference and the amplitude difference from QPSK as a base, it is desirable for the relationship G=Gp*Ga to hold true in the case where Gp complex signal point sets are characterized by a phase difference and Ga complex signal point sets are characterized by an amplitude difference. Note that in FIG. 17, Gp=2 and Ga=2. It is desirable for the relationship θ=π*(g−1)/2Gp to hold true regarding the value of the phase difference θ of each complex signal point set g from QPSK as a base. Here, g=Gp. Note that in FIG. 17, this relationship holds true.

Fourth Example

Figure 18:
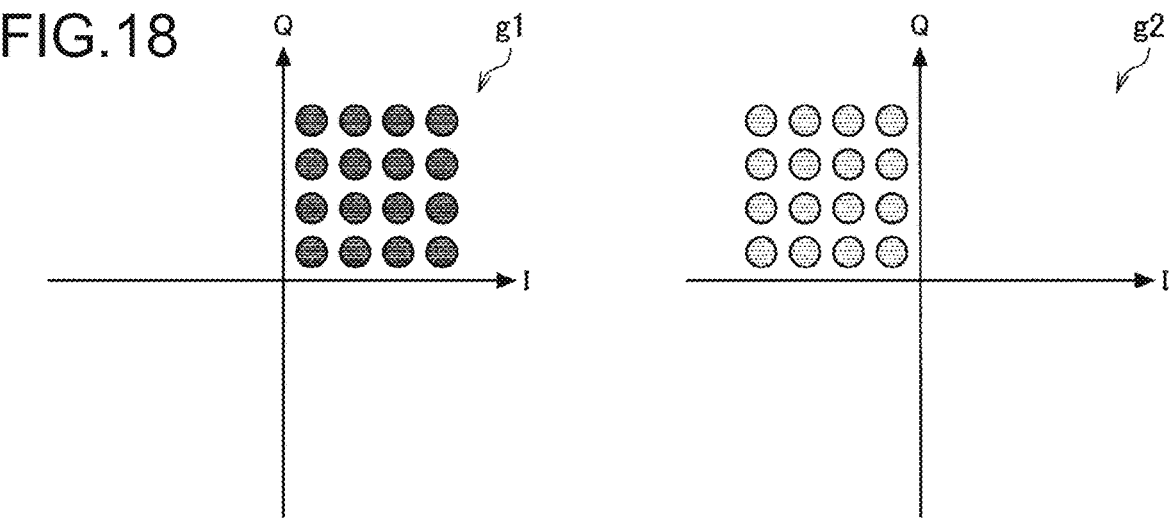
FIG. 18 is a diagram illustrating an example of the characterization of a plurality of complex signal point sets used in the second spatial modulation method.

FIG. 18 is a diagram illustrating an example of the characterization of a plurality of complex signal point sets used in the second spatial modulation method. FIG. 18 illustrates complex signal point sets g1 to g4 given different linear shift using quadrature amplitude modulation (16QAM) as a base. Because 16QAM is the base, m=4. Given any two complex signal point sets among the complex signal point sets g1 to g4, an element of one is expressed by applying a linear shift to an element of the other. For example, focusing on the complex signal point sets g1 and g2, the element $s_{g1,a}$ of the complex signal point set g1 is defined using the element $s_{g2,b}$ of the complex signal point set g2 according to the following formula.

$$s_{g1,a} = s_{g2,b} + C_{g1,g2} \tag{25}$$

Here, $C_{g1,g2}$ is a complex number, a real number, or a pure imaginary number, and is the difference in the linear shift applied to each of the complex signal point sets g1 and g2. The value of $C_{g1,g2}$ may be shared in common among all of the elements included in the complex signal point sets g1 and g2.

Generalization

The characterization of the plurality of complex signal point sets described above is generalized as follows. Among the plurality of complex signal point sets used for modulation, it is desirable for an element in one complex signal point set to be definable by applying an amplitude change, a phase rotation, and/or a linear shift to an element in a different complex signal point set. For example, focusing on any two complex signal point sets g1 and g2 among the plurality of complex signal point sets used for modulation, the element $s_{g1,a}$ of the complex signal point set g1 is defined using the element $s_{g2,b}$ of the complex signal point set g2 according to the following formula.

$$s_{g1,a} = |Z_{g1,g2}| \exp(j\theta_{g1,g2}) s_{g2,b} + C_{g1,g2} \tag{26}$$

Also, it is desirable for the relationship in the following formula to hold true for the value of each of the amplitude change, the phase rotation, and the linear shift to be applied with respect to any two complex signal point sets g1 and g2 among the plurality of complex signal point sets used for modulation.

$$\theta_{g1,g2} = -\theta_{g2,g1}$$

$$|Z_{g1,g2}| = |Z_{g2,g1}|^{-1}$$

$$C_{g1,g2} = -C_{g2,g1} \tag{27}$$

(3) Another Example Characterization of Plurality of Complex Signal Point Sets

The method of generating the plurality of complex signal point sets used for modulation is not limited to the method described above. For example, the plurality of complex signal point sets used for modulation may also be generated by treating FSK/ASK/PSK/QAM as a base and extracting any two or more complex signal points therefrom. A specific example of the above will be described with reference to FIGS. 19 to 22.

Figure 19:
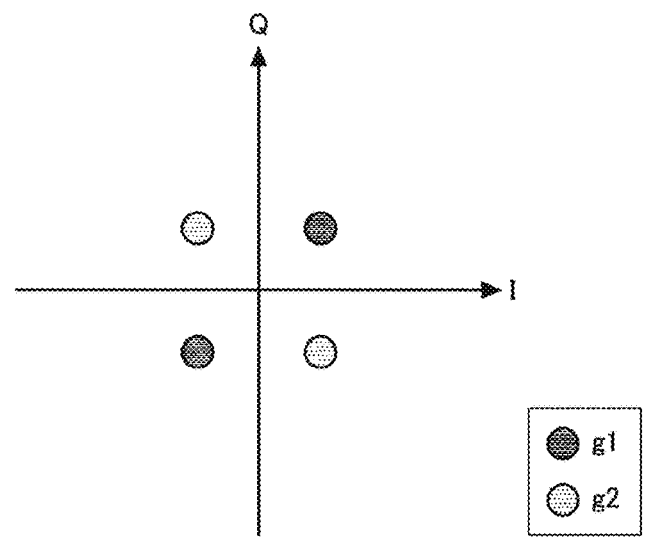
FIG. 19 is a diagram illustrating another example of the characterization of a plurality of complex signal point sets used in the second spatial modulation method.
Figure 20:
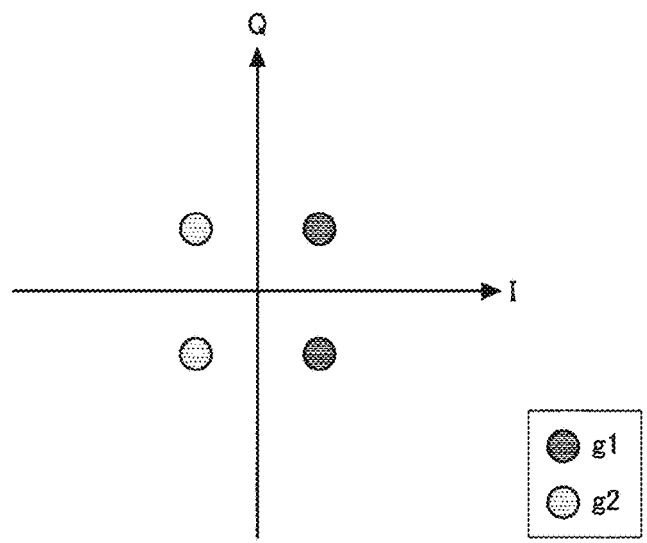
FIG. 20 is a diagram illustrating another example of the characterization of a plurality of complex signal point sets used in the second spatial modulation method.
Figure 21:
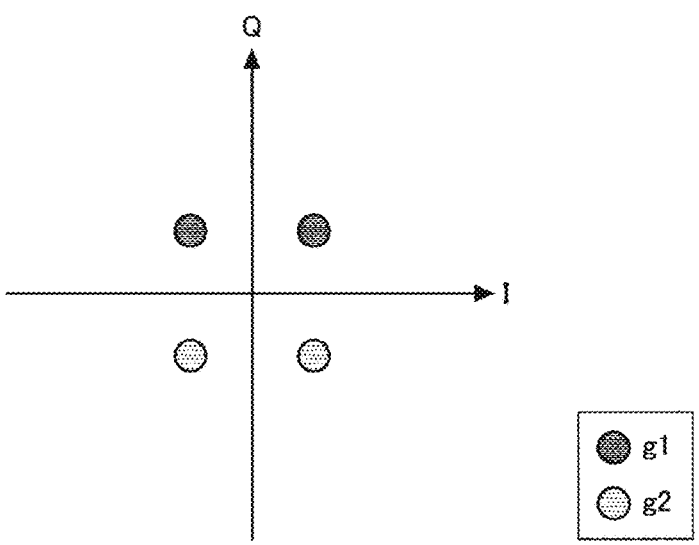
FIG. 21 is a diagram illustrating another example of the characterization of a plurality of complex signal point sets used in the second spatial modulation method.
Figure 22:
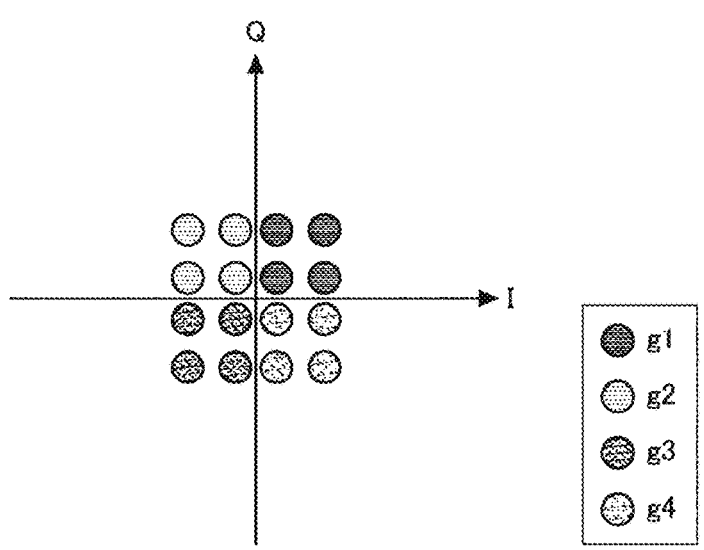
FIG. 22 is a diagram illustrating another example of the characterization of a plurality of complex signal point sets used in the second spatial modulation method.

FIGS. 19 to 22 are diagrams illustrating another example of the characterization of a plurality of complex signal point sets used in the second spatial modulation method. FIGS. 19 to 21 illustrate an example of a case of using QPSK as a base, in which two out of the four complex signal points of QPSK are extracted as the elements of complex signal point set g1, while the remaining two are extracted as the elements of the complex signal point set g2. FIG. 22 illustrates an example of a case of using 16QAM as a base, in which four out of the 16 complex signal points of 16QAM are respectively extracted as each of the complex signal point sets g1 to g4.

Even in the case where the plurality of complex signal point sets used for modulation are generated in this way, it is desirable for an element in one complex signal point set to be definable by applying an amplitude change, a phase rotation, and/or a linear shift to an element in a different complex signal point set. In other words, it is desirable for the relationships in Formulas (26) and (27) above to hold true.

3.2.2.3. Specific Signal Processing

Hereinafter, a specific example of the signal processing by the joint constellation mapping and spatial mapping block 33 will be described in detail.

The first bit sequence and the second bit sequence described above are input into the joint constellation mapping and spatial mapping block 33.

3.2.2.3.1. First Example

The present example is one that maps a complex signal point set to spatial layers by converting the second bit sequence into a temporary complex signal point sequence using a predetermined complex signal point set, and then applying arithmetic processing corresponding to the first bit sequence to the temporary complex signal point sequence.

(1) Exemplary Configuration

Figure 23:
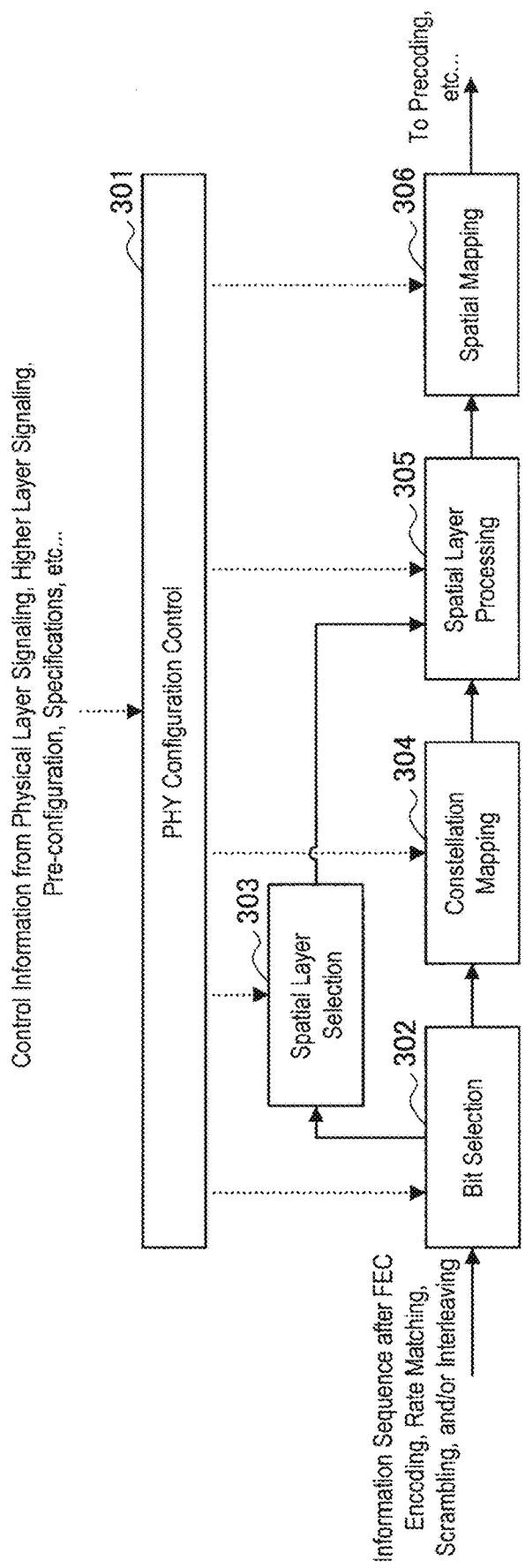
FIG. 23 is a block diagram for explaining a first example of signal processing by the transmission device according to the embodiment.

FIG. 23 is a block diagram for explaining a first example of signal processing by the transmission device 100 according to the present embodiment. FIG. 23 illustrates in detail a specific example of the signal processing by the joint constellation mapping and spatial mapping block 33 among the signal processing illustrated in FIG. 12. The signal processing illustrated in FIG. 23 includes a physical layer configuration control block 301, a bit selection block 302, a spatial layer selection block 303, a constellation mapping block 304, a spatial layer processing block 305, and a spatial mapping block 306. Referring to FIG. 23, a bit sequence obtained by applying FEC encoding, rate matching, scrambling, and/or interleaving is input, and after the signal processing illustrated in FIG. 23 is applied, processing such as precoding is applied.

Physical Layer Configuration Control Block 301

The physical layer configuration control block 301 controls the operations by each block according to control information received in a notification from a source such as the physical layer, a higher layer, the base station or the reception device 200 that the transmission device 100 connects to, and information that is predetermined by standards or the like. The control information received in a notification may be information such as control information signaling and radio resource control (RRC) signaling. The information that is predetermined by standards or the like may be information that is predetermined by pre-configuration or a standard specification.

Bit Selection Block 302

The bit selection block 302 divides the input bit sequence into the first bit sequence and the second bit sequence. The bit selection block 302 outputs the first bit sequence to the spatial layer selection block 303 and outputs the second bit sequence to the constellation mapping block 304.

For example, the bit selection block 302 selects the first bit sequence from the input bit sequence, and treats the remainder as the second bit sequence. Provided that $N_{B,SM}$ is the number of bits selected as the first bit sequence, $N_{B,SM}$ is expressed by the following formula.

$$N_{B,SM} = \text{floor}\left[\log_2\left\{\prod_{g=1}^{G}\left(N_{SL} - \sum_{g'=0}^{g-1} N_{SL,g'} \atop N_{SL,g}\right)\right\}\right] \quad (28)$$

Here, in the case where G 2 and the relationship in Formula (29) are satisfied, $N_{B,SM}$ is expressed by Formula (30).

$$\sum_g N_{SL,g} = N_{SL} \quad (29)$$

$$N_{B,SM} = \text{floor}\left[\log_2\left\{\binom{N_{SL}}{N_{SL,1}}\right\}\right] \quad (30)$$

Also, $N_{B,SM}$ may be expressed by one of the following formulas.

$$N_{B,SM} = \sum_{g=1}^{G} \text{floor}\left[\log_2\left\{\left(N_{SL} - \sum_{g'=0}^{g-1} N_{SL,g'} \atop N_{SL,g}\right)\right\}\right] \quad (31)$$

$$N_{B,SM} = \text{floor}\left[\sum_{g=1}^{G} \log_2\left\{\left(N_{SL} - \sum_{g'=0}^{g-1} N_{SL,g'} \atop N_{SL,g}\right)\right\}\right]$$

Here, in the case where G 2 and the relationship in Formula (29) are satisfied, Formula (30) and each equation in Formula (31) are the same formula. Note that the above formulas assume that $N_{SL,0}=0$.

Spatial Layer Selection Block 303

The spatial layer selection block 303 decides what kind of arithmetic processing to apply to the complex signal points mapped to which spatial layers from among the $N_{SL}$ (or $N_{SL,max}$) spatial layers, according to the first bit sequence selected by the bit selection block 302. This corresponds to selecting which complex signal point set to map to which spatial layers of the $N_{SL}$ (or $N_{SL,max}$) spatial layers. Note that the arithmetic processing is at least one of an amplitude change, a phase rotation, a linear shift, or a substitution performed on the complex signal points.

For example, in the case where $N_{SL}=4$, G=2, $N_{SL,1}=1$, $N_{SL,2}=3$, and two phase rotation amounts ($\theta_1$, $\theta_2$) corresponding to G=2 are defined as the arithmetic processing to be applied, the arithmetic processing corresponding to the first bit sequence is defined by the arithmetic processing definition table illustrated in Table 4 below, for example. The arithmetic processing definition table may be designated by the physical layer configuration control block 301.

TABLE 4

Example of arithmetic processing definition table ($N_{SL}$ = 4, G = 2, $N_{SL,1}$ = 1, $N_{SL,2}$ = 3, and arithmetic processing to be applied is a phase rotation)

| First bit sequence | | Arithmetic processing applied to complex signal points mapped to spatial layers #1 to #4 | | | | |
|---|---|---|---|---|---|---|
| Bit 1 | Bit 2 | #1 | #2 | #3 | #4 | Supplement |
| 0 | 0 | $\exp(j\theta_1)$ | $\exp(j\theta_2)$ | $\exp(j\theta_2)$ | $\exp(j\theta_2)$ | — |
| 0 | 1 | $\exp(j\theta_2)$ | $\exp(j\theta_1)$ | $\exp(j\theta_2)$ | $\exp(j\theta_2)$ | — |
| 1 | 0 | $\exp(j\theta_2)$ | $\exp(j\theta_2)$ | $\exp(j\theta_1)$ | $\exp(j\theta_2)$ | — |
| 1 | 1 | $\exp(j\theta_2)$ | $\exp(j\theta_2)$ | $\exp(j\theta_2)$ | $\exp(j\theta_1)$ | — |

For another example, in the case where $N_{SL}=4$, G=2, $N_{SL,1}=2$, $N_{SL,2}=2$, and two phase rotation amounts ($\theta_1$, $\theta_2$) corresponding to G=2 are considered as the arithmetic processing to be applied, the arithmetic processing corresponding to the first bit sequence is defined by the arithmetic processing definition table illustrated in Table 5 below, for example. The arithmetic processing definition table may be designated by the physical layer configuration control block 301.

TABLE 5

Example of arithmetic processing definition table ($N_{SL}$ = 4, G = 2, $N_{SL,1}$ = 2, $N_{SL,2}$ = 2, and arithmetic processing to be applied is a phase rotation)

| First bit sequence | | Arithmetic processing applied to complex signal points mapped to spatial layers #1 to #4 | | | | |
|---|---|---|---|---|---|---|
| Bit 1 | Bit 2 | #1 | #2 | #3 | #4 | Supplement |
| 0 | 0 | $\exp(j\theta_1)$ | $\exp(j\theta_1)$ | $\exp(j\theta_2)$ | $\exp(j\theta_2)$ | — |
| 0 | 1 | $\exp(j\theta_1)$ | $\exp(j\theta_2)$ | $\exp(j\theta_1)$ | $\exp(j\theta_2)$ | — |
| 1 | 0 | $\exp(j\theta_1)$ | $\exp(j\theta_2)$ | $\exp(j\theta_2)$ | $\exp(j\theta_1)$ | — |
| 1 | 1 | $\exp(j\theta_2)$ | $\exp(j\theta_1)$ | $\exp(j\theta_2)$ | $\exp(j\theta_1)$ | — |

TABLE 5-continued

Example of arithmetic processing definition table ($N_{SL}$ = 4, G = 2, $N_{SL,1}$ = 2, $N_{SL,2}$ = 2, and arithmetic processing to be applied is a phase rotation)

| First bit sequence | | Arithmetic processing applied to complex signal points mapped to spatial layers #1 to #4 | | | | |
|---|---|---|---|---|---|---|
| Bit 1 | Bit 2 | #1 | #2 | #3 | #4 | Supplement |
| N/A | N/A | exp(j$\theta_2$) | exp(j$\theta_1$) | exp(j$\theta_1$) | exp(j$\theta_2$) | These combinations are not actually used and do not have to be defined. |
| N/A | N/A | exp(j$\theta_2$) | exp(j$\theta_2$) | exp(j$\theta_1$) | exp(j$\theta_1$) | |

For another example, in the case where $N_{SL}$=4, G=2, $N_{SL,1}$=2, $N_{SL,2}$=1, and two phase rotation amounts ($\theta_1$, $\theta_2$) corresponding to G=2 are considered as the arithmetic processing to be applied, the arithmetic processing corresponding to the first bit sequence is defined by the arithmetic processing definition table illustrated in Table 6 below, for example. Here, a multiplication by zero (*(0+j0)) is applied to the spatial layers that are turned off. The arithmetic processing definition table may be designated by the physical layer configuration control block 301.

TABLE 6

Example of arithmetic processing definition table ($N_{SL}$ = 4, G = 2, $N_{SL,1}$ = 2, $N_{SL,2}$ = 1, and arithmetic processing to be applied is a phase rotation)

| First bit sequence | | | Arithmetic processing applied to complex signal points mapped to spatial layers #1 to #4 | | | | |
|---|---|---|---|---|---|---|---|
| Bit 1 | Bit 2 | Bit 3 | #1 | #2 | #3 | #4 | Supplement |
| 0 | 0 | 0 | exp(j$\theta_1$) | exp(j$\theta_1$) | exp(j$\theta_2$) | *(0 + j0) | |
| 0 | 0 | 1 | exp(j$\theta_1$) | exp(j$\theta_1$) | *(0 + j0) | exp(j$\theta_2$) | |
| 0 | 1 | 0 | exp(j$\theta_1$) | exp(j$\theta_2$) | exp(j$\theta_1$) | *(0 + j0) | |
| 0 | 1 | 1 | exp(j$\theta_1$) | *(0 + j0) | exp(j$\theta_1$) | exp(j$\theta_2$) | |
| 1 | 0 | 0 | exp(j$\theta_1$) | exp(j$\theta_2$) | *(0 + j0) | exp(j$\theta_1$) | |
| 1 | 0 | 1 | exp(j$\theta_1$) | *(0 + j0) | exp(j$\theta_2$) | exp(j$\theta_1$) | |
| 1 | 1 | 0 | exp(j$\theta_2$) | exp(j$\theta_1$) | *(0 + j0) | exp(j$\theta_1$) | |
| 1 | 1 | 1 | *(0 + j0) | exp(j$\theta_1$) | exp(j$\theta_2$) | exp(j$\theta_1$) | |
| N/A | N/A | N/A | exp(j$\theta_2$) | exp(j$\theta_1$) | exp(j$\theta_1$) | *(0 + j0) | These combinations are not actually used and do not have to be defined. |
| N/A | N/A | N/A | *(0 + j0) | exp(j$\theta_1$) | exp(j$\theta_1$) | exp(j$\theta_2$) | |
| N/A | N/A | N/A | exp(j$\theta_2$) | *(0 + j0) | exp(j$\theta_1$) | exp(j$\theta_1$) | |
| N/A | N/A | N/A | *(0 + j0) | exp(j$\theta_2$) | exp(j$\theta_1$) | exp(j$\theta_1$) | |

Note that although phase rotation is described as an example in Tables 4 to 6, the arithmetic processing definition tables described above may also be used with respect to amplitude change and linear shift. Such arithmetic processing definition tables may be designated by the physical layer configuration control block 301.

Constellation Mapping Block 304

The constellation mapping block 304 converts the second bit sequence into a temporary complex signal point sequence on the basis of a predetermined complex signal point set that serves as a base. The predetermined complex signal point set that serves as a base includes the complex signal points expressed by at least one of 2^m FSK, 2^m ASK, 2^m PSK, or 2^m QAM as elements, where m is an integer equal to or greater than zero. In this case, the second bit sequence is demarcated every m bits, and each m-bit partial sequence is converted into a complex signal point. In other words, the second bit sequence is converted into a complex signal point at each position of a resource element. As a result of the signal processing illustrated in FIG. 23, a complex signal point sequence containing N complex signal points is ultimately generated. The number of complex signal points output from the constellation mapping block 304 is expressed by the following formula.

$$\sum_g N_{SL,g} \tag{32}$$

The number of bits $N_{B,CM}$ of the information imposed on the complex signal points is expressed by the following formula.

$$N_{B,CM} = \sum_{g=1}^{G} N_{SL,g} m_g \tag{33}$$

The following illustrates an example of a conversion table illustrating correspondence relationships between the second bit sequence and the complex signal points (I-axis and Q-axis) in BPSK (m=1), QPSK (m=2), 16QAM (m=4), 64QAM (m=6), and 256QAM (m=8).

TABLE 7

Example of conversion table of BPSK (m = 1)

| b(i) | I | Q |
|---|---|---|
| 0 | 1/$\sqrt{2}$ | 1/$\sqrt{2}$ |
| 1 | -1/$\sqrt{2}$ | -1/$\sqrt{2}$ |

TABLE 8

Example of conversion table of QPSK (m = 2)

| b(i), b(i + 1) | I | Q |
|---|---|---|
| 00 | 1/$\sqrt{2}$ | 1/$\sqrt{2}$ |
| 01 | 1/$\sqrt{2}$ | -1/$\sqrt{2}$ |
| 10 | -1/$\sqrt{2}$ | 1/$\sqrt{2}$ |
| 11 | -1/$\sqrt{2}$ | -1/$\sqrt{2}$ |

TABLE 9

Example of conversion table of 16 QAM (m = 4)

| b(i), b(i + 1), b(i + 2), b(i + 2) | I | Q |
|---|---|---|
| 0000 | 1/$\sqrt{10}$ | 1/$\sqrt{10}$ |
| 0001 | 1/$\sqrt{10}$ | 3/$\sqrt{10}$ |
| 0010 | 3/$\sqrt{10}$ | 1/$\sqrt{10}$ |
| 0011 | 3/$\sqrt{10}$ | 3/$\sqrt{10}$ |
| 0100 | 1/$\sqrt{10}$ | -1/$\sqrt{10}$ |
| 0101 | 1/$\sqrt{10}$ | -3/$\sqrt{10}$ |
| 0110 | 3/$\sqrt{10}$ | -1/$\sqrt{10}$ |
| 0111 | 3/$\sqrt{10}$ | -3/$\sqrt{10}$ |
| 1000 | -1/$\sqrt{10}$ | 1/$\sqrt{10}$ |
| 1001 | -1/$\sqrt{10}$ | 3/$\sqrt{10}$ |
| 1010 | -3/$\sqrt{10}$ | 1/$\sqrt{10}$ |

TABLE 9-continued

Example of conversion table of 16 QAM (m = 4)

| b(i), b(i + 1), b(i + 2), b(i + 2) | I | Q |
|---|---|---|
| 1011 | $-3/\sqrt{10}$ | $3/\sqrt{10}$ |
| 1100 | $-1/\sqrt{10}$ | $-1/\sqrt{10}$ |
| 1101 | $-1/\sqrt{10}$ | $-3/\sqrt{10}$ |
| 1110 | $-3/\sqrt{10}$ | $-1/\sqrt{10}$ |
| 1111 | $-3/\sqrt{10}$ | $-3/\sqrt{10}$ |

TABLE 10

Example of conversion table of 64 QAM (m = 6)

| b(i), b(i + 1), b(i +2), b(i + 3), b(i + 4), b(i + 5) | I | Q | b(i), b(i + 1), b(i +2), b(i + 3), b(i + 4), b(i + 5) | I | Q |
|---|---|---|---|---|---|
| 000000 | $3/\sqrt{42}$ | $3/\sqrt{42}$ | 100000 | $-3/\sqrt{42}$ | $3/\sqrt{42}$ |
| 000001 | $3/\sqrt{42}$ | $1/\sqrt{42}$ | 100001 | $-3/\sqrt{42}$ | $1/\sqrt{42}$ |
| 000010 | $1/\sqrt{42}$ | $3/\sqrt{42}$ | 100010 | $-1/\sqrt{42}$ | $3/\sqrt{42}$ |
| 000011 | $1/\sqrt{42}$ | $1/\sqrt{42}$ | 100011 | $-1/\sqrt{42}$ | $1/\sqrt{42}$ |
| 000100 | $3/\sqrt{42}$ | $5/\sqrt{42}$ | 100100 | $-3/\sqrt{42}$ | $5/\sqrt{42}$ |
| 000101 | $3/\sqrt{42}$ | $7/\sqrt{42}$ | 100101 | $-3/\sqrt{42}$ | $7/\sqrt{42}$ |
| 000110 | $1/\sqrt{42}$ | $5/\sqrt{42}$ | 100110 | $-1/\sqrt{42}$ | $5/\sqrt{42}$ |
| 000111 | $1/\sqrt{42}$ | $7/\sqrt{42}$ | 100111 | $-1/\sqrt{42}$ | $7/\sqrt{42}$ |
| 001000 | $5/\sqrt{42}$ | $3/\sqrt{42}$ | 101000 | $-5/\sqrt{42}$ | $3/\sqrt{42}$ |
| 001001 | $5/\sqrt{42}$ | $1/\sqrt{42}$ | 101001 | $-5/\sqrt{42}$ | $1/\sqrt{42}$ |
| 001010 | $7/\sqrt{42}$ | $3/\sqrt{42}$ | 101010 | $-7/\sqrt{42}$ | $3/\sqrt{42}$ |
| 001011 | $7/\sqrt{42}$ | $1/\sqrt{42}$ | 101011 | $-7/\sqrt{42}$ | $1/\sqrt{42}$ |
| 001100 | $5/\sqrt{42}$ | $5/\sqrt{42}$ | 101100 | $-5/\sqrt{42}$ | $5/\sqrt{42}$ |
| 001101 | $5/\sqrt{42}$ | $7/\sqrt{42}$ | 101101 | $-5/\sqrt{42}$ | $7/\sqrt{42}$ |
| 001110 | $7/\sqrt{42}$ | $5/\sqrt{42}$ | 101110 | $-7/\sqrt{42}$ | $5/\sqrt{42}$ |
| 001111 | $7/\sqrt{42}$ | $7/\sqrt{42}$ | 101111 | $-7/\sqrt{42}$ | $7/\sqrt{42}$ |
| 010000 | $3/\sqrt{42}$ | $-3/\sqrt{42}$ | 110000 | $-3/\sqrt{42}$ | $-3/\sqrt{42}$ |
| 010001 | $3/\sqrt{42}$ | $-1/\sqrt{42}$ | 110001 | $-3/\sqrt{42}$ | $-1/\sqrt{42}$ |
| 010010 | $1/\sqrt{42}$ | $-3/\sqrt{42}$ | 110010 | $-1/\sqrt{42}$ | $-3/\sqrt{42}$ |
| 010011 | $1/\sqrt{42}$ | $-1/\sqrt{42}$ | 110011 | $-1/\sqrt{42}$ | $-1/\sqrt{42}$ |
| 010100 | $3/\sqrt{42}$ | $-5/\sqrt{42}$ | 110100 | $-3/\sqrt{42}$ | $-5/\sqrt{42}$ |
| 010101 | $3/\sqrt{42}$ | $-7/\sqrt{42}$ | 110101 | $-3/\sqrt{42}$ | $-7/\sqrt{42}$ |
| 010110 | $1/\sqrt{42}$ | $-5/\sqrt{42}$ | 110110 | $-1/\sqrt{42}$ | $-5/\sqrt{42}$ |
| 010111 | $1/\sqrt{42}$ | $-7/\sqrt{42}$ | 110111 | $-1/\sqrt{42}$ | $-7/\sqrt{42}$ |
| 011000 | $5/\sqrt{42}$ | $-3/\sqrt{42}$ | 111000 | $-5/\sqrt{42}$ | $-3/\sqrt{42}$ |
| 011001 | $5/\sqrt{42}$ | $-1/\sqrt{42}$ | 111001 | $-5/\sqrt{42}$ | $-1/\sqrt{42}$ |
| 011010 | $7/\sqrt{42}$ | $-3/\sqrt{42}$ | 111010 | $-7/\sqrt{42}$ | $-3/\sqrt{42}$ |
| 011011 | $7/\sqrt{42}$ | $-1/\sqrt{42}$ | 111011 | $-7/\sqrt{42}$ | $-1/\sqrt{42}$ |
| 011100 | $5/\sqrt{42}$ | $-5/\sqrt{42}$ | 111100 | $-5/\sqrt{42}$ | $-5/\sqrt{42}$ |
| 011101 | $5/\sqrt{42}$ | $-7/\sqrt{42}$ | 111101 | $-5/\sqrt{42}$ | $-7/\sqrt{42}$ |
| 011110 | $7/\sqrt{42}$ | $-5/\sqrt{42}$ | 111110 | $-7/\sqrt{42}$ | $-5/\sqrt{42}$ |
| 011111 | $7/\sqrt{42}$ | $-7/\sqrt{42}$ | 111111 | $-7/\sqrt{42}$ | $-7/\sqrt{42}$ |

TABLE 11

Example of conversion table of 256QAM (m = 8)
(Actual complex signal point is set to (1 + jQ)/sqrt(170))

| b(i), . . . , b(i + 7) | I | Q |
|---|---|---|
| 00000000 | 5 | 5 |
| 00000001 | 5 | 7 |
| 00000010 | 7 | 5 |
| 00000011 | 7 | 7 |
| 00000100 | 5 | 3 |
| 00000101 | 5 | 1 |
| 00000110 | 7 | 3 |
| 00000111 | 7 | 1 |
| 00001000 | 3 | 5 |
| 00001001 | 3 | 7 |
| 00001010 | 1 | 5 |
| 00001011 | 1 | 7 |
| 00001100 | 3 | 3 |
| 00001101 | 3 | 1 |
| 00001110 | 1 | 3 |
| 00001111 | 1 | 1 |
| 00010000 | 5 | 11 |
| 00010001 | 5 | 9 |
| 00010010 | 7 | 11 |
| 00010011 | 7 | 9 |
| 00010100 | 5 | 13 |
| 00010101 | 5 | 15 |
| 00010110 | 7 | 13 |
| 00010111 | 7 | 15 |
| 00011000 | 3 | 11 |
| 00011001 | 3 | 9 |
| 00011010 | 1 | 11 |
| 00011011 | 1 | 9 |
| 00011100 | 3 | 13 |
| 00011101 | 3 | 15 |
| 00011110 | 1 | 13 |
| 00011111 | 1 | 15 |
| 00100000 | 11 | 5 |
| 00100001 | 11 | 7 |
| 00100010 | 9 | 5 |
| 00100011 | 9 | 7 |
| 00100100 | 11 | 3 |
| 00100101 | 11 | 1 |

TABLE 11-continued

Example of conversion table of 256QAM (m = 8)
(Actual complex signal point is set to (1 + jQ)/sqrt(170))

| b(i), . . . , b(i + 7) | I | Q |
|---|---|---|
| 00100110 | 9 | 3 |
| 00100111 | 9 | 1 |
| 00101000 | 13 | 5 |
| 00101001 | 13 | 7 |
| 00101010 | 15 | 5 |
| 00101011 | 15 | 7 |
| 00101100 | 13 | 3 |
| 00101101 | 13 | 1 |
| 00101110 | 15 | 3 |
| 00101111 | 15 | 1 |
| 00110000 | 11 | 11 |
| 00110001 | 11 | 9 |
| 00110010 | 9 | 11 |
| 00110011 | 9 | 9 |
| 00110100 | 11 | 13 |
| 00110101 | 11 | 15 |
| 00110110 | 9 | 13 |
| 00110111 | 9 | 15 |
| 00111000 | 13 | 11 |
| 00111001 | 13 | 9 |
| 00111010 | 15 | 11 |
| 00111011 | 15 | 9 |
| 00111100 | 13 | 13 |
| 00111101 | 13 | 15 |
| 00111110 | 15 | 13 |
| 00111111 | 15 | 15 |
| 01000000 | 5 | −5 |
| 01000001 | 5 | −7 |
| 01000010 | 7 | −5 |
| 01000011 | 7 | −7 |
| 01000100 | 5 | −3 |
| 01000101 | 5 | −1 |
| 01000110 | 7 | −3 |
| 01000111 | 7 | −1 |
| 01001000 | 3 | −5 |
| 01001001 | 3 | −7 |
| 01001010 | 1 | −5 |
| 01001011 | 1 | −7 |
| 01001100 | 3 | −3 |
| 01001101 | 3 | −1 |
| 01001110 | 1 | −3 |
| 01001111 | 1 | −1 |
| 01010000 | 5 | −11 |
| 01010001 | 5 | −9 |
| 01010010 | 7 | −11 |
| 01010011 | 7 | −9 |
| 01010100 | 5 | −13 |
| 01010101 | 5 | −15 |
| 01010110 | 7 | −13 |
| 01010111 | 7 | −15 |
| 01011000 | 3 | −11 |
| 01011001 | 3 | −9 |
| 01011010 | 1 | −11 |
| 01011011 | 1 | −9 |
| 01011100 | 3 | −13 |
| 01011101 | 3 | −15 |
| 01011110 | 1 | −13 |
| 01011111 | 1 | −15 |
| 01100000 | 11 | −5 |
| 01100001 | 11 | −7 |
| 01100010 | 9 | −5 |
| 01100011 | 9 | −7 |
| 01100100 | 11 | −3 |
| 01100101 | 11 | −1 |
| 01100110 | 9 | −3 |
| 01100111 | 9 | −1 |
| 01101000 | 13 | −5 |
| 01101001 | 13 | −7 |
| 01101010 | 15 | −5 |
| 01101011 | 15 | −7 |
| 01101100 | 13 | −3 |
| 01101101 | 13 | −1 |
| 01101110 | 15 | −3 |
| 01101111 | 15 | −1 |
| 01110000 | 11 | −11 |
| 01110001 | 11 | −9 |
| 01110010 | 9 | −11 |
| 01110011 | 9 | −9 |
| 01110100 | 11 | −13 |
| 01110101 | 11 | −15 |
| 01110110 | 9 | −13 |
| 01110111 | 9 | −15 |
| 01111000 | 13 | −11 |
| 01111001 | 13 | −9 |
| 01111010 | 15 | −11 |
| 01111011 | 15 | −9 |
| 01111100 | 13 | −13 |
| 01111101 | 13 | −15 |
| 01111110 | 15 | −13 |
| 01111111 | 15 | −15 |
| 10000000 | −5 | 5 |
| 10000001 | −5 | 7 |
| 10000010 | −7 | 5 |
| 10000011 | −7 | 7 |
| 10000100 | −5 | 3 |
| 10000101 | −5 | 1 |
| 10000110 | −7 | 3 |
| 10000111 | −7 | 1 |
| 10001000 | −3 | 5 |
| 10001001 | −3 | 7 |
| 10001010 | −1 | 5 |
| 10001011 | −1 | 7 |
| 10001100 | −3 | 3 |
| 10001101 | −3 | 1 |
| 10001110 | −1 | 3 |
| 10001111 | −1 | 1 |
| 10010000 | −5 | 11 |
| 10010001 | −5 | 9 |
| 10010010 | −7 | 11 |
| 10010011 | −7 | 9 |
| 10010100 | −5 | 13 |
| 10010101 | −5 | 15 |
| 10010110 | −7 | 13 |
| 10010111 | −7 | 15 |
| 10011000 | −3 | 11 |
| 10011001 | −3 | 9 |
| 10011010 | −1 | 11 |
| 10011011 | −1 | 9 |
| 10011100 | −3 | 13 |
| 10011101 | −3 | 15 |
| 10011110 | −1 | 13 |
| 10011111 | −1 | 15 |
| 10100000 | −11 | 5 |
| 10100001 | −11 | 7 |
| 10100010 | −9 | 5 |
| 10100011 | −9 | 7 |
| 10100100 | −11 | 3 |
| 10100101 | −11 | 1 |
| 10100110 | −9 | 3 |
| 10100111 | −9 | 1 |
| 10101000 | −13 | 5 |
| 10101001 | −13 | 7 |
| 10101010 | −15 | 5 |
| 10101011 | −15 | 7 |
| 10101100 | −13 | 3 |
| 10101101 | −13 | 1 |
| 10101110 | −15 | 3 |
| 10101111 | −15 | 1 |
| 10110000 | −11 | 11 |
| 10110001 | −11 | 9 |
| 10110010 | −9 | 11 |
| 10110011 | −9 | 9 |
| 10110100 | −11 | 13 |
| 10110101 | −11 | 15 |
| 10110110 | −9 | 13 |
| 10110111 | −9 | 15 |
| 10111000 | −13 | 11 |
| 10111001 | −13 | 9 |
| 10111010 | −15 | 11 |
| 10111011 | −15 | 9 |

TABLE 11-continued

Example of conversion table of 256QAM (m = 8)
(Actual complex signal point is set to (1 + jQ)/sqrt(170))

| b(i), . . . , b(i + 7) | I | Q |
|---|---|---|
| 10111100 | −13 | 13 |
| 10111101 | −13 | 15 |
| 10111110 | −15 | 13 |
| 10111111 | −15 | 15 |
| 11000000 | −5 | −5 |
| 11000001 | −5 | −7 |
| 11000010 | −7 | −5 |
| 11000011 | −7 | −7 |
| 11000100 | −5 | −3 |
| 11000101 | −5 | −1 |
| 11000110 | −7 | −3 |
| 11000111 | −7 | −1 |
| 11001000 | −3 | −5 |
| 11001001 | −3 | −7 |
| 11001010 | −1 | −5 |
| 11001011 | −1 | −7 |
| 11001100 | −3 | −3 |
| 11001101 | −3 | −1 |
| 11001110 | −1 | −3 |
| 11001111 | −1 | −1 |
| 11010000 | −5 | −11 |
| 11010001 | −5 | −9 |
| 11010010 | −7 | −11 |
| 11010011 | −7 | −9 |
| 11010100 | −5 | −13 |
| 11010101 | −5 | −15 |
| 11010110 | −7 | −13 |
| 11010111 | −7 | −15 |
| 11011000 | −3 | −11 |
| 11011001 | −3 | −9 |
| 11011010 | −1 | −11 |
| 11011011 | −1 | −9 |
| 11011100 | −3 | −13 |
| 11011101 | −3 | −15 |
| 11011110 | −1 | −13 |
| 11011111 | −1 | −15 |
| 11100000 | −11 | −5 |
| 11100001 | −11 | −7 |
| 11100010 | −9 | −5 |
| 11100011 | −9 | −7 |
| 11100100 | −11 | −3 |
| 11100101 | −11 | −1 |
| 11100110 | −9 | −3 |
| 11100111 | −9 | −1 |
| 11101000 | −13 | −5 |
| 11101001 | −13 | −7 |
| 11101010 | −15 | −5 |
| 11101011 | −15 | −7 |
| 11101100 | −13 | −3 |
| 11101101 | −13 | −1 |
| 11101110 | −15 | −3 |
| 11101111 | −15 | −1 |
| 11110000 | −11 | −11 |
| 11110001 | −11 | −9 |
| 11110010 | −9 | −11 |
| 11110011 | −9 | −9 |
| 11110100 | −11 | −13 |
| 11110101 | −11 | −15 |
| 11110110 | −9 | −13 |
| 11110111 | −9 | −15 |
| 11111000 | −13 | −11 |
| 11111001 | −13 | −9 |
| 11111010 | −15 | −11 |
| 11111011 | −15 | −9 |
| 11111100 | −13 | −13 |
| 11111101 | −13 | −15 |
| 11111110 | −15 | −13 |
| 11111111 | −15 | −15 |

Spatial Layer Processing Block 305

The spatial layer processing block 305 generates the final complex signal point sequence by applying arithmetic processing based on the first bit sequence to each of the plurality of complex signal points included in the temporary complex signal point sequence generated on the basis of the second bit. Specifically, the spatial layer processing block 305 applies the arithmetic processing selected by the spatial layer selection block 303 to each of the complex signal points included in the complex signal point sequence output from the constellation mapping block 304. The following formula expresses the complex signal point $s_n$ mapped to the spatial layer n after the arithmetic processing is applied by the spatial layer processing block 305.

$$s_n = |Z_n| s'_n \exp(j\theta_n) + C_n \tag{34}$$

Here, $s'_n$ is the complex signal points output from the constellation mapping block 304, and also includes the complex signal points mapped to the spatial layers that are turned off. $Z_n$, $\theta_n$, and $C_n$ are coefficients selected by the spatial layer selection block 303 and used in the arithmetic processing applied in the spatial layer n.

In the spatial layer processing block 305, processing other than the arithmetic processing selected by the spatial layer selection block 303 may also be performed.

Power Allocation

For example, the spatial layer processing block 305 may also perform power allocation with respect to the spatial layers, as indicated in the following formula.

$$s_n = \sqrt{p_n} |Z_n| s'_n \exp(j\theta_n) + C_n \tag{35}$$

Here, $p_n$ is the power allocated to the spatial layer n. As an example, in the case of performing power allocation that accounts for the ratio of on/off spatial layers, $p_n$ may be expressed by the following formula.

$$p_n = \frac{N_{SL}}{\sum_{g=1}^{G} N_{SL,g}} \tag{36}$$

In the case of performing power allocation based on Formula (36) above, the total power and the average power in all of the $N_{SL}$ or $N_{SL,max}$ spatial layers can be equalized. As a result, it is possible to improve the error rate per spatial layer. In other words, in the case where a turned-off spatial layer exist, $p_n$ may adopted such that the relationship in the following formula holds true.

$$p_n > 1 \tag{37}$$

Conversely, in the case where the power of one turned-off spatial layer should be conserved, $p_n$ expressed by the following formula may be adopted.

$$p_n \leq 1 \tag{38}$$

Alternatively, $p_n$ expressed by the following formula may be adopted.

$$p_n = P \tag{39}$$

Here, P is a constant independent of $N_{SL}$, $N_{SL,max}$, and $N_{SL,g}$.

Other Processing

After the above processing is performed by the spatial layer processing block 305, additional processing such as modulation using the precoding matrices described above, precoding processing arising from MIMO channel characteristics, beamforming processing, transmission-side channel equalization processing arising from the radio wave propagation characteristics, and/or transmission-side power allocation processing may be performed.

Spatial Mapping Block 306

The spatial mapping block 306 maps the complex signal point sequence output from the spatial layer processing block 305 to the spatial layers.

(2) Considerations

According to the signal processing described above, the number of bits $N_B$ that can be carried by one complex signal point sequence mapped to $N_{SL}$ or $N_{SL,max}$ spatial layers is expressed by the following formula.

$$N_B = N_{B,CM} + N_{B,SM} + N_{B,P} \quad (40)$$

Note that the number of bits $N_B$ corresponds to the number of bits in the bit sequence input into the bit selection block 302.

Here, the value of the number of bits $m_g$ per complex signal point that can be carried by a complex signal point belonging to the complex signal point set g may be common or different among the G complex signal point sets. The value of $m_g$ affects the value of $N_{B,CM}$ described above.

For example, in the case of accounting for the signaling overhead of the control information, it is desirable for the value of $m_g$ to be common among the plurality of G complex signal point sets. On the other hand, in a situation where factors such as the radio wave propagation environment are also considered and the number of bits $m_g$ (and the modulation level) should be controlled according to the physical resources to which the complex signal points are ultimately mapped, it is desirable for the value of $m_g$ to be different among the G complex signal point sets. The latter case can also be achieved as a part of the setting and notification of the modulation and coding set (MCS) through link adaptation.

(3) Process Flows

An example of the flow of signal processing according to the present example described above will be described with reference to FIG. 24.

Figure 24:
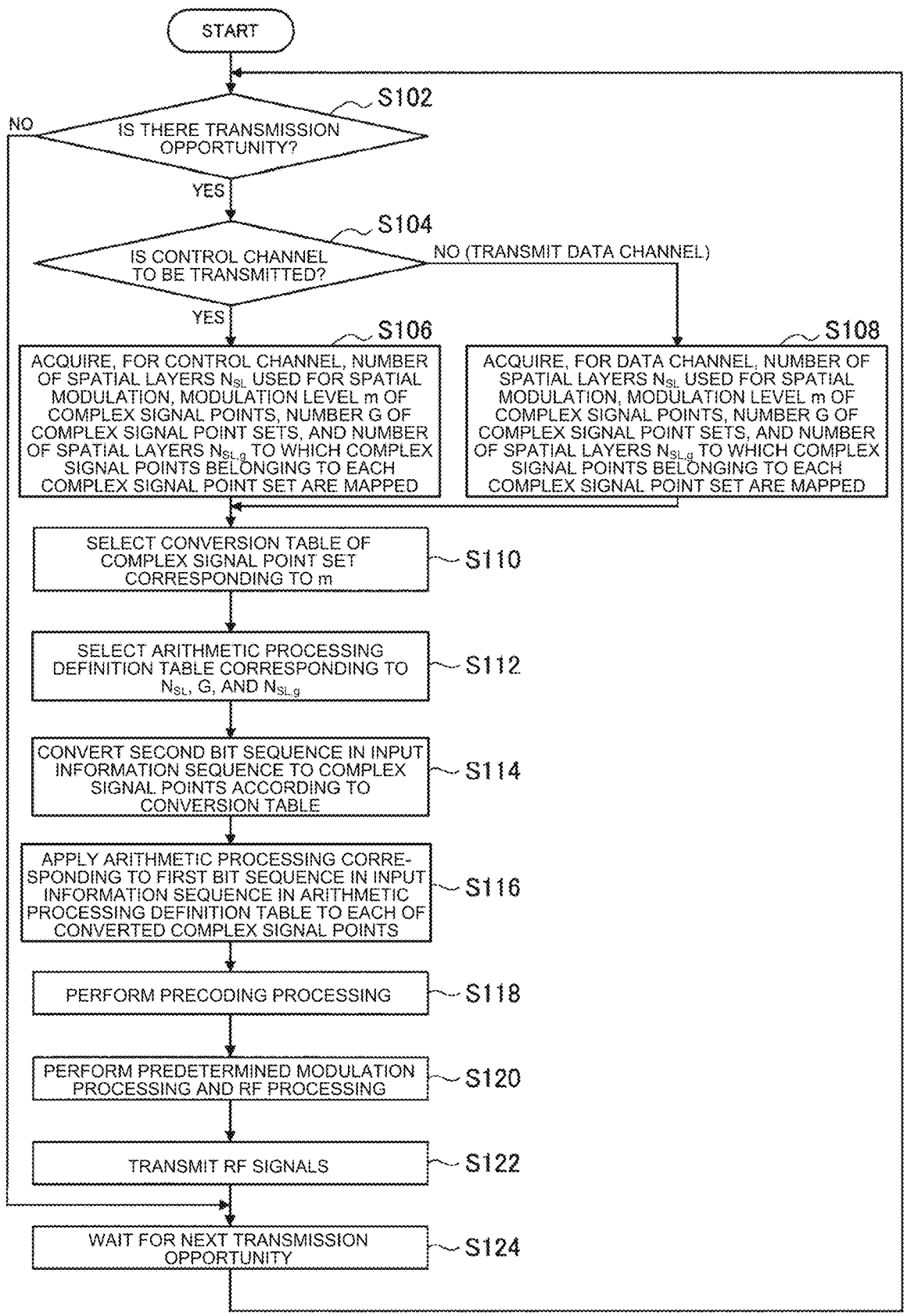
FIG. 24 is a flowchart illustrating an example of the flow of the first example of signal processing by the transmission device according to the embodiment.

FIG. 24 is a flowchart illustrating an example of the flow of the first example of signal processing by the transmission device 100 according to the embodiment. As illustrated in FIG. 24, first, the transmission device 100 determines whether or not a transmission opportunity exists (step S102). In the case of determining that a transmission opportunity exists (S102/YES), the process proceeds to step S104. In the case of determining that a transmission opportunity does not exist (S102/NO), the process proceeds to step S124.

In step S104, the transmission device 100 determines whether or not to transmit the control channel. In the case of determining to transmit the control channel (S104/YES), the process proceeds to step S106. In the case of determining to transmit the data channel (S104/NO), the process proceeds to step S108.

In step S106, the transmission device 100 acquires, for the control channel, the number of spatial layers $N_{SL}$ used for spatial modulation, the modulation level m of the complex signal points, the number G of complex signal point sets, and the number of spatial layers $N_{SL,g}$ to which the complex signal points belonging to each complex signal point set are mapped. After that, the process proceeds to step S110.

In step S108, the transmission device 100 acquires, for the data channel, the number of spatial layers $N_{SL}$ used for spatial modulation, the modulation level m of the complex signal points, the number G of complex signal point sets, and the number of spatial layers $N_{SL,g}$ to which the complex signal points belonging to each complex signal point set are mapped. After that, the process proceeds to step S110.

In step S110, the transmission device 100 selects the conversion table of the complex signal point set corresponding to m. Next, the transmission device 100 selects the arithmetic processing definition table corresponding to $N_{SL}$, G, and $N_{SL,g}$ (step S112). Next, the transmission device 100 converts the second bit sequence in the input information sequence into complex signal points according to the conversion table selected in step S110 (step S114). Next, the transmission device 100 applies arithmetic processing corresponding to the first bit sequence in the input information sequence in the arithmetic processing definition table selected in step S112 to each of the converted complex signal points (step S116). Note that the complex signal point sequence is mapped to spatial layers before or after the arithmetic processing. Next, the transmission device 100 performs precoding processing (step S118).

After that, the transmission device 100 performs predetermined modulation processing and RF processing (step S120). Thereafter, the transmission device 100 transmits RF signals (step S122). After that, the transmission device 100 waits for the next transmission opportunity (step S124).

3.2.2.3.2. Second Example

The present example is one that converts the second bit sequence into complex signal points using a complex signal point set corresponding to the first bit sequence, and maps the complex signal points to spatial layers.

(1) Exemplary Configuration

Figure 25:
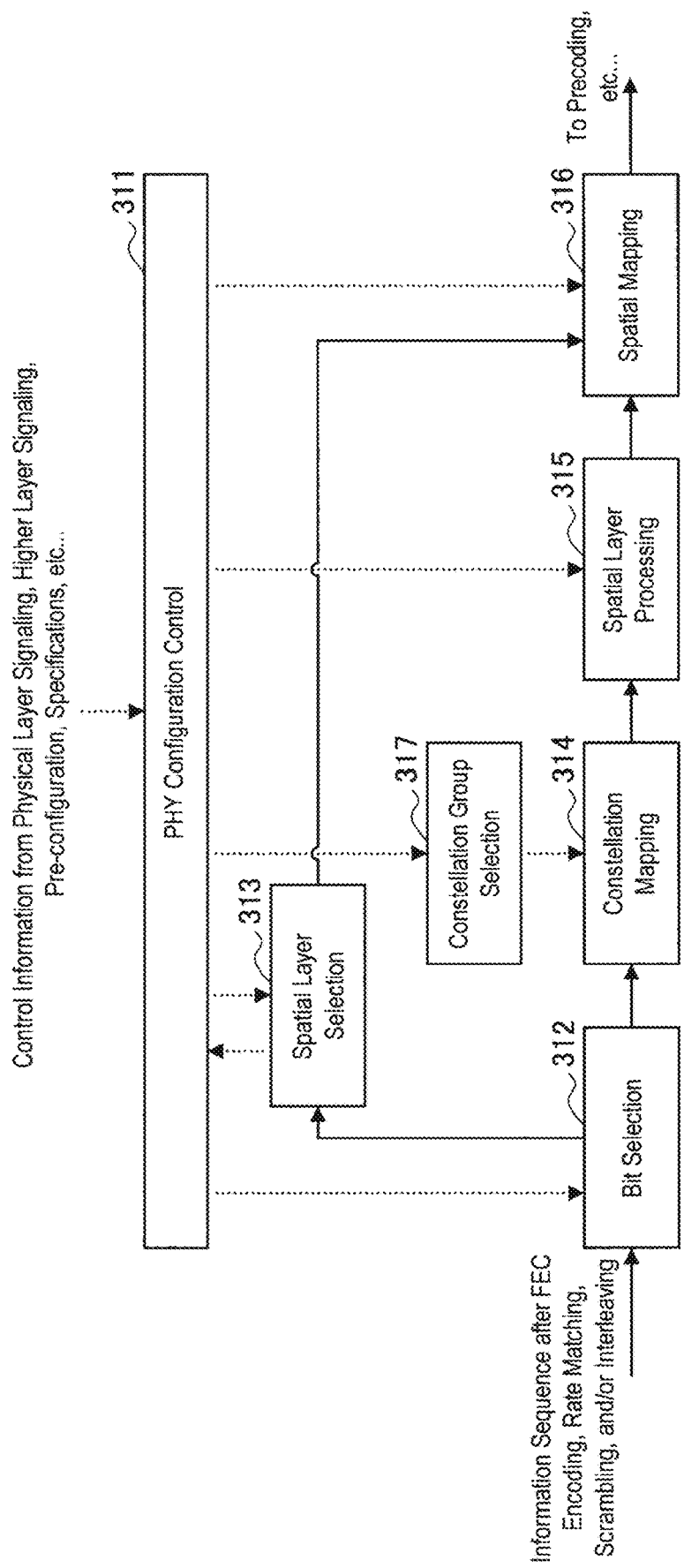
FIG. 25 is a block diagram for explaining a second example of signal processing by the transmission device according to the embodiment.

FIG. 25 is a block diagram for explaining a second example of signal processing by the transmission device 100 according to the present embodiment. FIG. 25 illustrates in detail a specific example of the signal processing by the joint constellation mapping and spatial mapping block 33 among the signal processing illustrated in FIG. 12. The signal processing illustrated in FIG. 25 includes a physical layer configuration control block 311, a bit selection block 312, a spatial layer selection block 313, a constellation mapping block 314, a spatial layer processing block 315, a spatial mapping block 316, and the constellation group selection block 317. Referring to FIG. 25, a bit sequence obtained by applying FEC encoding, rate matching, scrambling, and/or interleaving is input, and after the signal processing illustrated in FIG. 25 is applied, processing such as precoding is applied.

Physical Layer Configuration Control Block 311

The physical layer configuration control block 311 has a function similar to the physical layer configuration control block 301 described in the first example.

Bit Selection Block 312

The bit selection block 312 has a function similar to the bit selection block 302 described in the first example.

Spatial Layer Selection Block 313

The spatial layer selection block 313 selects a mapping pattern of the plurality of complex signal point sets to spatial layers according to the first bit sequence selected by the bit selection block 312. This corresponds to designating each of the complex signal point sets to be used to convert from the second bit sequence to each of the complex signal points mapped to the $N_{SL}$ (or $N_{SL,max}$) spatial layers. Note that the complex signal point sets that are actually used for conversion are selected (generated) by a constellation group selection block 317 described later.

For example, in the case where $N_{SL}=4$, $G=2$, $N_{SL,1}=1$, and $N_{SL,2}=3$, the relationship between the first bit sequence and complex signal point set applied to the second bit sequence is defined by the complex signal point set designation table illustrated in Table 12 below for example. The complex signal point set designation table may be designated by the physical layer configuration control block 311.

TABLE 12

Example of complex signal point set designation table ($N_{SL} = 4$, $G = 2$, $N_{SL,1} = 1$, $N_{SL,2} = 3$)

| First bit sequence | | Complex signal point set used for conversion to complex signal points mapped to spatial layers #1 to #4 | | | | Supplement |
|---|---|---|---|---|---|---|
| Bit 1 | Bit 2 | #1 | #2 | #3 | #4 | |
| 0 | 0 | Complex signal point set g1 | Complex signal point set g2 | Complex signal point set g2 | Complex signal point set g2 | |
| 0 | 0 | Complex signal point set g2 | Complex signal point set g1 | Complex signal point set g2 | Complex signal point set g2 | |
| 1 | 0 | Complex signal point set g2 | Complex signal point set g2 | Complex signal point set g1 | Complex signal point set g2 | |
| 1 | 1 | Complex signal point set g2 | Complex signal point set g2 | Complex signal point set g2 | Complex signal point set g1 | |

For another example, in the case where $N_{SL}=4$, $G=2$, $N_{SL,1}=2$, and $N_{SL,2}=2$, the relationship between the first bit sequence and complex signal point set applied to the second bit sequence is defined by the complex signal point set designation table illustrated in Table 13 below for example. The complex signal point set designation table may be designated by the physical layer configuration control block 311.

TABLE 13

Example of complex signal point set designation table ($N_{SL} = 4$, $G = 2$, $N_{SL,1} = 2$, $N_{SL,2} = 2$)

| First bit sequence | | Complex signal point set used for conversion to complex signal points mapped to spatial layers #1 to #4 | | | | Supplement |
|---|---|---|---|---|---|---|
| Bit 1 | Bit 2 | #1 | #2 | #3 | #4 | |
| 0 | 0 | Complex signal point set g1 | Complex signal point set g2 | Complex signal point set g2 | Complex signal point set g2 | |
| 0 | 0 | Complex signal point set g1 | Complex signal point set g2 | Complex signal point set g1 | Complex signal point set g2 | |
| 1 | 0 | Complex signal point set g1 | Complex signal point set g2 | Complex signal point set g2 | Complex signal point set g1 | |
| 1 | 1 | Complex signal point set g2 | Complex signal point set g1 | Complex signal point set g2 | Complex signal point set g1 | |
| N/A | N/A | Complex signal point set g2 | Complex signal point set g1 | Complex signal point set g1 | Complex signal point set g2 | These combinations are not actually used and do not have to be defined. |
| N/A | N/A | Complex signal point set g2 | Complex signal point set g2 | Complex signal point set g1 | Complex signal point set g1 | |

For another example, in the case where $N_{SL}=4$, $G=2$, $N_{SL,1}=2$, and $N_{SL,2}=1$, the relationship between the first bit sequence and complex signal point set applied to the second bit sequence is defined by the complex signal point set designation table illustrated in Table 14 below for example. At this point, resource elements that are turned off may be achieved by applying a complex signal point set containing only zero (0+j0) as an element (for example g0, corresponding to m=0). The complex signal point set designation table may be designated by the physical layer configuration control block 311.

TABLE 14

Example of complex signal point set designation table ($N_{SL}$ = 4, G = 2, $N_{SL,1}$ = 2, $N_{SL,2}$ = 1)

| First bit sequence | | | Complex signal point set used for conversion to complex signal points mapped to spatial layers #1 to #4 | | | | |
|---|---|---|---|---|---|---|---|
| Bit 1 | Bit 2 | Bit 3 | #1 | #2 | #3 | #4 | Supplement |
| 0 | 0 | 0 | Complex signal point set g1 | Complex signal point set g1 | Complex signal point set g2 | Complex signal point set g0 | |
| 0 | 0 | 1 | Complex signal point set g1 | Complex signal point set g1 | Complex signal point set g0 | Complex signal point set g2 | |
| 0 | 1 | 0 | Complex signal point set g1 | Complex signal point set g2 | Complex signal point set g1 | Complex signal point set g0 | |
| 0 | 1 | 1 | Complex signal point set g1 | Complex signal point set g0 | Complex signal point set g1 | Complex signal point set g2 | |
| 1 | 0 | 0 | Complex signal point set g1 | Complex signal point set g2 | Complex signal point set g0 | Complex signal point set g1 | |
| 1 | 0 | 1 | Complex signal point set g1 | Complex signal point set g0 | Complex signal point set g2 | Complex signal point set g1 | |
| 1 | 1 | 0 | Complex signal point set g2 | Complex signal point set g1 | Complex signal point set g0 | Complex signal point set g1 | |
| 1 | 1 | 1 | Complex signal point set g0 | Complex signal point set g1 | Complex signal point set g2 | Complex signal point set g1 | |
| N/A | N/A | N/A | Complex signal point set g2 | Complex signal point set g1 | Complex signal point set g1 | Complex signal point set g0 | These combinations are not actually used and do not have to be defined. |
| N/A | N/A | N/A | Complex signal point set g0 | Complex signal point set g1 | Complex signal point set g1 | Complex signal point set g2 | |
| N/A | N/A | N/A | Complex signal point set g2 | Complex signal point set g0 | Complex signal point set g1 | Complex signal point set g1 | |
| N/A | N/A | N/A | Complex signal point set g0 | Complex signal point set g2 | Complex signal point set g1 | Complex signal point set g1 | |

Constellation Group Selection Block 317

The constellation group selection block 317 generates or selects the plurality of complex signal point sets selected by the spatial layer selection block 313, and outputs to the constellation mapping block 314.

In the case of generating the complex signal point sets, the constellation group selection block 317 may generate the plurality of complex signal point sets by applying common arithmetic processing to each of the elements in the complex signal point set that serves as the base. The arithmetic processing to be applied may be processing such as the amplitude change, the phase rotation, and/or the linear shift described in the first example. An element $s_{g,a}$ of the complex signal point set g generated by the constellation group selection block 317 is expressed using an element $s_{b,a}$ of the complex signal point that serves as the base according to the following formula.

$$s_{g,a} = |Z_{g,b}| s_{b,a} \exp(j\theta_{g,b}) + C_{g,b}$$

$$a = 1, K, 2^{m_g} \quad (41)$$

The values of Z, θ, and C are the amounts of amplitude, phase, and linear shift converted from the elements of the complex signal point set that serves as the base. These values may be defined in a change amount designation table as illustrated in Table 15 below, for example, and may be used by the constellation group selection block 317. The change amount designation table may also be defined for each value of the number G of complex signal point sets used for modulation and each type of complex signal point set that serves as the base (for example, defined by properties such as FSK/ASK/PSK/QAM and the value of m). As the complex signal point set that serves as the base, the complex signal point sets or subsets of the modulation method illustrated in Tables 7 to 11 may be used, for example.

TABLE 15

Example of change amount designation table

| | Complex signal point set g1 | Complex signal point set g2 | Complex signal point set g3 | Complex signal point set g4 |
|---|---|---|---|---|
| Amplitude | $Z_{g1,b}$ | $Z_{g2,b}$ | $Z_{g3,b}$ | $Z_{g4,b}$ |
| Phase | $\theta_{g1,b}$ | $\theta_{g2,b}$ | $\theta_{g3,b}$ | $\theta_{g4,b}$ |
| Linear shift | $C_{g1,b}$ | $C_{g2,b}$ | $C_{g3,b}$ | $C_{g4,b}$ |

At this point, in the case of attempting to generate G (where G>1) complex signal point sets by characterization according to the amount of phase change, it is desirable for the difference between any two different values of θ in the change amount designation table to be an integer multiple of π/G radians. For example, if G=2, it is desirable for the difference between values of θ to be an integer multiple of π/2 radians, and if G=4, it is desirable for the difference between values of θ to be an integer multiple of π/4 radians.

Also, in the case of attempting to generate G (where G>1) complex signal point sets by characterization according to the amount of linear shift, and in the case where the value of G is an even number, it is desirable for a predetermined condition related to C to be satisfied in the change amount designation table. Specifically, it is desirable for the change amount designation table to have at least one of two Cs in a relationship such that only the positive or negative sign of the real part is different, two Cs in a relationship such that only the positive or negative sign of the imaginary part is different (that is, a conjugate relationship), or two Cs in a relationship such that the positive or negative signs of the real part and the imaginary part are different (that is, a −1× relationship).

Constellation Mapping Block 314

The constellation mapping block 314 converts the second bit sequence into a complex signal point sequence containing the complex signal points selected from each of the plurality of complex signal point sets on the basis of the spatial mapping pattern of the plurality of complex signal point sets selected on the basis of the first bit sequence. Specifically, the constellation mapping block 314 generates the complex signal point sequence by converting the second bit sequence into complex signal points on the basis of the plurality of complex signal point sets generated or selected by the constellation group selection block 317. The second bit sequence is converted into a complex signal point for every m-bit partial sequence, or in other words at each position of a resource element. At this time, the constellation mapping block 314 converts each m-bit partial sequence into a complex signal point using the complex signal point set designated by the spatial layer selection block 313 from among the plurality of complex signal point sets generated or selected by the constellation group selection block 317.

Spatial Layer Processing Block 315

Unlike the spatial layer processing block 305 in the first example, the spatial layer processing block 315 does not perform arithmetic processing for characterizing the plurality of complex signal point sets. This is because in the modulation by the constellation mapping block 314, the complex signal point sets are already characterized.

On the other hand, after the above processing is performed by the spatial layer processing block 315, additional processing such as modulation using the precoding matrices described above, precoding processing arising from MIMO channel characteristics, beamforming processing, transmission-side channel equalization processing arising from the radio wave propagation characteristics, and/or transmission-side power allocation processing may be performed.

Spatial Mapping Block 316

The spatial mapping block 316 maps the complex signal point sequence output from the spatial layer processing block 315 to the spatial layers.

(2) Considerations

According to the signal processing described above, the number of bits $N_B$ that can be imposed on the complex signal point sequences mapped to $N_{SL}$ or $N_{SL,max}$ spatial layers is expressed by the following formula.

$$N_B = N_{B,CM} + N_{B,SM} + N_{B,P} \quad (42)$$

Note that the number of bits $N_B$ corresponds to the number of bits in the bit sequence input into the bit selection block 312.

Here, the value of the number of bits $m_g$ per complex signal point that can be carried by a complex signal point belonging to the complex signal point set g may be common or different among a plurality of the complex signal point sets used for modulation. The value of $m_g$ affects the value of $N_{B,CM}$ described above.

For example, in the case of accounting for the signaling overhead of the control information, it is desirable for the value of $m_g$ to be common among the plurality of complex signal point sets used for modulation. On the other hand, in a situation where factors such as the radio wave propagation environment are also considered and the number of bits $m_g$ (and the modulation level) should be controlled according to the physical resources to which the complex signal points are ultimately mapped, it is desirable for the value of $m_g$ to be different among the complex signal point sets used for modulation. The latter case can also be achieved as a part of the setting and notification of the modulation and coding set (MCS) through link adaptation.

(3) Process Flows

An example of the flow of signal processing according to the present example described above will be described with reference to FIG. 26.

Figure 26:
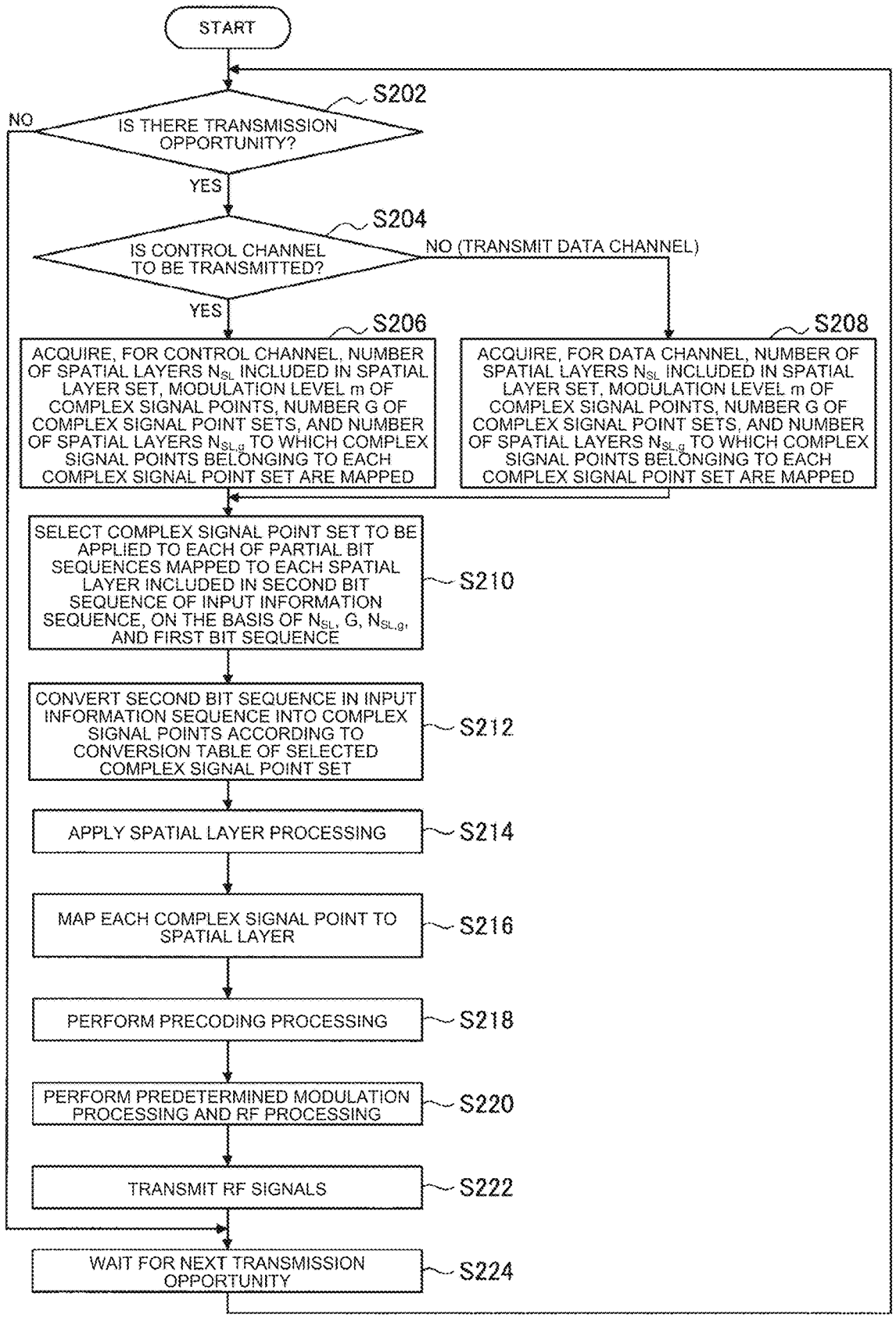
FIG. 26 is a flowchart illustrating an example of the flow of the second example of signal processing by the transmission device according to the embodiment.

FIG. 26 is a flowchart illustrating an example of the flow of the second example of signal processing by the transmission device 100 according to the embodiment. The processing according to steps S202 to S208 is similar to the processing according to steps S102 to S108 in FIG. 24.

In step S210, the transmission device 100 selects the complex signal point set to be applied to each of the partial bit sequences mapped to each spatial layer included in the second bit sequence of the input information sequence, on the basis of $N_{SL}$, G, $N_{SL,g}$, and the first bit sequence. Next, the transmission device 100 converts the second bit sequence in the input information sequence into complex signal points according to the complex signal point set conversion table selected in step S210 (step S212). Next, the transmission device 100 applies spatial layer processing (step S214). Thereafter, the transmission device 100 maps each of the complex signal points after the spatial layer processing to a spatial layer (step S216). Next, the transmission device 100 performs precoding processing (step S218).

After that, the transmission device 100 performs predetermined modulation processing and RF processing (step S220). Thereafter, the transmission device 100 transmits RF signals (step S222). After that, the transmission device 100 waits for the next transmission opportunity (step S224).

3.2.2.3.3. Third Example

The present example is one that predefines a correspondence relationship between candidates of the input information sequence (the first bit sequence and the second bit sequence) and the complex signal point sequence, and references the correspondence relationship to convert the input information sequence into a complex signal point sequence. In the present example, the characterization of the complex signal point sets, the conversion into complex signal points, and the mapping to spatial layers are performed all together.

(1) Exemplary Configuration

Figure 27:
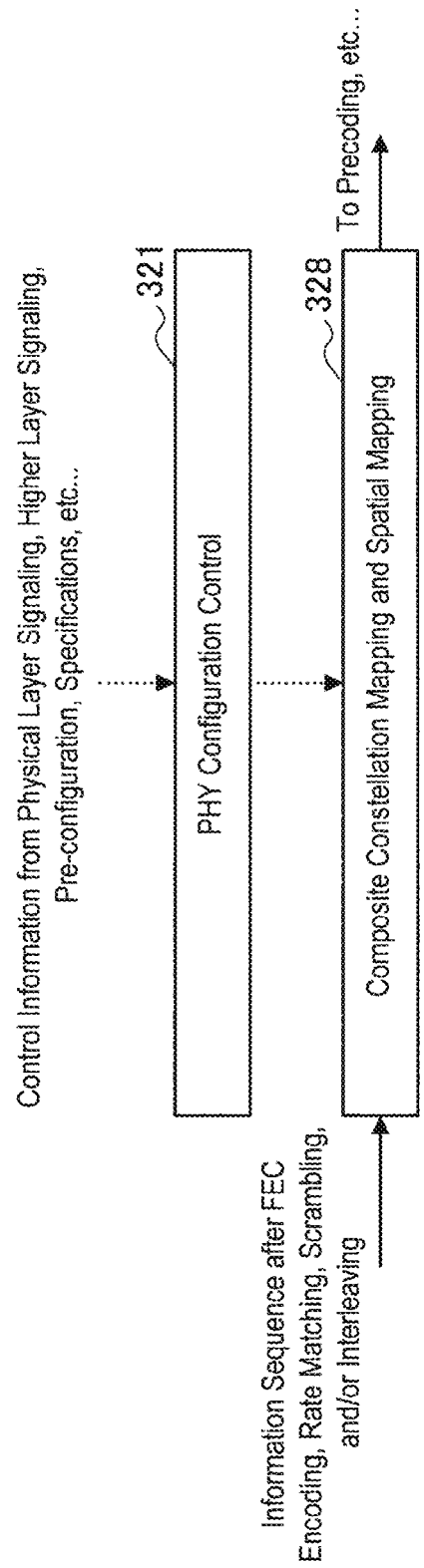
FIG. 27 is a block diagram for explaining a third example of signal processing by the transmission device according to the embodiment.

FIG. 27 is a block diagram for explaining a third example of signal processing by the transmission device 100 according to the present embodiment. FIG. 27 illustrates in detail a specific example of the signal processing by the joint constellation mapping and spatial mapping block 33 among the signal processing illustrated in FIG. 12. The signal processing illustrated in FIG. 27 includes a physical layer configuration control block 321, and the composite constellation mapping and spatial mapping block 328. Referring to FIG. 27, a bit sequence obtained by applying FEC encoding, rate matching, scrambling, and/or interleaving is input, and after the signal processing illustrated in FIG. 27 is applied, processing such as precoding is applied.

Physical Layer Configuration Control Block 321

The physical layer configuration control block 321 has a function similar to the physical layer configuration control block 301 described in the first example.

Particularly, the physical layer configuration control block 321 outputs, to the composite constellation mapping and spatial mapping block 328, a conversion table defining a correspondence relationship between candidates of the input information sequence, which correspond to parameters such as $N_{SL}$, $N_{SL,max}$, G, $N_{SL,g}$, m, and $m_g$, and candidates of the complex signal sequence. For example, the physical layer configuration control block 321 selects and outputs a conversion table corresponding to parameters such as $N_{SL}$, G, $N_{SL,g}$, m, and $m_g$ from among a plurality of conversion tables stored in advance. The conversion table is a table defining the relationship between an input information sequence input into the composite constellation mapping and spatial mapping block 328 and the complex signal point sequence to be output.

It is desirable for the content of the conversion table to similarly have characteristics such as the characterizations of the complex signal point sets described in the first and second examples. In addition, it is desirable for the conversion table to have the three characteristics described below. The first characteristic is that, if the conversion table is viewed a row at a time, the candidates of the complex signal sequence in the conversion table do not include zero elements, or the number of zero elements is equal to or less than the number of non-zero elements. The second characteristic is that, if the conversion table is viewed a row at a time (that is, one output with respect to the input information sequence at a time), the candidates of the complex signal sequence in the conversion table include different values of at least two or more types, or a combination of different non-zero values of at least two or more types. The third characteristic is that, if the conversion table is viewed a column at a time (that is, a spatial layer at a time), the occurrence probabilities of each of the complex signal points are unequal, or the occurrence probabilities of non-zero elements are unequal.

Hereinafter, an example of conversion tables will be described with reference to Tables 16 to 18.

First, Table 16 illustrates an example of a conversion table for converting a 6-bit input information sequence into a complex signal point sequence containing four complex signal points s1 to s4 mapped to four spatial layers. In Table 16, a complex signal point set g1 contains {+1, −1} as elements, and a complex signal point set g2 contains {+j, −j} as elements.

TABLE 16

Example of conversion table
($N_{SL} = 4$, $G = 2$, $N_{SL,1} = 1$, $N_{SL,2} = 3$, $m_1 = 1$, $m_2 = 1$)

| Input Bits | | | | | | Output Complex Values 1 | | 2 | | 3 | | 4 | |
|---|---|---|---|---|---|---|---|---|---|---|---|---|---|
| 1 | 2 | 3 | 4 | 5 | 6 | Complex Value s1 | (Group Index) | Complex Value s2 | (Group Index) | Complex Value s3 | (Group Index) | Complex Value s4 | (Group Index) |
| 0 | 0 | 0 | 0 | 0 | 0 | −1 | g1 | −j | g2 | −j | g2 | −j | g2 |
| 0 | 0 | 0 | 0 | 0 | 1 | −1 | g1 | −j | g2 | −j | g2 | +j | g2 |
| 0 | 0 | 0 | 0 | 1 | 0 | −1 | g1 | −j | g2 | +j | g2 | −j | g2 |
| 0 | 0 | 0 | 0 | 1 | 1 | −1 | g1 | −j | g2 | +j | g2 | +j | g2 |
| 0 | 0 | 0 | 1 | 0 | 0 | −1 | g1 | +j | g2 | −j | g2 | −j | g2 |
| 0 | 0 | 0 | 1 | 0 | 1 | −1 | g1 | +j | g2 | −j | g2 | +j | g2 |
| 0 | 0 | 0 | 1 | 1 | 0 | −1 | g1 | +j | g2 | +j | g2 | −j | g2 |
| 0 | 0 | 0 | 1 | 1 | 1 | −1 | g1 | +j | g2 | +j | g2 | +j | g2 |
| 0 | 0 | 1 | 0 | 0 | 0 | +1 | g1 | −j | g2 | −j | g2 | −j | g2 |
| 0 | 0 | 1 | 0 | 0 | 1 | +1 | g1 | −j | g2 | −j | g2 | +j | g2 |
| 0 | 0 | 1 | 0 | 1 | 0 | +1 | g1 | −j | g2 | +j | g2 | −j | g2 |
| 0 | 0 | 1 | 0 | 1 | 1 | +1 | g1 | −j | g2 | +j | g2 | +j | g2 |
| 0 | 0 | 1 | 1 | 0 | 0 | +1 | g1 | +j | g2 | −j | g2 | −j | g2 |
| 0 | 0 | 1 | 1 | 0 | 1 | +1 | g1 | +j | g2 | −j | g2 | +j | g2 |
| 0 | 0 | 1 | 1 | 1 | 0 | +1 | g1 | +j | g2 | +j | g2 | −j | g2 |
| 0 | 0 | 1 | 1 | 1 | 1 | +1 | g1 | +j | g2 | +j | g2 | +j | g2 |
| 0 | 1 | 0 | 0 | 0 | 0 | −j | g2 | −1 | g1 | −j | g2 | −j | g2 |
| 0 | 1 | 0 | 0 | 0 | 1 | −j | g2 | −1 | g1 | −j | g2 | +j | g2 |
| 0 | 1 | 0 | 0 | 1 | 0 | −j | g2 | −1 | g1 | +j | g2 | −j | g2 |
| 0 | 1 | 0 | 0 | 1 | 1 | −j | g2 | −1 | g1 | +j | g2 | +j | g2 |
| 0 | 1 | 0 | 1 | 0 | 0 | −j | g2 | +1 | g1 | −j | g2 | −j | g2 |
| 0 | 1 | 0 | 1 | 0 | 1 | −j | g2 | +1 | g1 | −j | g2 | +j | g2 |
| 0 | 1 | 0 | 1 | 1 | 0 | −j | g2 | +1 | g1 | +j | g2 | −j | g2 |
| 0 | 1 | 0 | 1 | 1 | 1 | −j | g2 | +1 | g1 | +j | g2 | +j | g2 |
| 0 | 1 | 1 | 0 | 0 | 0 | +j | g2 | −1 | g1 | −j | g2 | −j | g2 |
| 0 | 1 | 1 | 0 | 0 | 1 | +j | g2 | −1 | g1 | −j | g2 | +j | g2 |
| 0 | 1 | 1 | 0 | 1 | 0 | +j | g2 | −1 | g1 | +j | g2 | −j | g2 |
| 0 | 1 | 1 | 0 | 1 | 1 | +j | g2 | −1 | g1 | +j | g2 | +j | g2 |
| 0 | 1 | 1 | 1 | 0 | 0 | +j | g2 | +1 | g1 | −j | g2 | −j | g2 |
| 0 | 1 | 1 | 1 | 0 | 1 | +j | g2 | +1 | g1 | −j | g2 | +j | g2 |
| 0 | 1 | 1 | 1 | 1 | 0 | +j | g2 | +1 | g1 | +j | g2 | −j | g2 |
| 0 | 1 | 1 | 1 | 1 | 1 | +j | g2 | +1 | g1 | +j | g2 | +j | g2 |
| 1 | 0 | 0 | 0 | 0 | 0 | −j | g2 | −j | g2 | −1 | g1 | −j | g2 |
| 1 | 0 | 0 | 0 | 0 | 1 | −j | g2 | −j | g2 | −1 | g1 | +j | g2 |
| 1 | 0 | 0 | 0 | 1 | 0 | −j | g2 | −j | g2 | +1 | g1 | −j | g2 |
| 1 | 0 | 0 | 0 | 1 | 1 | −j | g2 | −j | g2 | +1 | g1 | +j | g2 |
| 1 | 0 | 0 | 1 | 0 | 0 | −j | g2 | +j | g2 | −1 | g1 | −j | g2 |
| 1 | 0 | 0 | 1 | 0 | 1 | −j | g2 | +j | g2 | −1 | g1 | +j | g2 |
| 1 | 0 | 0 | 1 | 1 | 0 | −j | g2 | +j | g2 | +1 | g1 | −j | g2 |
| 1 | 0 | 0 | 1 | 1 | 1 | −j | g2 | +j | g2 | +1 | g1 | +j | g2 |
| 1 | 0 | 1 | 0 | 0 | 0 | +j | g2 | −j | g2 | −1 | g1 | −j | g2 |
| 1 | 0 | 1 | 0 | 0 | 1 | +j | g2 | −j | g2 | −1 | g1 | +j | g2 |
| 1 | 0 | 1 | 0 | 1 | 0 | +j | g2 | −j | g2 | +1 | g1 | −j | g2 |
| 1 | 0 | 1 | 0 | 1 | 1 | +j | g2 | −j | g2 | +1 | g1 | +j | g2 |
| 1 | 0 | 1 | 1 | 0 | 0 | +j | g2 | +j | g2 | −1 | g1 | −j | g2 |
| 1 | 0 | 1 | 1 | 0 | 1 | +j | g2 | +j | g2 | −1 | g1 | +j | g2 |
| 1 | 0 | 1 | 1 | 1 | 0 | +j | g2 | +j | g2 | +1 | g1 | −j | g2 |
| 1 | 0 | 1 | 1 | 1 | 1 | +j | g2 | +j | g2 | +1 | g1 | +j | g2 |
| 1 | 1 | 0 | 0 | 0 | 0 | −j | g2 | −j | g2 | −j | g2 | −1 | g1 |
| 1 | 1 | 0 | 0 | 0 | 1 | −j | g2 | −j | g2 | −j | g2 | +1 | g1 |
| 1 | 1 | 0 | 0 | 1 | 0 | −j | g2 | −j | g2 | +j | g2 | −1 | g1 |
| 1 | 1 | 0 | 0 | 1 | 1 | −j | g2 | −j | g2 | +j | g2 | +1 | g1 |
| 1 | 1 | 0 | 1 | 0 | 0 | −j | g2 | +j | g2 | −j | g2 | −1 | g1 |
| 1 | 1 | 0 | 1 | 0 | 1 | −j | g2 | +j | g2 | −j | g2 | +1 | g1 |
| 1 | 1 | 0 | 1 | 1 | 0 | −j | g2 | +j | g2 | +j | g2 | −1 | g1 |
| 1 | 1 | 0 | 1 | 1 | 1 | −j | g2 | +j | g2 | +j | g2 | +1 | g1 |
| 1 | 1 | 1 | 0 | 0 | 0 | +j | g2 | −j | g2 | −j | g2 | −1 | g1 |
| 1 | 1 | 1 | 0 | 0 | 1 | +j | g2 | −j | g2 | −j | g2 | +1 | g1 |
| 1 | 1 | 1 | 0 | 1 | 0 | +j | g2 | −j | g2 | +j | g2 | −1 | g1 |
| 1 | 1 | 1 | 0 | 1 | 1 | +j | g2 | −j | g2 | +j | g2 | +1 | g1 |
| 1 | 1 | 1 | 1 | 0 | 0 | +j | g2 | +j | g2 | −j | g2 | −1 | g1 |
| 1 | 1 | 1 | 1 | 0 | 1 | +j | g2 | +j | g2 | −j | g2 | +1 | g1 |
| 1 | 1 | 1 | 1 | 1 | 0 | +j | g2 | +j | g2 | +j | g2 | −1 | g1 |
| 1 | 1 | 1 | 1 | 1 | 1 | +j | g2 | +j | g2 | +j | g2 | +1 | g1 |

Here, the "(Group Index)" column in Table 16 indicates the index (g1 or g2) of the complex signal point set for reference, and the conversion table does not have to include such a column. Also, the complex signal point value columns (columns such as "Complex Value s1") in Table 16 may be also be expressed divided between the real part (I axis) and the imaginary part (Q part). For example, +1 may be expressed as I=+1 and Q=0, while −j may be expressed as I=0 and Q=−1.

Referring to Table 16, the initial two bits of the input information sequence (the columns "1" and "2" of "Input Bits") are the first bits. For this reason, the initial two bits of the input information sequence correspond to the mapping pattern of the plurality of complex signal point sets used in modulation to spatial layers. Specifically, if the initial two bits of the input information sequence are "00", the mapping pattern is g1, g2, g2, g2. If the initial two bits of the input information sequence are "01", the mapping pattern is g2, g1, g2, g2. If the initial two bits of the input information sequence are "10", the mapping pattern is g2, g2, g1, g2. If the initial two bits of the input information sequence are "11", the mapping pattern is g2, g2, g2, g1.

Referring to Table 16, the remaining four bits of the input information sequence (the columns "3", "4", "5", and "6" of "Input Bits") are the second bits. Specifically, the 3rd bit of the input information sequence is converted into the 1st complex signal point of the complex signal point sequence. The 4th bit of the input information sequence is converted into the 2nd complex signal point of the complex signal point sequence. The 5th bit of the input information sequence is converted into the 3rd complex signal point of the complex signal point sequence. The 6th bit of the input information sequence is converted into the 4th complex signal point of the complex signal point sequence.

The conversion table illustrated in Table 16 does not contain a zero element in any row, and therefore has the first characteristic above. The conversion table illustrated in Table 16 contains a combination of two different types of values such as $\{+1, +j\}$, $\{+1, -j\}$, $\{-1, +j\}$, or $\{-1, -j\}$ in every row, and therefore has the second characteristic above. In the conversion table illustrated in Table 16, the occurrence probability of $\{+1, -1\}$ is lower than the occurrence probability of $\{+j, -j\}$ in every column, and therefore the conversion table illustrated in Table 16 has the third characteristic above.

Next, Table 17 illustrates an example of other conversion tables for converting a 6-bit input information sequence into a complex signal point sequence containing four complex signal points s1 to s4 mapped to four spatial layers. In Table 17, a complex signal point set g1 contains $\{+1, -1\}$ as elements, and a complex signal point set g2 contains $\{+j, -j\}$ as elements.

TABLE 17

Example of conversion table
($N_{SL} = 4$, $G = 2$, $N_{SL,1} = 2$, $N_{SL,2} = 2$, $m_1 = 1$, $m_2 = 1$)

| Input Bits | | | | | | Output Complex Values | | | | | | | |
|---|---|---|---|---|---|---|---|---|---|---|---|---|---|
| | | | | | | 1 | | 2 | | 3 | | 4 | |
| 1 | 2 | 3 | 4 | 5 | 6 | Complex Value s1 | (Group Index) | Complex Value s2 | (Group Index) | Complex Value s3 | (Group Index) | Complex Value s4 | (Group Index) |
| 0 | 0 | 0 | 0 | 0 | 0 | −1 | g1 | −1 | g1 | −j | g2 | −j | g2 |
| 0 | 0 | 0 | 0 | 0 | 1 | −1 | g1 | −1 | g1 | −j | g2 | +j | g2 |
| 0 | 0 | 0 | 0 | 1 | 0 | −1 | g1 | −1 | g1 | +j | g2 | −j | g2 |
| 0 | 0 | 0 | 0 | 1 | 1 | −1 | g1 | −1 | g1 | +j | g2 | +j | g2 |
| 0 | 0 | 0 | 1 | 0 | 0 | −1 | g1 | +1 | g1 | −j | g2 | −j | g2 |
| 0 | 0 | 0 | 1 | 0 | 1 | −1 | g1 | +1 | g1 | −j | g2 | +j | g2 |
| 0 | 0 | 0 | 1 | 1 | 0 | −1 | g1 | +1 | g1 | +j | g2 | −j | g2 |
| 0 | 0 | 0 | 1 | 1 | 1 | −1 | g1 | +1 | g1 | +j | g2 | +j | g2 |
| 0 | 0 | 1 | 0 | 0 | 0 | +1 | g1 | −1 | g1 | −j | g2 | −j | g2 |
| 0 | 0 | 1 | 0 | 0 | 1 | +1 | g1 | −1 | g1 | −j | g2 | +j | g2 |
| 0 | 0 | 1 | 0 | 1 | 0 | +1 | g1 | −1 | g1 | +j | g2 | −j | g2 |
| 0 | 0 | 1 | 0 | 1 | 1 | +1 | g1 | −1 | g1 | +j | g2 | +j | g2 |
| 0 | 0 | 1 | 1 | 0 | 0 | +1 | g1 | +1 | g1 | −j | g2 | −j | g2 |
| 0 | 0 | 1 | 1 | 0 | 1 | +1 | g1 | +1 | g1 | −j | g2 | +j | g2 |
| 0 | 0 | 1 | 1 | 1 | 0 | +1 | g1 | +1 | g1 | +j | g2 | −j | g2 |
| 0 | 0 | 1 | 1 | 1 | 1 | +1 | g1 | +1 | g1 | +j | g2 | +j | g2 |
| 0 | 1 | 0 | 0 | 0 | 0 | −j | g2 | −1 | g1 | −1 | g1 | −j | g2 |
| 0 | 1 | 0 | 0 | 0 | 1 | −j | g2 | −1 | g1 | −1 | g1 | +j | g2 |
| 0 | 1 | 0 | 0 | 1 | 0 | −j | g2 | −1 | g1 | +1 | g1 | −j | g2 |
| 0 | 1 | 0 | 0 | 1 | 1 | −j | g2 | −1 | g1 | +1 | g1 | +j | g2 |
| 0 | 1 | 0 | 1 | 0 | 0 | −j | g2 | +1 | g1 | −1 | g1 | −j | g2 |
| 0 | 1 | 0 | 1 | 0 | 1 | −j | g2 | +1 | g1 | −1 | g1 | +j | g2 |
| 0 | 1 | 0 | 1 | 1 | 0 | −j | g2 | +1 | g1 | +1 | g1 | −j | g2 |
| 0 | 1 | 0 | 1 | 1 | 1 | −j | g2 | +1 | g1 | +1 | g1 | +j | g2 |
| 0 | 1 | 1 | 0 | 0 | 0 | +j | g2 | −1 | g1 | −1 | g1 | −j | g2 |
| 0 | 1 | 1 | 0 | 0 | 1 | +j | g2 | −1 | g1 | −1 | g1 | +j | g2 |
| 0 | 1 | 1 | 0 | 1 | 0 | +j | g2 | −1 | g1 | +1 | g1 | −j | g2 |
| 0 | 1 | 1 | 0 | 1 | 1 | +j | g2 | −1 | g1 | +1 | g1 | +j | g2 |
| 0 | 1 | 1 | 1 | 0 | 0 | +j | g2 | +1 | g1 | −1 | g1 | −j | g2 |
| 0 | 1 | 1 | 1 | 0 | 1 | +j | g2 | +1 | g1 | −1 | g1 | +j | g2 |
| 0 | 1 | 1 | 1 | 1 | 0 | +j | g2 | +1 | g1 | +1 | g1 | −j | g2 |
| 0 | 1 | 1 | 1 | 1 | 1 | +j | g2 | +1 | g1 | +1 | g1 | +j | g2 |
| 1 | 0 | 0 | 0 | 0 | 0 | −1 | g1 | −j | g2 | −1 | g1 | −j | g2 |
| 1 | 0 | 0 | 0 | 0 | 1 | −1 | g1 | −j | g2 | −1 | g1 | +j | g2 |
| 1 | 0 | 0 | 0 | 1 | 0 | −1 | g1 | −j | g2 | +1 | g1 | −j | g2 |
| 1 | 0 | 0 | 0 | 1 | 1 | −1 | g1 | −j | g2 | +1 | g1 | +j | g2 |

TABLE 17-continued

Example of conversion table
($N_{SL} = 4, G = 2, N_{SL,1} = 2, N_{SL,2} = 2, m_1 = 1, m_2 = 1$)

| | | Input Bits | | | | Output Complex Values | | | | | | | |
|---|---|---|---|---|---|---|---|---|---|---|---|---|---|
| | | | | | | 1 | | 2 | | 3 | | 4 | |
| | | | | | | Complex | | Complex | | Complex | | Complex | |
| 1 | 2 | 3 | 4 | 5 | 6 | Value s1 | (Group Index) | Value s2 | (Group Index) | Value s3 | (Group Index) | Value s4 | (Group Index) |
| 1 | 0 | 0 | 1 | 0 | 0 | −1 | g1 | +j | g2 | −1 | g1 | −j | g2 |
| 1 | 0 | 0 | 1 | 0 | 1 | −1 | g1 | +j | g2 | −1 | g1 | +j | g2 |
| 1 | 0 | 0 | 1 | 1 | 0 | −1 | g1 | +j | g2 | +1 | g1 | −j | g2 |
| 1 | 0 | 0 | 1 | 1 | 1 | −1 | g1 | +j | g2 | +1 | g1 | +j | g2 |
| 1 | 0 | 1 | 0 | 0 | 0 | +1 | g1 | −j | g2 | −1 | g1 | −j | g2 |
| 1 | 0 | 1 | 0 | 0 | 1 | +1 | g1 | −j | g2 | −1 | g1 | +j | g2 |
| 1 | 0 | 1 | 0 | 1 | 0 | +1 | g1 | −j | g2 | +1 | g1 | −j | g2 |
| 1 | 0 | 1 | 0 | 1 | 1 | +1 | g1 | −j | g2 | +1 | g1 | +j | g2 |
| 1 | 0 | 1 | 1 | 0 | 0 | +1 | g1 | +j | g2 | −1 | g1 | −j | g2 |
| 1 | 0 | 1 | 1 | 0 | 1 | +1 | g1 | +j | g2 | −1 | g1 | +j | g2 |
| 1 | 0 | 1 | 1 | 1 | 0 | +1 | g1 | +j | g2 | +1 | g1 | −j | g2 |
| 1 | 0 | 1 | 1 | 1 | 1 | +1 | g1 | +j | g2 | +1 | g1 | +j | g2 |
| 1 | 1 | 0 | 0 | 0 | 0 | −1 | g1 | −j | g2 | −j | g2 | −1 | g1 |
| 1 | 1 | 0 | 0 | 0 | 1 | −1 | g1 | −j | g2 | −j | g2 | +1 | g1 |
| 1 | 1 | 0 | 0 | 1 | 0 | −1 | g1 | −j | g2 | +j | g2 | −1 | g1 |
| 1 | 1 | 0 | 0 | 1 | 1 | −1 | g1 | −j | g2 | +j | g2 | +1 | g1 |
| 1 | 1 | 0 | 1 | 0 | 0 | −1 | g1 | +j | g2 | −j | g2 | −1 | g1 |
| 1 | 1 | 0 | 1 | 0 | 1 | −1 | g1 | +j | g2 | −j | g2 | +1 | g1 |
| 1 | 1 | 0 | 1 | 1 | 0 | −1 | g1 | +j | g2 | +j | g2 | −1 | g1 |
| 1 | 1 | 0 | 1 | 1 | 1 | −1 | g1 | +j | g2 | +j | g2 | +1 | g1 |
| 1 | 1 | 1 | 0 | 0 | 0 | +1 | g1 | −j | g2 | −j | g2 | −1 | g1 |
| 1 | 1 | 1 | 0 | 0 | 1 | +1 | g1 | −j | g2 | −j | g2 | +1 | g1 |
| 1 | 1 | 1 | 0 | 1 | 0 | +1 | g1 | −j | g2 | +j | g2 | −1 | g1 |
| 1 | 1 | 1 | 0 | 1 | 1 | +1 | g1 | −j | g2 | +j | g2 | +1 | g1 |
| 1 | 1 | 1 | 1 | 0 | 0 | +1 | g1 | +j | g2 | −j | g2 | −1 | g1 |
| 1 | 1 | 1 | 1 | 0 | 1 | +1 | g1 | +j | g2 | −j | g2 | +1 | g1 |
| 1 | 1 | 1 | 1 | 1 | 0 | +1 | g1 | +j | g2 | +j | g2 | −1 | g1 |
| 1 | 1 | 1 | 1 | 1 | 1 | +1 | g1 | +j | g2 | +j | g2 | +1 | g1 |

Next, Table 18 illustrates an example of a conversion table for converting a 5-bit input information sequence into a complex signal point sequence containing four complex signal points s1 to s4 mapped to four spatial layers. In Table 18, a complex signal point set g1 contains {+1, −1} as elements, a complex signal point set g2 contains {+j, −j} as elements, and a complex signal point set g3 contains {0} as elements.

TABLE 18

Example of conversion table
($N_{SL} = 4, G = 3, N_{SL,1} = 1, N_{SL,2} = 1, N_{SL,3} = 2, m_1 = 1, m_2 = 1, m_3 = 0$)

| | | Input Bits | | | Output Complex Values | | | | | | | |
|---|---|---|---|---|---|---|---|---|---|---|---|---|
| | | | | | 1 | | 2 | | 3 | | 4 | |
| | | | | | Complex | | Complex | | Complex | | Complex | |
| 1 | 2 | 3 | 4 | 5 | Value s1 | (Group Index) | Value s2 | (Group Index) | Value s3 | (Group Index) | Value s4 | (Group Index) |
| 0 | 0 | 0 | 0 | 0 | −1 | g1 | 0 | g3 | 0 | g3 | −j | g2 |
| 0 | 0 | 0 | 0 | 1 | −1 | g1 | 0 | g3 | 0 | g3 | +j | g2 |
| 0 | 0 | 0 | 1 | 0 | +1 | g1 | 0 | g3 | 0 | g3 | −j | g2 |
| 0 | 0 | 0 | 1 | 1 | +1 | g1 | 0 | g3 | 0 | g3 | +j | g2 |
| 0 | 0 | 1 | 0 | 0 | −1 | g1 | 0 | g3 | −j | g2 | 0 | g3 |
| 0 | 0 | 1 | 0 | 1 | −1 | g1 | 0 | g3 | +j | g2 | 0 | g3 |
| 0 | 0 | 1 | 1 | 0 | +1 | g1 | 0 | g3 | −j | g2 | 0 | g3 |
| 0 | 0 | 1 | 1 | 1 | +1 | g1 | 0 | g3 | +j | g2 | 0 | g3 |
| 0 | 1 | 0 | 0 | 0 | −1 | g1 | −j | g2 | 0 | g3 | 0 | g3 |
| 0 | 1 | 0 | 0 | 1 | −1 | g1 | +j | g2 | 0 | g3 | 0 | g3 |
| 0 | 1 | 0 | 1 | 0 | +1 | g1 | −j | g2 | 0 | g3 | 0 | g3 |
| 0 | 1 | 0 | 1 | 1 | +1 | g1 | +j | g2 | 0 | g3 | 0 | g3 |
| 0 | 1 | 1 | 0 | 0 | 0 | g3 | −1 | g1 | 0 | g3 | −j | g2 |
| 0 | 1 | 1 | 0 | 1 | 0 | g3 | −1 | g1 | 0 | g3 | +j | g2 |
| 0 | 1 | 1 | 1 | 0 | 0 | g3 | +1 | g1 | 0 | g3 | −j | g2 |
| 0 | 1 | 1 | 1 | 1 | 0 | g3 | +1 | g1 | 0 | g3 | +j | g2 |
| 1 | 0 | 0 | 0 | 0 | 0 | g3 | −1 | g1 | −j | g2 | 0 | g3 |
| 1 | 0 | 0 | 0 | 1 | 0 | g3 | −1 | g1 | +j | g2 | 0 | g3 |
| 1 | 0 | 0 | 1 | 0 | 0 | g3 | +1 | g1 | −j | g2 | 0 | g3 |

TABLE 18-continued

Example of conversion table
($N_{SL} = 4$, G = 3, $N_{SL,1} = 1$, $N_{SL,2} = 1$, $N_{SL,3} = 2$, $m_1 = 1$, $m_2 = 1$, $m_3 = 0$)

| Input Bits | | | | | Output Complex Values | | | | | | | |
|---|---|---|---|---|---|---|---|---|---|---|---|---|
| | | | | | 1 | | 2 | | 3 | | 4 | |
| 1 | 2 | 3 | 4 | 5 | Complex Value s1 | (Group Index) | Complex Value s2 | (Group Index) | Complex Value s3 | (Group Index) | Complex Value s4 | (Group Index) |
| 1 | 0 | 0 | 1 | 1 | 0 | g3 | +1 | g1 | +j | g2 | 0 | g3 |
| 1 | 0 | 1 | 0 | 0 | −j | g2 | −1 | g1 | 0 | g3 | 0 | g3 |
| 1 | 0 | 1 | 0 | 1 | +j | g2 | −1 | g1 | 0 | g3 | 0 | g3 |
| 1 | 0 | 1 | 1 | 0 | −j | g2 | +1 | g1 | 0 | g3 | 0 | g3 |
| 1 | 0 | 1 | 1 | 1 | +j | g2 | +1 | g1 | 0 | g3 | 0 | g3 |
| 1 | 1 | 0 | 0 | 0 | 0 | g3 | 0 | g3 | −1 | g1 | −j | g2 |
| 1 | 1 | 0 | 0 | 1 | 0 | g3 | 0 | g3 | −1 | g1 | +j | g2 |
| 1 | 1 | 0 | 1 | 0 | 0 | g3 | 0 | g3 | +1 | g1 | −j | g2 |
| 1 | 1 | 0 | 1 | 1 | 0 | g3 | 0 | g3 | +1 | g1 | +j | g2 |
| 1 | 1 | 1 | 0 | 0 | 0 | g3 | −j | g2 | 0 | g3 | −1 | g1 |
| 1 | 1 | 1 | 0 | 1 | 0 | g3 | +j | g2 | 0 | g3 | −1 | g1 |
| 1 | 1 | 1 | 1 | 0 | 0 | g3 | −j | g2 | 0 | g3 | +1 | g1 |
| 1 | 1 | 1 | 1 | 1 | 0 | g3 | +j | g2 | 0 | g3 | +1 | g1 |

In the conversion table illustrated in Table 18, there are two non-zero elements and two zero elements on every row, and therefore the conversion table illustrated in Table 18 has the first characteristic above. The conversion table illustrated in Table 18 contains a combination of two different types of values such as {+1, +j}, {+1, −j}, {−1, +j}, or {−1, −j} in every row, and therefore has the second characteristic above. In the conversion table illustrated in Table 18, the occurrence probabilities of each of the values are unequal in every column, and therefore the conversion table illustrated in Table 18 has the third characteristic above.

Composite Constellation Mapping and Spatial Mapping Block 328

The composite constellation mapping and spatial mapping block 328 converts the input information sequence into a complex signal sequence on the basis of the conversion table acquired from the physical layer configuration control block 321.

Additionally, the composite constellation mapping and spatial mapping block 328 maps the generated complex signal point sequence to spatial layers.

(2) Process Flows

An example of the flow of signal processing according to the present example described above will be described with reference to FIG. 28.

Figure 28:
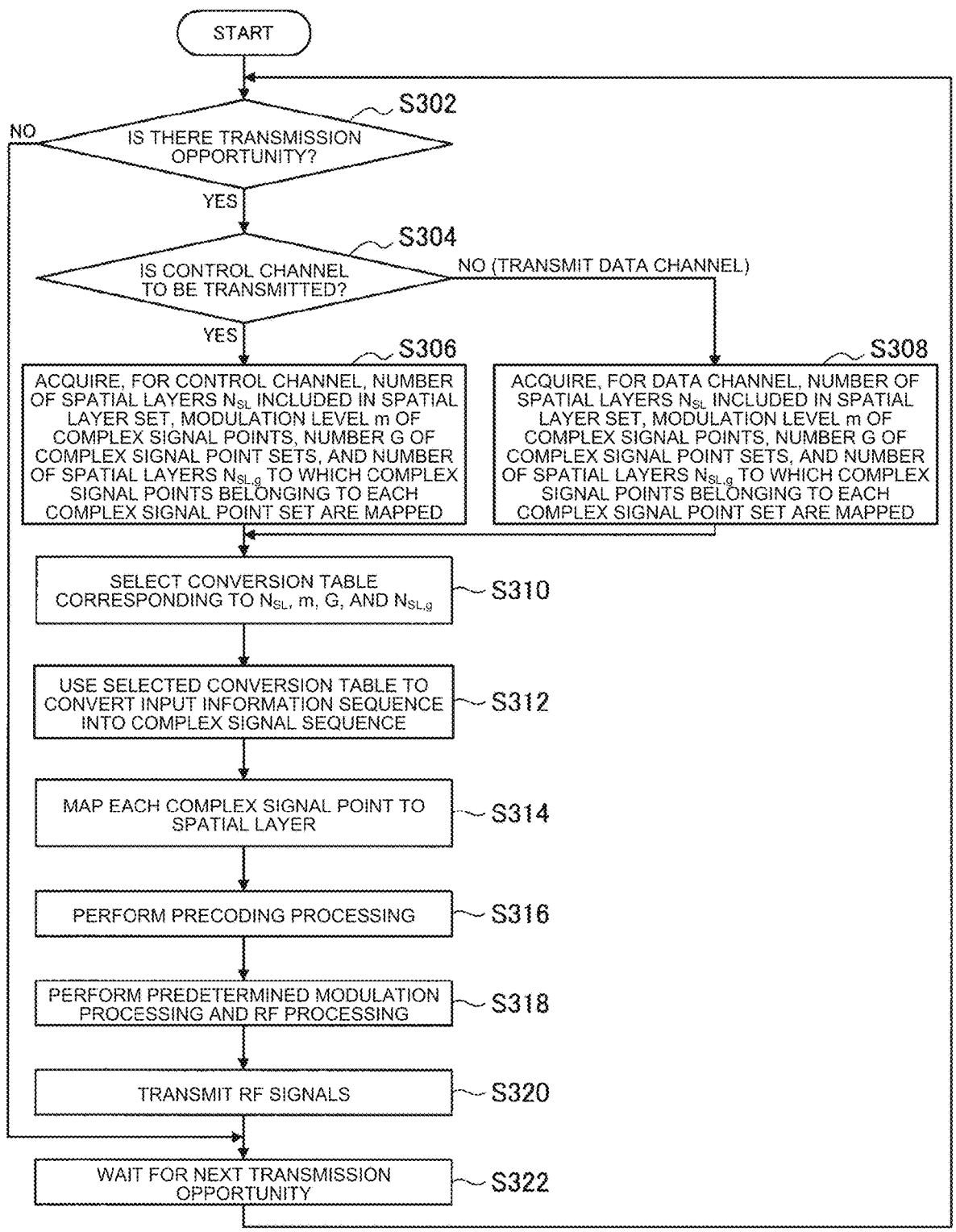
FIG. 28 is a flowchart illustrating an example of the flow of the third example of signal processing by the transmission device according to the embodiment.

FIG. 28 is a flowchart illustrating an example of the flow of the third example of signal processing by the transmission device 100 according to the embodiment. The processing according to steps S302 to S308 is similar to the processing according to steps S102 to S108 in FIG. 24.

In step S310, the transmission device 100 selects a conversion table corresponding to $N_{SL}$, m, G, and $N_{SL,g}$. Next, the transmission device 100 uses the conversion table selected in step S310 to convert the input information sequence into a complex signal sequence (step S312). Next, the transmission device 100 maps each of the complex signal points to a spatial layer (step S314). Thereafter, the transmission device 100 performs precoding processing (step S316).

After that, the transmission device 100 performs predetermined modulation processing and RF processing (step S318). Thereafter, the transmission device 100 transmits RF signals (step S320). After that, the transmission device 100 waits for the next transmission opportunity (step S322).

Note that even if the parameters such as $N_{SL}$, $N_{SL,max}$, G, $N_{SL,g}$, m, and $m_g$ are the same, the conversion table that is referenced may be different if the type of physical channel to transmit the signal is different. For example, the conversion tables to be referenced may differ between the physical channels for the control channel and the physical channels for the data channel (shared channel). Physical channels for the control channel may be channels such as the physical downlink control channel, the physical uplink control channel, the physical sidelink control channel, the preamble field in a packet, the SIGNAL field in a packet, the physical broadcast channel, and the physical random access channel. Physical channels for the data channel may be channels such as the physical downlink data channel, the physical uplink data channel, the physical sidelink data channel, the physical downlink shared channel, the physical uplink shared channel, the physical sidelink channel, and the payload field in a packet.

Note that for the control channel, the required data rate is not so high, but it desirable to have reliable transmission and reception quality. Consequently, for the control channel, it is desirable for the values of G and m to be relatively small compared to the data channel. Also, in the control channel, the ratio of zero elements may be increased over the data channel like the following formula.

$$N_{SL} > \sum_{g=1}^{G} N_{SL,g} \tag{43}$$

Alternatively, in the control channel, the ratio of zero elements may be increased over the data channel like the following formula.

$$N_{SL,max} > \sum_{g=1}^{G} N_{SL,g} \tag{44}$$

3.2.2.4. Combination with Various Waveforms (1) Overview

The proposed technology can be combined with waveforms of any type, such as multi-carrier modulation or single-carrier modulation. In this case, the content of the processing executed in the waveform modulation block 15 in FIG. 1 is different depending on the type of waveform. Note that multi-carrier modulation may be modulation such as orthogonal frequency division multiplexing (OFDM), generalized frequency division multiplexing (GFDM), filtered OFDM (F-OFDM), universal filtered OFDM (UF-OFDM), and filter bank multi-carrier (FBMC). Single-carrier modulation may be modulation such as single-carrier modulation with frequency domain equalization (SC-FDE), single-carrier frequency division multiple access (SC-FDMA), and discrete Fourier transform spread OFDM (DFT-S-OFDM).

It is desirable for the value of $N_{SL}$ or $N_{SL,max}$ to be set appropriately according to the physical parameters of the waveform. $N_{SL}$ or $N_{SL,max}$ may be set by the spatial mapping block (such as the spatial mapping block 31 in FIG. 7 and the joint constellation mapping and spatial mapping block 33 in FIG. 12), for example.

As a first example of appropriately setting the value of $N_{SL}$ or $N_{SL,max}$, when allocating a unit resource in the frequency direction, such as a resource block, the value of $N_{SL}$ or $N_{SL,max}$ is divisible by the number of subcarriers usable for transmission (corresponding to the number of resource elements). As a second example of appropriately setting the value of $N_{SL}$ or $N_{SL,max}$, when allocating a unit resource in the time direction, such as a subframe or a slot, the value of $N_{SL}$ or $N_{SL,max}$ is divisible by the number of symbols usable for transmission (corresponding to the number of resource elements). As a third example of appropriately setting the value of $N_{SL}$ or $N_{SL,max}$, the value of $N_{SL}$ or $N_{SL,max}$ is divisible by the number of resource elements including frequency and time that are allocated to the target communication device (for example, a user terminal) and are actually usable for transmitting or receiving the information bit sequence.

Here, the number of resource elements usable for transmission is assumed not to include the number of resource elements used to transmit or receive a signal that is not mainly intended to carry information (such as higher-layer data, control information, and system information), like a reference signal, or the number of resource elements used for transmission or reception by a different user terminal.

(2) Exception Handling

It is desirable for the number of bits in the input information sequence to be transmitted to be divisible by the number of bits $N_B$ that can be carried by one complex signal point sequence mapped to $N_{SL}$ or $N_{SL,max}$ spatial layers. For example, it is desirable for the transport block size $N_{B,TBS}$ to be an integer multiple of $N_B$.

Obviously, $N_{B,TBS}$ is allowed not to be an integer multiple of $N_B$. In this case, it is desirable to perform exception handling. For example, the transmission device 100 may insert dummy bits to adjust the bit sequence length (in other words, bit padding). In addition, the transmission device 100 may also adjust the effective code rate to adjust the bit sequence length after FEC encoding and rate matching. The former will be described later as a first exception handling, and the latter will be described later as a second exception handling.

In the case of inserting dummy bits, the number of dummy bits $N_{B,DUMMY}$ may be calculated according to the following formula.

$$N_{B,DUMMY} = RN_B N - N_{B,TBS} \quad (45)$$

In the case of adjusting the effective code rate, the code rate R is calculated according to the following formula.

$$R = \frac{N_{B,TBS}}{N_B N} \quad (46)$$

Note that the adjustment of the effective code rate may be achieved by rate matching using a circular buffer described later.

(2.1) First Exception Handling

The first exception handling is a process of inserting dummy bits into the input information sequence.

Figure 29:
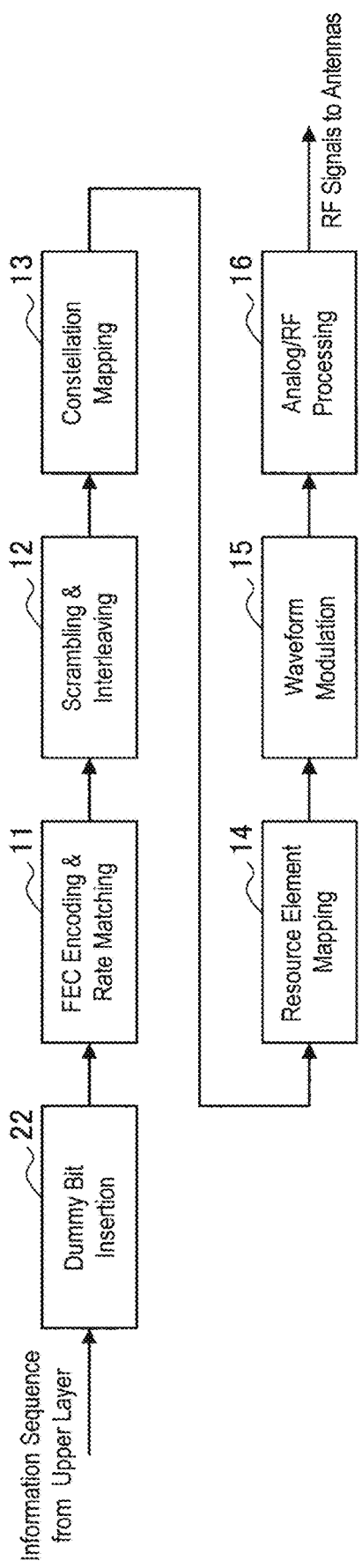
FIG. 29 is a block diagram for explaining an example of signal processing for a first exception handling according to the embodiment.

FIG. 29 is a block diagram for explaining an example of signal processing for a first exception handling according to the embodiment. The signal processing illustrated in FIG. 29 includes a dummy bit insertion block 22 in addition to the signal processing described above with reference to FIG. 1. The dummy bit insertion block 22 inserts dummy bits into the input information sequence.

In this exception handling, which complex signal points mapped to resource elements are dummy points does not have to be decided in a 1:1 manner. The number of bits $N_{B,TOT}$ in the higher-layer information (input information sequence) that can be carried by the total spatial layers usable for transmission is expressed by the following formula.

$$N_{B,TOT} = RN_{RE,SL}N_B \quad (47)$$

Here, $N_{RE,SL}$ is the number of resource elements actually usable for transmission or reception per spatial layer. $N_B$ is the number of bits that can be imposed on one complex signal point sequence output containing $N_{SL}$ or $N_{SL,max}$ spatial layers. R is the code rate of error-correcting coding (which may also include the code rate due to rate matching), and is such that $0 < R \leq 1$.

It is desirable for the unit (for example, the packet size (packet data unit size) or the transport block size) $N_{B,TBS}$ by which the higher-layer information bits are actually transmitted to be the value of $N_{B,TOT}$ or less. That is, $0 < N_{B,TBS} \leq N_{B,TOT}$ is desirable. Specifically, $N_{B,TBS} = N_{B,TOT}$ is desirable. In this case, dummy bits are unnecessary.

On the other hand, in the case where $N_{B,TBS} < N_{B,TOT}$, signal processing is performed on the number of bits obtained by adding the number of dummy bits $N_{B,DUMMY}$ to $N_{B,TBS}$. The number of dummy bits $N_{B,DUMMY}$ that should be inserted is expressed by the following formula.

$$\begin{aligned} N_{B,DUMMY} &= N_{B,TOT} - N_{B,TBS} \\ &= RN_{RE,SL}N_B - N_{B,TBS} \end{aligned} \quad (48)$$

Note that $N_{B,TBS}$ may also include cyclic redundancy check (CRC) bits in addition to the actual higher-layer information bits. Also, it is desirable for the dummy bits to be inserted before the FEC encoding processing.

Hereinafter, FIG. 30 will be referenced to describe an example of the flow of the first exception handling.

Figure 30:
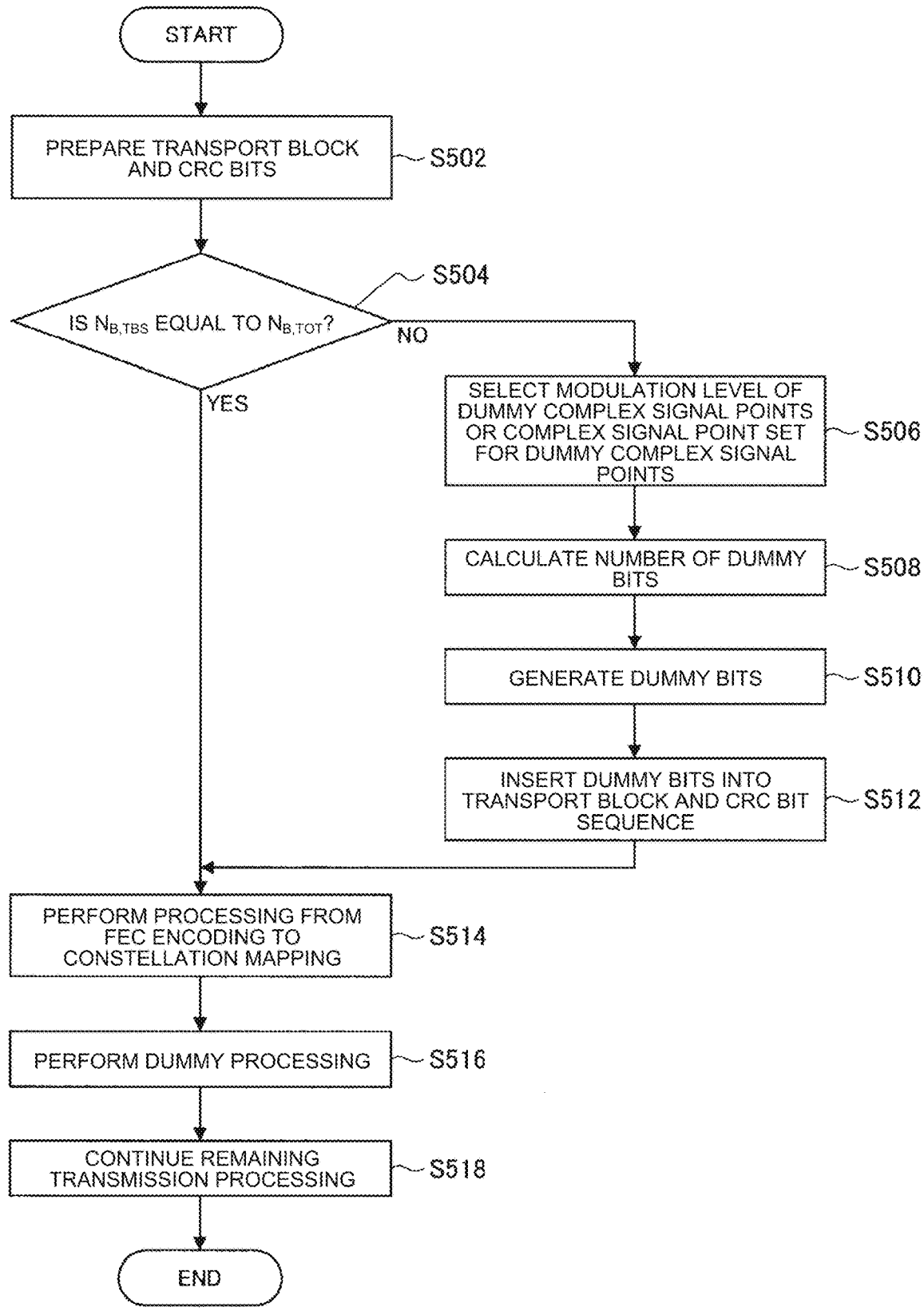
FIG. 30 is a flowchart illustrating an example of the flow of a first exception handling executed in the transmission device according to the embodiment.

FIG. 30 is a flowchart illustrating an example of the flow of a first exception handling executed in the transmission device 100 according to the embodiment. As illustrated in FIG. 30, first, the transmission device 100 prepares a transport block and CRC bits (step S502). Next, the transmission device 100 determines whether or not $N_{B,TBS}$ is equal to $N_{B,TOT}$ (step S504). In the case of determining that $N_{B,TBS}$ and $N_{B,TOT}$ are equal (S504/YES), the process proceeds to step S514. In the case of determining that $N_{B,TBS}$ and $N_{B,TOT}$ are not equal (S504/NO), the process proceeds to step S506.

In step S506, the transmission device 100 selects a modulation level of the dummy complex signal points or a complex signal point set for the dummy complex signal points (step S506). Next, the transmission device 100 calculates the number of dummy bits (step S508). Next, the transmission device 100 generates dummy bits equal to the calculated number of bits (step S510). Thereafter, the transmission device 100 inserts the dummy bits into the transport block and CRC bit sequence (step S512). After that, the process proceeds to step S514.

In step S514, the transmission device 100 performs the processing from FEC encoding to constellation mapping. Thereafter, the transmission device 100 performs dummy processing (step S516). After that, the transmission device 100 continues to perform the remaining transmission processing (step S518).

(2.2) Second Exception Handling

The second exception handling is a process of adjustment by rate matching.

In rate matching, the transmission device 100 adjusts the number of bits. In other words, the transmission device 100 adjusts the code rate R including FEC encoding and rate matching.

$N_{B,ENC}$ denotes the number of coded bits with respect to the unit (for example, the packet size (packet data unit size) or the transport block size) $N_{B,TBS}$ by which the higher-layer information bits are actually transmitted. $N_{B,ENC}$ is expressed by the following formula.

$$N_{B,ENC} = N_{RE,SL} N_B \quad (49)$$

The code rate R including FEC encoding and rate matching is expressed by the following formula.

$$R = \frac{N_{B,TBS}}{N_{B,ENC}} \quad (50)$$

Here, the code rate R may also be considered to be separated into a code rate $R_{FEC}$ of FEC base codes and an adjustment R for rate matching. In other words, $R=R_{FEC}R_{RM}$. Typically, the code rate $R_{FEC}$ of the FEC base codes is such that $0 < R_{FEC} \le 1$. Otherwise, in the rate matching according to the second exception handling, a puncturing process is performed in the case where $R < R_{FEC}$ (in this case, $R_{RM} < 1$), and a bit repetition process is performed in the case where $R > R_{FEC}$ (in this case, $R_{RM} > 1$).

Such adjustment of the code rate R may be achieved using a circular buffer. Note that in the case where $R = R_{FEC}$, special processing does not have to be performed in the rate matching (that is, $R_{RM} = 1$ is acceptable).

Hereinafter, FIG. 31 will be referenced to describe an example of the flow of the second exception handling.

Figure 31:
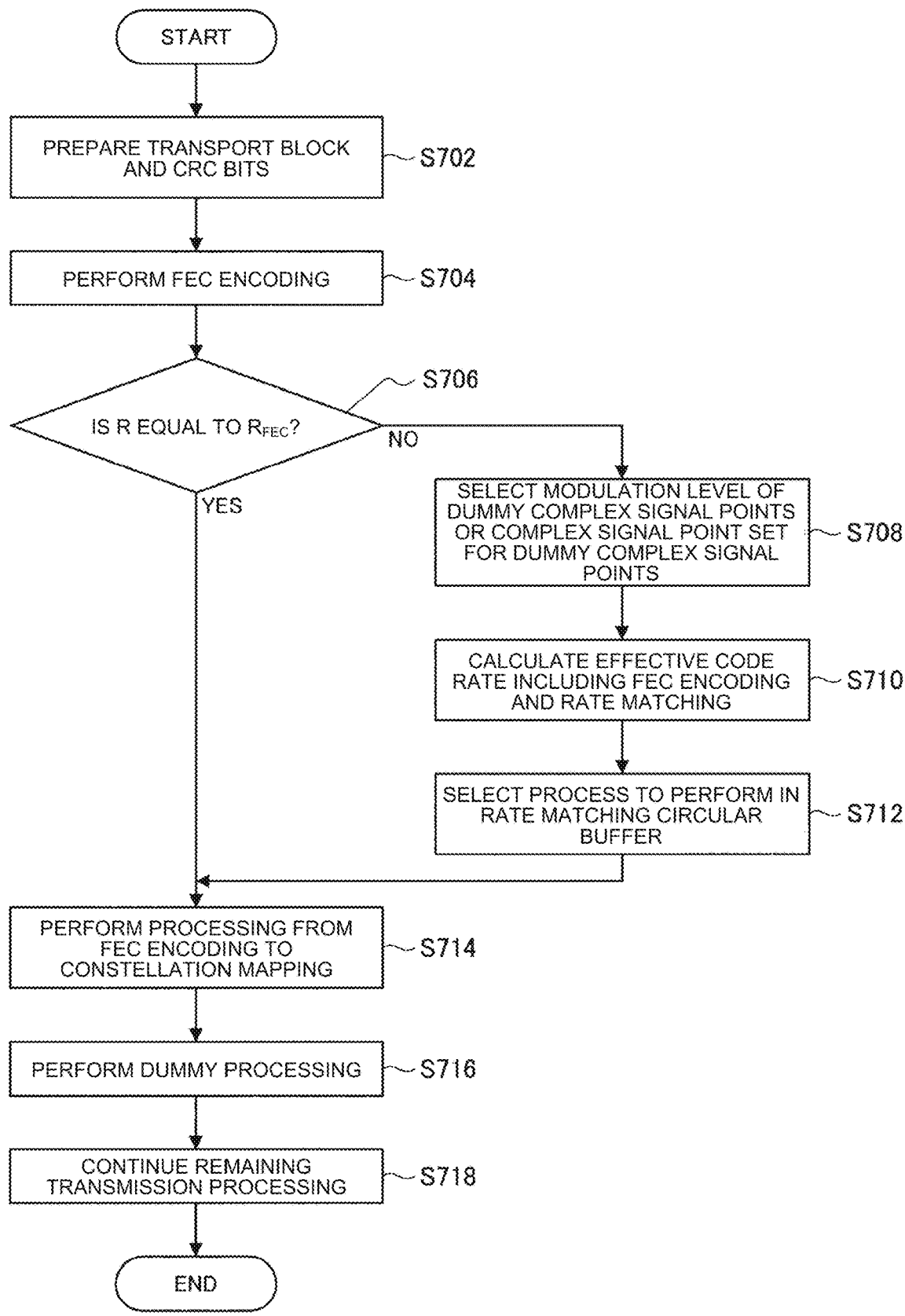
FIG. 31 is a flowchart illustrating an example of the flow of a second exception handling executed in the transmission device according to the embodiment.

FIG. 31 is a flowchart illustrating an example of the flow of a second exception handling executed in the transmission device 100 according to the embodiment. As illustrated in FIG. 31, first, the transmission device 100 prepares a transport block and CRC bits (step S702). Next, the transmission device 100 performs FEC encoding (step S704). Next, the transmission device 100 determines whether or not R is equal to $R_{FEC}$ (step S706). In the case of determining that R and $R_{FEC}$ are equal (S706/YES), the process proceeds to step S714. In the case of determining that R and $R_{FEC}$ are not equal (S706/NO), the process proceeds to step S708.

In step S708, the transmission device 100 selects a modulation level of the dummy complex signal points or a complex signal point set for the dummy complex signal points. Thereafter, the transmission device 100 calculates the effective code rate including FEC encoding and rate matching (step S710). Next, the transmission device 100 selects a process to perform in the rate matching circular buffer (step S712). After that, the process proceeds to step S714.

In step S714, the transmission device 100 performs the processing from rate matching to constellation mapping. Thereafter, the transmission device 100 performs dummy processing (step S716). After that, the transmission device 100 continues to perform the remaining transmission processing (step S718).

3.3. Reception Processing

The reception device 200 acquires the first bit sequence by demodulating the received complex signal point sequence in the spatial domain. Specifically, in the case where modulation using a precoding matrix has been performed by the transmission device 100, the reception device 200 acquires the first bit sequence by identifying the precoding matrix applied to the complex signal point sequence. Also, in the case where modulation according to the first spatial modulation method of the second spatial modulation method has been performed by the transmission device 100, the reception device 200 acquires the first bit sequence by identifying the mapping pattern with respect to the spatial layers. Otherwise, the reception device 200 acquires the second bit sequence by demodulating each of the complex signal points included in the received complex signal point sequence. With this arrangement, the reception device 200 acquires the first bit sequence and the second bit sequence.

Hereinafter, examples of specific signal processing by the reception device 200 will be described while referring to FIGS. 32 and 33.

(1) First Example

Figure 32:
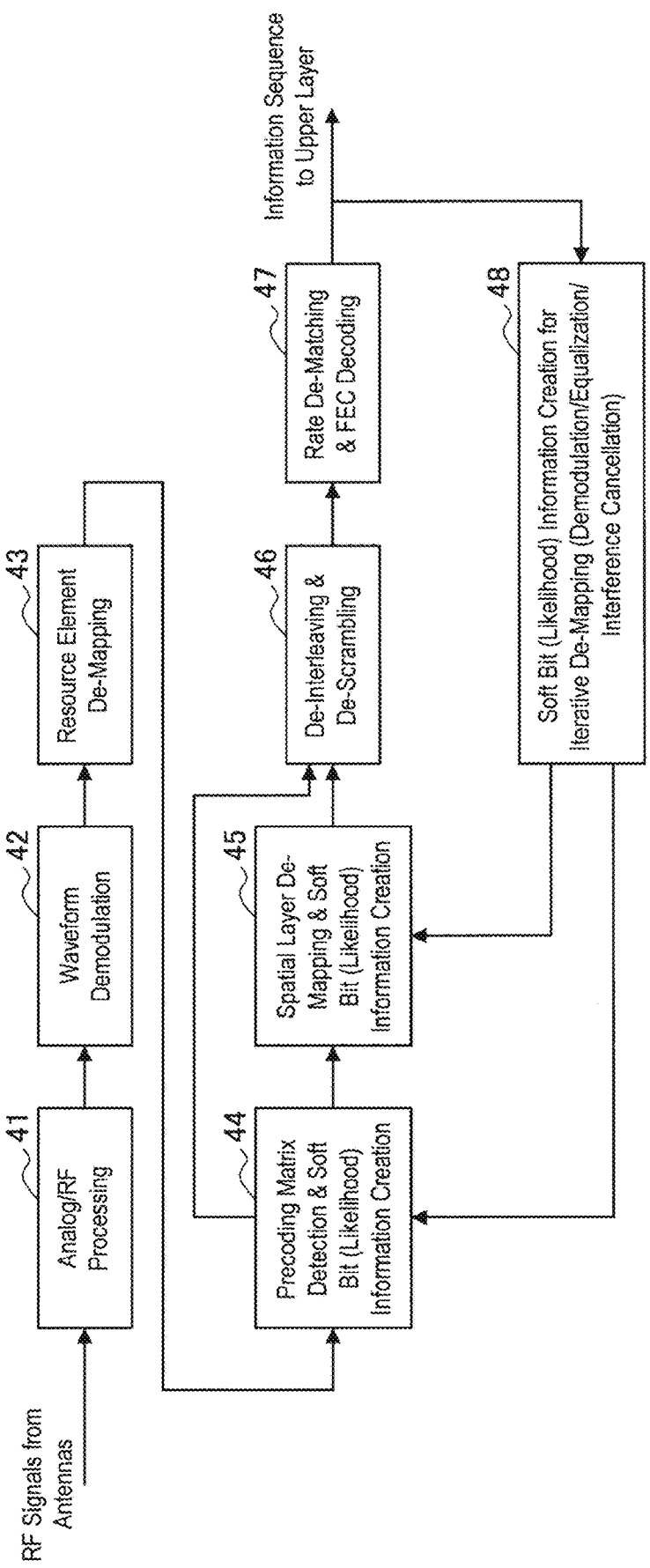
FIG. 32 is a block diagram schematically illustrating an example of signal processing by the reception device according to an embodiment of the present disclosure.

FIG. 32 is a block diagram schematically illustrating an example of signal processing by the reception device 200 according to an embodiment of the present disclosure. As illustrated in FIG. 32, the signal processing by a reception device according to the present embodiment includes an analog/RF processing block 41, a waveform demodulation block 42, a resource element de-mapping block 43, a precoding matrix detection and soft bit information creation block 44, a spatial layer de-mapping and soft bit information creation block 45, a de-interleaving and de-scrambling block 46, a rate de-matching and FEC decoding block 47, and a soft bit information creation for iterative de-mapping block 48. Referring to FIG. 32, RF signals from antennas are processed, and a higher-layer information sequence (for example, a bit sequence) is output.

Analog/RF Processing Block 41

The analog/RF processing block 41 performs processing such as analog processing, frequency conversion processing, and analog-to-digital conversion processing on the RF signals, and converts analog signals to digital signals.

Waveform Demodulation Block 42

The waveform demodulation block 42 performs demodulation processing according to the waveform being used. For example, the waveform demodulation block 42 applies a transform such as the discrete Fourier transform (DFT) or the fast Fourier transform (FFT) to the input signals.

Resource Element De-Mapping Block 43

The resource element de-mapping block 43 performs a process of retrieving the resource elements of the signal to be demodulated/decoded according to properties such as the physical channel configuration, the reference signal configuration, and the resource element allocation for each user.

Precoding Matrix Detection and Soft Bit Information Creation Block 44

In the case where modulation using a precoding matrix has been performed on the transmission device 100 side, the precoding matrix detection and soft bit information creation block 44 performs a corresponding demodulation process to acquire the first bit sequence. For example, the precoding matrix detection and soft bit information creation block 44 retrieves the signal points of the portion corresponding to the reference signal, and from the signal points estimates the precoding matrix multiplied by the reference signal. Additionally, the precoding matrix detection and soft bit information creation block 44 acquires the information bit sequence corresponding to the estimated precoding matrix. The information bit sequence is output to the de-interleaving and de-scrambling block 46 downstream.

Note that the output of the information bit sequence is either a hard decision having a 1:1 correspondence with the selection of a precoding matrix, or a soft decision (soft information, log likelihood ratio (LLR) information). A hard decision value is a sequence that takes binary discrete values, namely $\{0, 1\}$ or $\{-1, 1\}$. A soft decision value is a sequence of continuous values. When the downstream error correction decoding processing is considered, it is desirable for a soft decision value to be output.

In addition, the precoding matrix estimated by the precoding matrix detection and soft bit information creation block 44 is also used in the spatial layer de-mapping and soft bit information creation block 45 downstream. Consequently, the precoding matrix estimated by the precoding matrix detection and soft bit information creation block 44 is output to the spatial layer de-mapping and soft bit information creation block 45.

Spatial Layer De-Mapping and Soft Bit Information Creation Block 45

In the case where modulation according to the first spatial modulation method of the second spatial modulation method is performed on the transmission device 100 side, the spatial layer de-mapping and soft bit information creation block 45 performs a corresponding demodulation process to acquire the first bit sequence. For example, in the case where modulation according to the first spatial modulation method has been performed by the transmission device 100, the spatial layer de-mapping and soft bit information creation block 45 acquires the first bit sequence by identifying the mapping pattern of non-zero complex signal points to spatial layers. Also, in the case where modulation according to the second spatial modulation method has been performed by the transmission device 100, the spatial layer de-mapping and soft bit information creation block 45 acquires the first bit sequence by identifying the mapping pattern of a complex signal point set to spatial layers.

Furthermore, the spatial layer de-mapping and soft bit information creation block 45 acquires the second bit sequence by performing constellation de-mapping. Specifically, the spatial layer de-mapping and soft bit information creation block 45 converts complex signal points into a bit sequence by detecting which element of the complex signal point set indicated by the identified mapping pattern each of the complex signal points included in the complex signal point sequence corresponds to.

In this way, in the spatial layer de-mapping and soft bit information creation block 45, a demodulation process including spatial layer de-mapping and constellation de-mapping is performed. As the algorithm of spatial layer de-mapping and constellation de-mapping, linear filtering such as zero forcing (ZF) and minimum mean square error (MMSE) or a non-linear algorithm such as maximum likelihood (ML) detection and ML estimation may be used.

De-Interleaving and De-Scrambling Block 46

The de-interleaving and de-scrambling block 46 performs de-interleaving processing and/or de-scrambling processing corresponding to the interleaving processing and/or scrambling processing performed on the transmission side.

Rate De-Matching and FEC Decoding Block 47

The rate de-matching and FEC decoding block 47 decodes a higher-layer information sequence by performing rate matching and FEC decoding corresponding to the processing on the transmission device 100 side.

Soft Bit Information Creation for Iterative De-Mapping Block 48

The soft bit information creation for iterative de-mapping block 48 recreates a transmission signal replica (such as a soft replica or a soft interference replica, for example) from the provisionally decoded higher-layer information sequence. Additionally, the soft bit information creation for iterative de-mapping block 48 provides the recreated transmission signal replica as feedback to the precoding matrix detection and soft bit information creation block 44 and the spatial layer de-mapping and soft bit information creation block 45. The precoding matrix detection and soft bit information creation block 44 and the spatial layer de-mapping and soft bit information creation block 45 perform iterative decoding (such as iterative/turbo de-mapping, iterative/turbo equalization, iterative/turbo decoding, or iterative/turbo cancellation) on the basis of the feedback information. Through such iterative processing, an improvement in the reception performance is expected.

(2) Second Example

Figure 33:
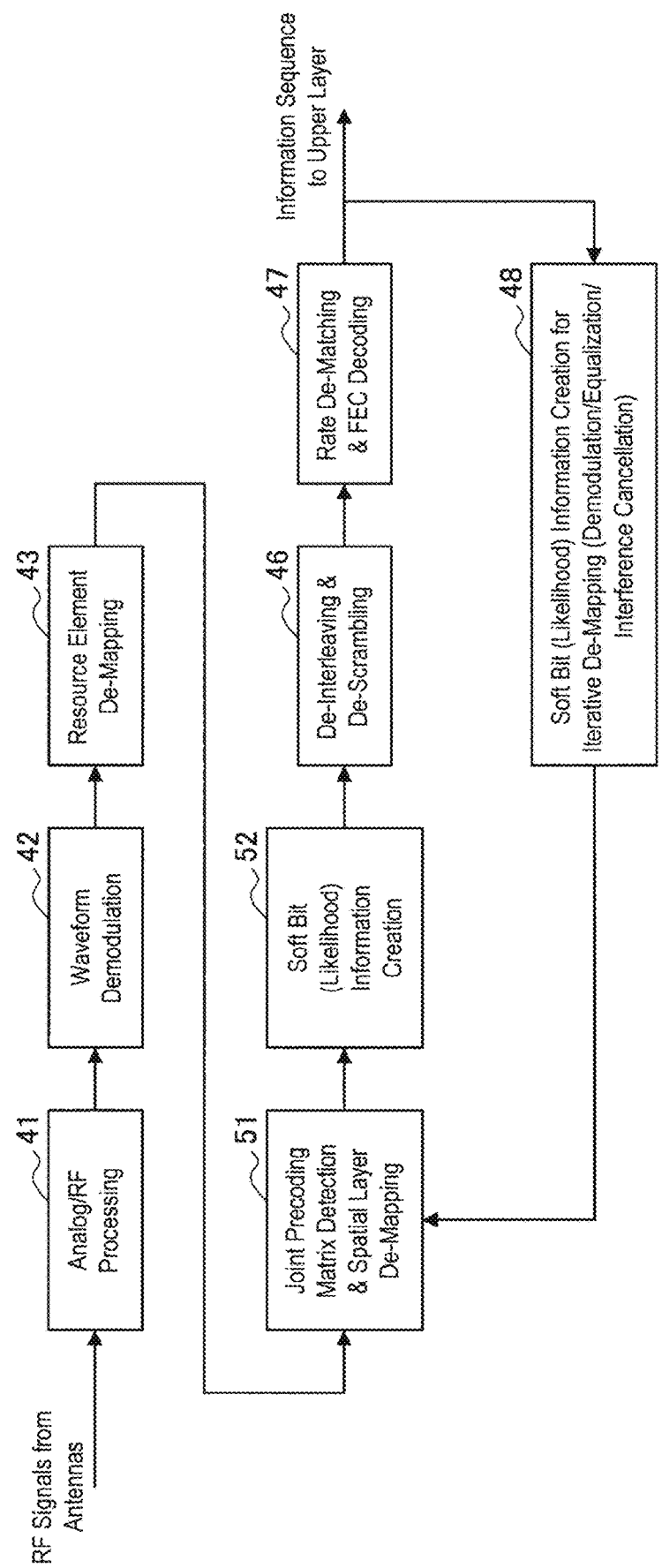
FIG. 33 is a block diagram schematically illustrating an example of signal processing by the reception device according to an embodiment of the present disclosure.

FIG. 33 is a block diagram schematically illustrating an example of signal processing by the reception device 200 according to an embodiment of the present disclosure. The signal processing illustrated in FIG. 33 includes a joint precoding matrix detection and spatial layer de-mapping processing block 51 and a soft bit information creation block 52 instead of the precoding matrix detection and soft bit information creation block 44 and the spatial layer de-mapping and soft bit information creation block 45 among the processing blocks illustrated in FIG. 32. Referring to FIG. 33, RF signals from antennas are processed, and a higher-layer information sequence (for example, a bit sequence) is output.

In the signal processing illustrated in FIG. 32, demodulation (such as selection, determination, and estimation) is performed individually with respect to the modulation using a precoding matrix and the spatial modulation. In contrast, in the signal processing illustrated in FIG. 33, demodulation is performed collectively (for example, simultaneously) with respect to the modulation using a precoding matrix and the spatial modulation. Specifically, the joint precoding matrix detection and spatial layer de-mapping processing block 51 includes the functions of the spatial layer de-mapping and soft bit information creation block 45 and the precoding matrix detection and soft bit information creation block 44 described above, except for the soft bit information creation function. On the other hand, the soft bit information creation block 52 creates soft bit information.

By collectively performing the demodulation with respect to the modulation using a precoding matrix and the spatial modulation, it is possible to avoid or alleviate a situation in which error in the decoding of the precoding matrix is propagated as error in the decoding of the spatial layers, for example. In the case of the example illustrated in FIG. 33, it is desirable for the simultaneous demodulation of the precoding matrix and the spatial layers to use a non-linear algorithm such as ML detection and ML estimation.

(3) Sharing of Parameters

It is desirable to share the parameters used in the transmission processing by the transmission device 100 between the transmission device 100 and the reception device 200.

Examples of the parameters that should be shared include $N_{SL}$, $N_{SL,max}$, G, $N_{SL,g}$, m, and $m_g$. Otherwise, information indicating the complex signal point set used in modulation may also be shared.

The parameters may be reported through communication between the transmission device 100 and the reception device 200. For example, the parameters are reported as system information, RRC signaling, or control information.

Sharing of Parameters for Uplink Communication or Downlink Communication

Figure 34:
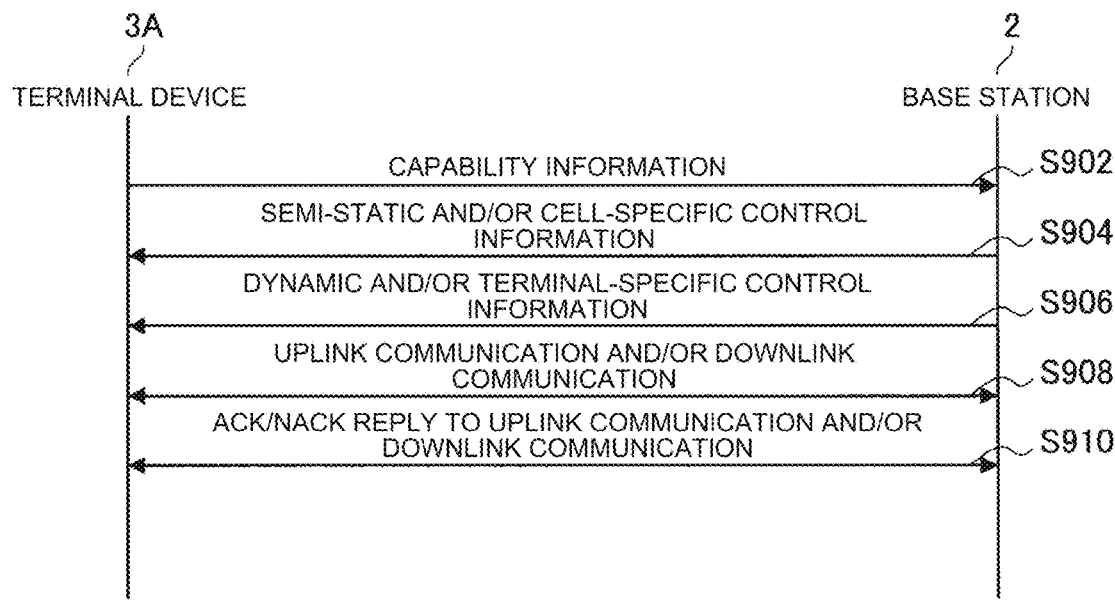
FIG. 34 is a sequence diagram illustrating an example of the flow of an information sharing process executed in a system according to the embodiment.

Hereinafter, FIG. 34 will be referenced to describe a parameter sharing process for uplink communication or downlink communication. FIG. 34 is a sequence diagram illustrating an example of the flow of an information sharing process executed in a system 1 according to the present embodiment. This sequence involves the base station 2 and the terminal device 3A illustrated in FIG. 4.

As illustrated in FIG. 34, first, the terminal device 3A notifies the base station 2 of capability information (step S902). Such capability information includes information indicating whether or not the transmission processing and/or reception processing according to the proposed technology is supported.

Next, the base station 2 notifies the terminal device 3A of semi-static and/or cell-specific control information (step S904). Next, the base station 2 notifies the terminal device 3A of dynamic and/or terminal-specific (UE-specific and/or UE-group-specific) control information (step S906). The parameters described above are included in at least one of the above types of control information.

Here, in the case where the proposed technology is implemented using physical control channels (such as the physical downlink control channel (PDCCH) and the physical uplink control channel (PUCCH)), it is desirable for the parameters to be included in the semi-static and/or cell-specific control information. For example, it is desirable for the parameters to be reported using the system information, as RRC signaling, the physical broadcast channel (PBCH), or the physical downlink shared channel (PDSCH).

On the other hand, in the case where the proposed technology is implemented using physical shared channels (such as the PDSCH and the physical uplink shared channel (PUSCH)), it is desirable for the parameters to be included in the dynamic and/or terminal-specific control information. For example, it is desirable for the parameters to be reported using the physical control channel (PDCCH) as downlink control information (DCI).

The dynamic and/or terminal-specific control information may additionally include information indicating the radio resources (frequency (such as resource blocks and component carriers), time (such as subframes, slots, and mini-slots), and space (such as the number of MIMO layers (spatial layers, spatial streams), and the like) that the terminal device 3A should use.

Return to the description of the sequence. After step S906, the base station 2 and the terminal device 3A perform uplink communication and/or downlink communication (step S908). For example, in uplink communication, the terminal device 3A performs transmission processing according to the proposed technology using the parameters reported in step S904 or S906. Additionally, the base station 2 performs reception processing according to the proposed technology. On the other hand, in downlink communication, the base station 2 performs transmission processing according to the proposed technology. Additionally, the terminal device 3A performs reception processing according to the proposed technology using the parameters reported in step S904 or S906. Note that in the case where the base station 2 or the terminal device 3A does not support the transmission processing or reception processing according to the proposed technology, the communication in step S908 is performed using a typical communication system of the related art (such as the OFDMA system or the DFT-Spread-OFDMA system, for example).

After that, an ACK/NACK reply to the uplink communication and/or downlink communication in step S908 is transmitted (step S910).

Sharing of Parameters for Sidelink Communication

Figure 35:
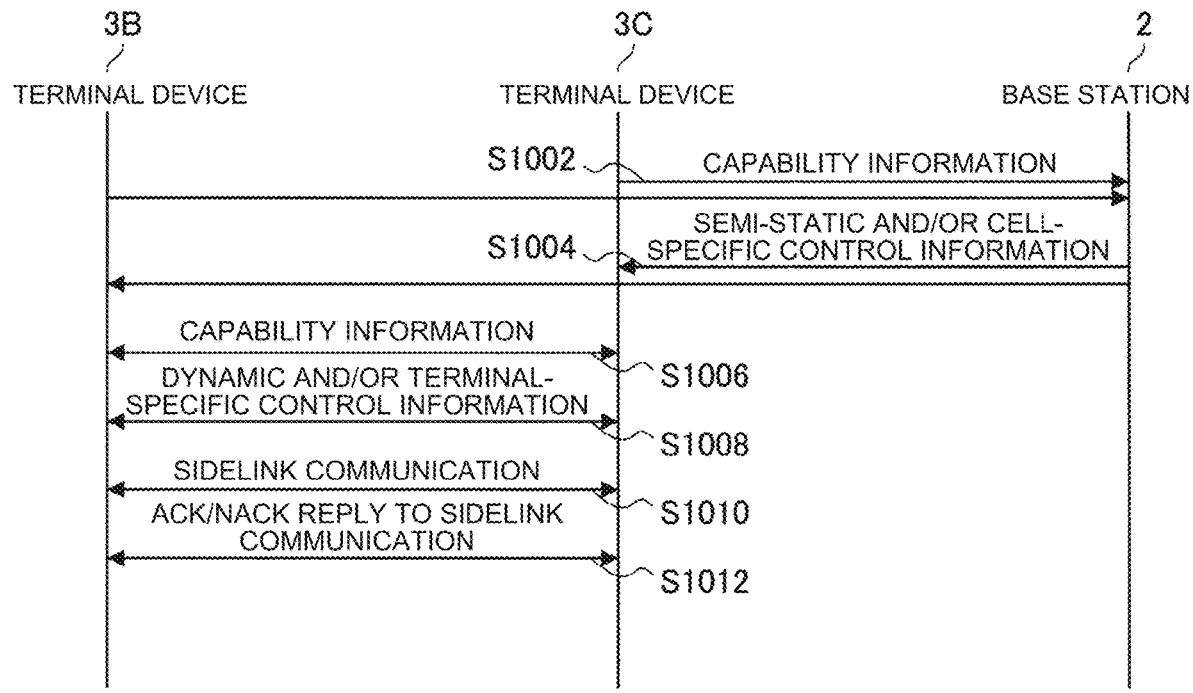
FIG. 35 is a sequence diagram illustrating an example of the flow of an information sharing process executed in a system according to the embodiment.

Next, FIG. 35 will be referenced to describe a parameter sharing process for sidelink communication. FIG. 35 is a sequence diagram illustrating an example of the flow of an information sharing process executed in a system 1 according to the present embodiment. This sequence involves the base station 2 and the terminal devices 3B and 3C illustrated in FIG. 4.

As illustrated in FIG. 35, first, the terminal devices 3B and 3C notifies the base station 2 of capability information (step S1002). Such capability information includes information indicating whether or not the transmission processing and/or reception processing according to the proposed technology is supported.

Next, the base station 2 notifies the terminal devices 3B and 3C of semi-static and/or cell-specific control information (step S1004). The semi-static and/or cell-specific control information includes information indicating which radio resources may be used for sidelink communication (for example, a radio resource pool designated by time and frequency). Furthermore, the semi-static and/or cell-specific control information may also include parameters that should be used in the case of performing the transmission and reception processing according to the proposed technology in the radio resources.

Next, the terminal devices 3B and 3C notify each other of their capability information (step S1006). Such capability information includes information indicating whether or not the transmission processing and/or reception processing according to the proposed technology is supported for the radio resources designated by the base station 2.

Next, the terminal devices 3B and 3C notify each other of dynamic and/or terminal-specific (UE-specific and/or UE-group-specific) control information (step S1008). Such control information may also include parameters to be used when the terminal devices 3B and 3C perform the transmission processing and reception processing according to the proposed technology. For example, the parameters may be reported as sidelink control information (SCI) using a sidelink control channel (such as the physical sidelink control channel (PSCCH)).

Thereafter, the terminal devices 3B and 3C perform sidelink communication (step S1010). For example, in a sidelink control channel (such as the physical sidelink control channel (PSCCH)), the terminal devices 3B and 3C perform transmission processing and reception processing according to the proposed technology using the parameters reported in step S1004. Additionally, for example, in a sidelink shared channel (such as the physical sidelink shared channel (PSSCH)), the terminal devices 3B and 3C perform transmission processing and reception processing according to the proposed technology using the parameters shared in step S1008. Note that in the case where the terminal devices 3B and 3C do not support the transmission processing or reception processing according to the proposed technology, the communication in step S1010 is performed using a typical communication system of the related art.

After that, an ACK/NACK reply to the sidelink communication in step S1010 is transmitted (step S1012).

Fixed Sharing of Parameters

The transmission device 100 and the reception device 200 may also set and share parameters in a fixed manner. For example, predetermined parameters may be pre-stored in the transmission device 100 and the reception device 200.

For example, the predetermined parameters are used in the case where the transmission processing and reception processing according to the proposed technology is performed in the broadcast channel (PBCH) used to transmit the initial system information from the base station 2 to the terminal device 3. This is because it is difficult to transmit and receive parameters before the broadcast channel is transmitted and received.

3.4. Modifications

3.4.1. First Modification

In "3.2.2.3.1. First example" above, the spatial layer processing block 305 is described as performing the linear conversion indicated in Formula (34) as the arithmetic processing, but the present technology is not limited to such an example. The spatial layer processing block 305 may also perform non-linear conversion as the arithmetic processing. Examples of the non-linear conversion include differential conversion and recursive conversion.

Hereinafter, arithmetic processing based on differential conversion (also referred to as differential arithmetic processing) and arithmetic processing based on recursive conversion (recursive arithmetic processing) will be described in detail.

Differential Arithmetic Processing

In the differential arithmetic processing, the operation to a certain spatial layer n is determined by an operation to another spatial layer n' or the value of a complex signal point in the other spatial layer n'. The differential arithmetic processing may be expressed by the following formula.

$$s_n = f_D(s'_n, s_{n'}, s'_{n'}, n, n') \quad (51)$$

Here, $f_D$ is a function of the differential arithmetic processing. $s_n$ is the complex signal point after the operation of the spatial layer n. $s'_n$ is the complex signal point before the operation of the spatial layer n. $s_{n'}$ is the complex signal point after the operation of the other spatial layer n'. $s'_{n'}$ is the complex signal point before the operation of the other spatial layer n'. It is sufficient for the function $f_D$ to take at least one of $s'_n$, $s_{n'}$, $s'_{n'}$, n, and n' as an argument.

As another specific example, the differential arithmetic processing may be expressed by the following formula.

$$s_n = f_D(s'_n, s_{n'}, s'_{n'}, n, n') \quad (52)$$
$$= |Z_{D,n}|s'_n \exp(j\theta_{D,n}) + C_{D,n}$$
$$Z_{D,n} = Z_{D,n'} + Z_n$$
$$\theta_{D,n} = \theta_{D,n'} + \theta_n$$
$$C_{D,n} = C_{D,n'} + C_n$$

Although the processing itself resembles a linear operation, Formula (52) above means that the amplitude, the phase, and the amount of linear shift are determined in a way that is dependent on the amplitude, the phase, and the amount of linear shift of the other spatial layer n'.

It is desirable for the other spatial layer n' to be separated from the spatial layer n by a predetermined interval $N_{NL}$. In other words, it is desirable that n'=n+$N_{NL}$ or n'=n−$N_{NL}$. Specifically, it is desirable that $N_{NL}$=1.

In the case of the differential arithmetic processing, initial values of the parameters used in the operations are set. For example, in the case where initial values are set with respect to the spatial layer n=0, operations like the following formula are performed.

$$s_n = f_D(s'_n, s_{n'}, s'_{n'}, n, n') \quad (53)$$
$$= |Z_{D,n}|s'_n \exp(j\theta_{D,n}) + C_{D,n}$$
$$Z_{D,n} = Z_{D,n'} + Z_n, (n > 0)$$
$$\theta_{D,n} = \theta_{D,n'} + \theta_n, (n > 0)$$
$$C_{D,n} = C_{D,n'} + C_n, (n > 0)$$
$$Z_{D,n} = Z_{Init}, (n = 0)$$
$$\theta_{D,n} = Z_{Init}, (n = 0)$$
$$C_{D,n} = C_{Init}, (n = 0)$$

Recursive Arithmetic Processing

In the recursive arithmetic processing, the operation to a certain spatial layer n is achieved by repeating the process a plurality of times (for example, $N_{R,n}$ times). In other words, the recursive arithmetic processing may be expressed by the following formula.

$$s_n = f_{R,n_R}(s'_n, n) \quad (54)$$

Here, $$f_{R,n_R} \quad (55)$$

is the function of the $n_R$th iteration of the recursive arithmetic processing.

As another specific example, the recursive arithmetic processing may be expressed by the following formula.

$$s'_{n,0} = s'_n$$
$$s'_{n,n_R} = f_R(s'_{n,n_R-1}, n)$$
$$s_n = s'_{n,N_{R,n}}$$
$$f_R(s'_n, n) = |Z_n|s'_n \exp(j\theta_n) + C_n \quad (56)$$

Here, the number of times $N_{R,n}$ the recursive arithmetic processing is repeated may be a fixed value (that is, $N_{R,n}=N_R$) regardless of the spatial layer, or a different value depending on the spatial layer n.

Other

As a different example of non-linear arithmetic processing, a modulo operation (an operation of finding the remainder after division) may be used.

3.4.2. Second Modification

In the examples of combinations of first bit sequence candidates and spatial mapping patterns illustrated in FIGS. 9 to 11, FIG. 13, and FIG. 14, the number of spatial layers to which zero (0+0j) is mapped in a spatial mapping pattern is fixed with respect to all candidates of the first bit sequence. For instance, in the examples illustrated in FIGS. 9 to 11, the number of spatial layers to which zero (0+0j) is mapped in a spatial mapping pattern is 1, 3, and 2, respectively. In the examples illustrated in FIGS. 13 and 14, the number of spatial layers to which zero (0+0j) is mapped in a spatial mapping pattern is zero with respect to all candidates of the first bit sequence.

However, the number of spatial layers to which zero (0+0j) is mapped in a spatial mapping pattern does not have to be fixed with respect to all candidates of the first bit sequence. For example, the number of spatial layers to which zero (0+0j) is mapped may be different between a spatial mapping pattern corresponding to a first candidate of the first bit sequence and a spatial mapping pattern corresponding to a second candidate of the first bit sequence. This point is described in detail below.

Note that the following describes a modification of the second spatial modulation method described with reference to FIGS. 12 to 14, but a similar method may also be achieved for the first spatial modulation method.

First Method

The first method is a method in which 2-bit information is imposed on how to use two spatial layers. Hereinafter, this method will be described in detail with reference to FIG. 36.

Figure 36:
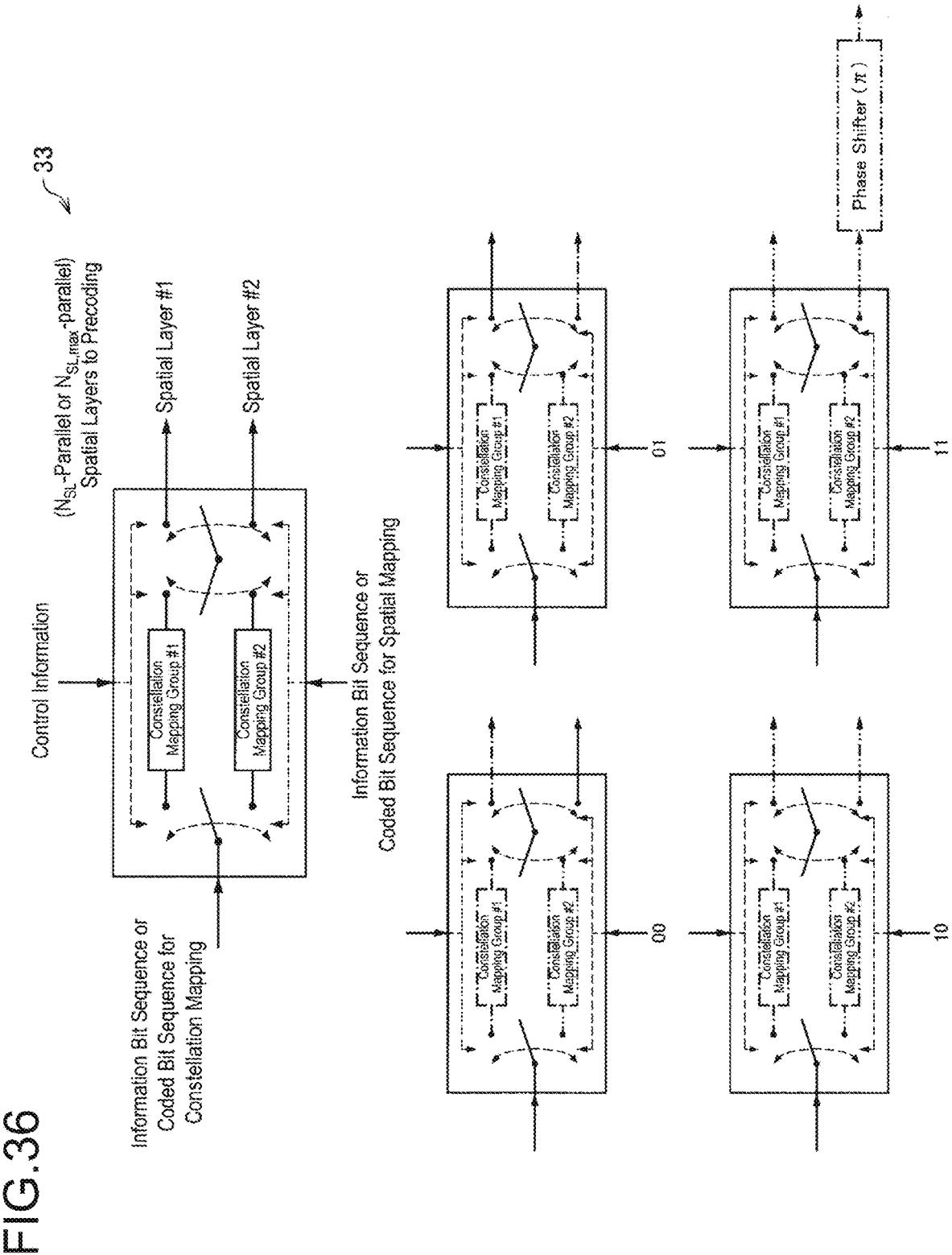
FIG. 36 is a diagram illustrating an example of combinations of first bit sequence candidates and spatial mapping patterns according to a second modification.

FIG. 36 is a diagram illustrating an example of combinations of first bit sequence candidates and spatial mapping patterns according to a second modification. In the example illustrated in FIG. 36, the complex signal points belonging to the complex signal point sets g1 or g2 or zero (0+0j) are mapped to two spatial layers #1 and #2. The differences between the types of arrows to each spatial layer represent the differences between the complex signal point sets containing the complex signal points placed in each spatial layer. In the present example, information is imposed on whether or not a spatial layer to which zero (0+0j) is mapped exists among the plurality of spatial layers, and also whether or not two predetermined complex signal points mapped to the spatial layers are the same. In the present example, such information imposed on the spatial mapping pattern is 2-bit information. Specifically, the information "00" is expressed by placing a complex signal point belonging to the complex signal point set g1 in the spatial layer #1, and placing zero (0+0j) in the spatial layer #2. The information "01" is expressed by placing zero (0+0j) in the spatial layer #1 and placing a complex signal point belonging to the complex signal point set g1 in the spatial layer #2. The information "10" is expressed by placing the same complex signal point belonging to the complex signal point set g2 in the spatial layers #1 and #2. The information "11" is expressed by placing different complex signal points belonging to the complex signal point set g2 in the spatial layers #1 and #2. Here, a different complex signal point placed in the spatial layer #2 and belonging to the same complex signal point set as the complex signal point placed in the spatial layer #1 refers to a signal point obtained by applying a phase rotation of $\pi$ radians to the complex signal point placed in the spatial layer #1.

Table 19 below illustrates an example of correspondence relationships between the input information sequence and the complex signal points placed in each spatial layer according to the example illustrated in FIG. 36. Table 19 illustrates an example in which a 4-bit input information sequence is modulated into two complex signal points s1 and s2 placed in the two spatial layers #1 and #2. Note that the complex signal point s1 is placed in the spatial layer #1 while the complex signal point s2 is placed in the spatial layer #2. Bits #1 and #2 correspond to the first bit sequence, while bits #3 and #4 correspond to the second bit sequence. Note that in the present example, because the second bit sequence is 2 bits, a complex signal point set using QPSK as a base is used for modulation. Note that "sqrt( )" in the table means the square root.

TABLE 19

Example of correspondence relationships between input information sequence and complex signal points placed in each spatial layer

| Information to be imposed | | | | Complex signal points placed in each spatial layer | |
|---|---|---|---|---|---|
| First bit sequence | | Second bit sequence | | | |
| Bit #1 | Bit #2 | Bit #3 | Bit #4 | s1 | s2 |
| 0 | 0 | 0 | 0 | sqrt (2) * (1 + 1j) | 0 + 0j |
| 0 | 0 | 0 | 1 | sqrt (2) * (−1 + 1j) | 0 + 0j |
| 0 | 0 | 1 | 0 | sqrt (2) * (−1 − 1j) | 0 + 0j |
| 0 | 0 | 1 | 1 | sqrt (2) * (1 − 1j) | 0 + 0j |
| 0 | 1 | 0 | 0 | 0 + 0j | sqrt (2) * (1 + 1j) |
| 0 | 1 | 0 | 1 | 0 + 0j | sqrt (2) * (−1 + 1j) |
| 0 | 1 | 1 | 0 | 0 + 0j | sqrt (2) * (−1 − 1j) |
| 0 | 1 | 1 | 1 | 0 + 0j | sqrt (2) * (1 − 1j) |
| 1 | 0 | 0 | 0 | sqrt (2) * (1 + 0j) | sqrt (2) * (1 + 0j) |
| 1 | 0 | 0 | 1 | sqrt (2) * (0 + 1j) | sqrt (2) * (0 + 1j) |
| 1 | 0 | 1 | 0 | sqrt (2) * (−1 + 0j) | sqrt (2) * (−1 + 0j) |
| 1 | 0 | 1 | 1 | sqrt (2) * (0 − 1j) | sqrt (2) * (0 − 1j) |
| 1 | 1 | 0 | 0 | sqrt (2) * (1 + 0j) | sqrt (2) * (−1 + 0j) |
| 1 | 1 | 0 | 1 | sqrt (2) * (0 + 1j) | sqrt (2) * (0 − 1j) |
| 1 | 1 | 1 | 0 | sqrt (2) * (−1 + 0j) | sqrt (2) * (1 + 0j) |
| 1 | 1 | 1 | 1 | sqrt (2) * (0 − 1j) | sqrt (2) * (0 + 1j) |

The first bit sequence includes a first bit that indicates whether or not a spatial layer to which zero (0+0j) is mapped exists among the plurality of spatial layers. The first bit in Table 19 is the bit #1. In the case where the bit #1 is 0, a spatial layer to which zero (0+0j) is mapped exists, whereas in the case where the bit #1 is 1, a spatial layer to which zero (0+0j) is mapped does not exist.

In the case where a spatial layer to which zero (0+0j) is mapped exists, the first bit sequence includes a second bit that indicates the spatial layer to which zero (0+0j) is mapped among the plurality of spatial layers. In other words, in the case where a spatial layer to which zero (0+0j) is mapped exists, the first bit sequence includes a second bit that indicates the spatial layer to which a non-zero complex signal point is mapped among the plurality of spatial layers. The second bit in Table 19 is the bit #2. In the case where the bit #1 is 0 and the bit #2 is 0, the complex signal point s2 placed in the spatial layer #2 is zero (0+0j). On the other hand, in the case where the bit #1 is 0 and the bit #2 is 1, the complex signal point s1 placed in the spatial layer #1 is zero (0+0j).

In the case where a spatial layer to which zero (0+0j) is mapped does not exist, the first bit sequence includes a third bit that indicates whether or not the same complex signal point is mapped to a plurality of spatial layers. The third bit in Table 19 is the bit #2. In the case where the bit #1 is 1 and the bit #2 is 0, the complex signal points s1 and s2 are the same. On the other hand, in the case where the bit #1 is 1 and the bit #2 is 1, the complex signal points s1 and s2 are different. In the case where the complex signal points s1 and s2 are different, it is desirable for these complex signal points to have a predetermined relationship. It is desirable for the predetermined relationship to be expressible with a linear conversion. The predetermined relationship may be a predetermined phase difference, a predetermined amplitude difference, or a combination of the two. For example, the predetermined relationship in the example illustrated in Table 19 is a phase difference of π radians (that is, 180 degrees). Specifically, referring to the row where the bit #1 is 1 and the bit #2 is 1 in Table 19, if a phase rotation of π radians is applied to the complex signal point s1, the result is equal to the complex signal point s2.

The first bit sequence includes a fourth bit that indicates the type of complex signal point set used in the modulation of the second bit sequence. The fourth bit in Table 19 is the bit #1. In the case where the bit #1 is 0, the complex signal point set g1 illustrated in Table 20 below is used in the modulation of the bits #3 and #4. In the case where the bit #1 is 1, the complex signal point set g2 illustrated in Table 21 below is used in the modulation of the bits #3 and #4. Here, it is desirable for the complex signal point sets g0 and g1 to have a predetermined relationship. It is desirable for the predetermined relationship to be expressible with a linear conversion. The predetermined relationship may be a predetermined phase difference, a predetermined amplitude difference, or a combination of the two. For example, the predetermined relationship between the complex signal point set g1 illustrated in Table 20 and the complex signal point set g2 illustrated in Table 21 is a phase difference of π/4 radians (that is, 45 degrees).

TABLE 20

Complex signal point set g1 used in case where bit #1 is 0 in Table 19

| Bit #3 | Bit #4 | Complex signal point |
|---|---|---|
| 0 | 0 | sqrt (2) * (1 + 1j) |
| 0 | 1 | sqrt (2) * (−1 + 1j) |
| 1 | 0 | sqrt (2) * (−1 − 1j) |
| 1 | 1 | sqrt (2) * (1 − 1j) |

TABLE 21

Complex signal point set g2 used in case where bit #1 is 1 in Table 19

| Bit #3 | Bit #4 | Complex signal point |
|---|---|---|
| 0 | 0 | sqrt (2) * (1 + 0j) |
| 0 | 1 | sqrt (2) * (0 + 1j) |
| 1 | 0 | sqrt (2) * (−1 + 0j) |
| 1 | 1 | sqrt (2) * (0 − 1j) |

Second Method

The second method is a method in which 3-bit information is imposed on how to use two spatial layers. In this method, the complex signal point set used for modulation of a plurality of non-zero complex signal points are the same. Hereinafter, this method will be described in detail with reference to FIGS. 37A and 37B.

Figure 37A:
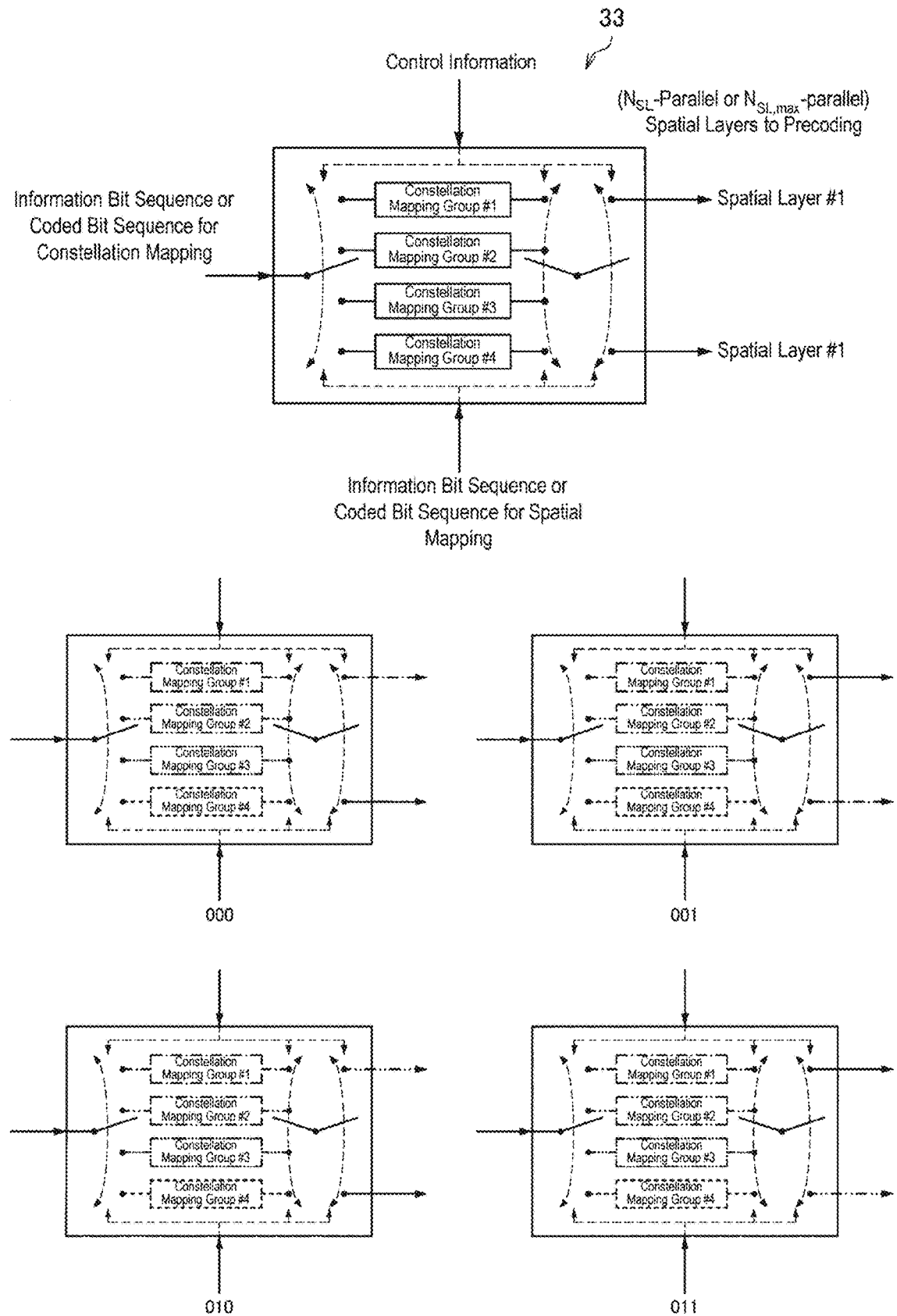
FIG. 37A is a diagram illustrating an example of combinations of first bit sequence candidates and spatial mapping patterns according to the second modification.
Figure 37B:
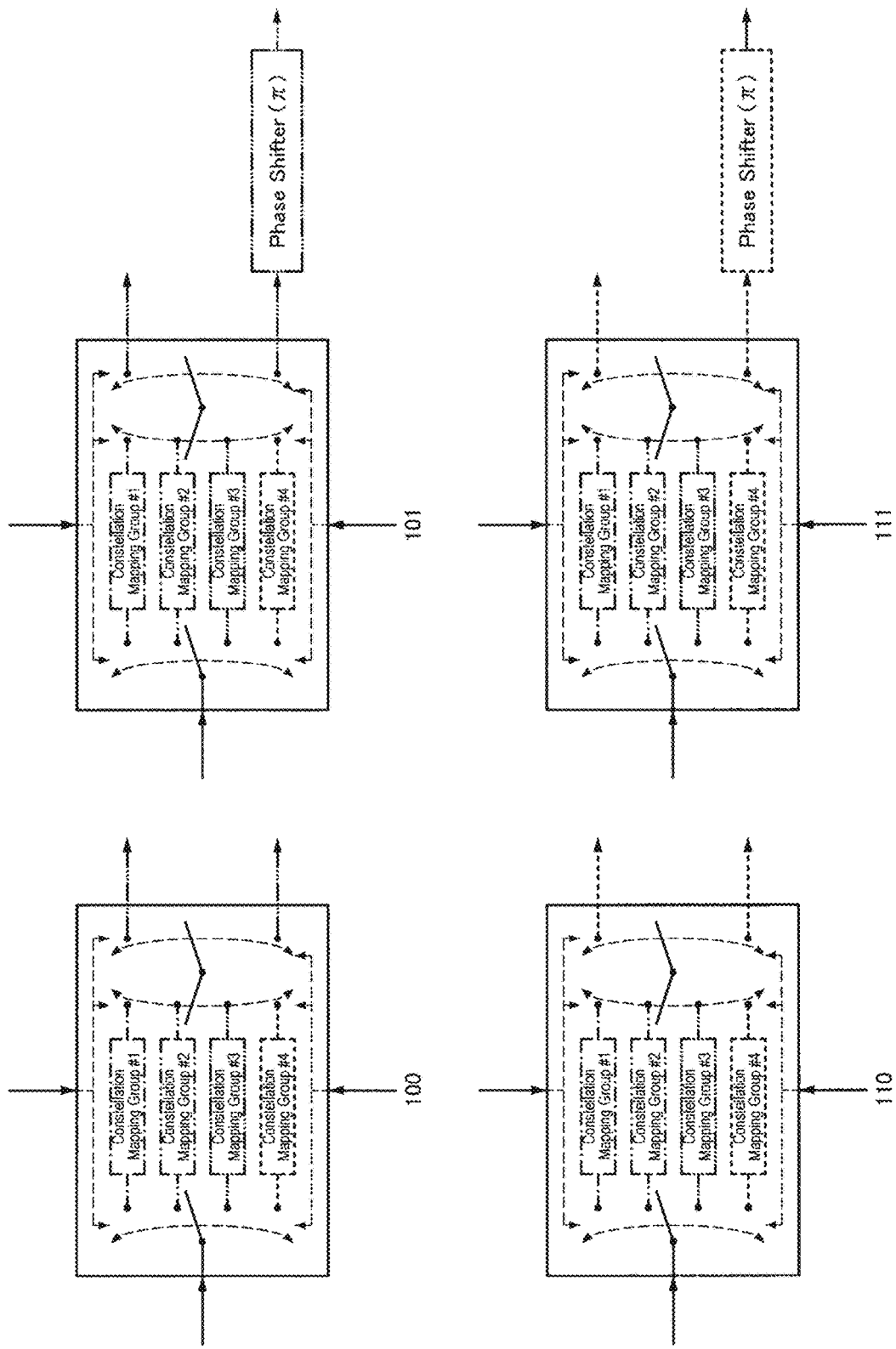
FIG. 37B is a diagram illustrating an example of combinations of first bit sequence candidates and spatial mapping patterns according to the second modification.

FIGS. 37A and 37B are diagrams illustrating an example of combinations of first bit sequence candidates and spatial mapping patterns according to a second modification. In the example illustrated in FIGS. 37A and 37B, the complex signal points belonging to the complex signal point sets g1 to g4 or zero (0+0j) are placed to two spatial layers #1 and #2. The differences between the types of arrows to each spatial layer represent the differences between the complex signal point sets containing the complex signal points mapped in each spatial layer. In the present example, information is imposed on whether or not a spatial layer to which zero (0+0j) is mapped exists among the plurality of spatial layers, whether or not two predetermined complex signal points mapped to the spatial layers are the same, and also the complex signal point set used for modulation. In the present example, such information imposed on the spatial mapping pattern is 3-bit information. Specifically, the information "000" is expressed by placing a complex signal point belonging to the complex signal point set g1 in the spatial layer #1, and placing zero (0+0j) in the spatial layer #2. The information "001" is expressed by placing zero (0+0j) in the spatial layer #1 and placing a complex signal point belonging to the complex signal point set g1 in the spatial layer #2. The information "010" is expressed by placing a complex signal point belonging to the complex signal point set g2 in the spatial layer #1, and placing zero (0+0j) in the spatial layer #2. The information "011" is expressed by placing zero (0+0j) in the spatial layer #1 and placing a complex signal point belonging to the complex signal point set g2 in the spatial layer #2. The information "100" is expressed by placing the same complex signal point belonging to the complex signal point set g3 in the spatial layers #1 and #2. The information "101" is expressed by placing different complex signal points belonging to the complex signal point set g3 in the spatial layers #1 and #2. The information "110" is expressed by placing the same complex signal point belonging to the complex signal point set g4 in the spatial layers #1 and #2. The information "111" is expressed by placing different complex signal points belonging to the complex signal point set g4 in the spatial layers #1 and #2. Here, a different complex signal point placed in the spatial layer #2 and belonging to the same complex signal point set as the complex signal point placed in the spatial layer #1 refers to a signal point obtained by applying a phase rotation of π radians to the complex signal point placed in the spatial layer #1.

Table 22 below illustrates an example of correspondence relationships between the input information sequence and the complex signal points placed in each spatial layer according to the example illustrated in FIGS. 37A and 37B. Table 22 illustrates an example in which a 5-bit input information sequence is modulated into two complex signal points s1 and s2 placed in the two spatial layers #1 and #2. Note that the complex signal point s1 is placed in the spatial layer #1 while the complex signal point s2 is placed in the spatial layer #2. Bits #1 to #3 correspond to the first bit sequence, while bits #4 and #5 correspond to the second bit sequence. Note that in the present example, because the second bit sequence is 2 bits, a complex signal point set using QPSK as a base is used for modulation.

TABLE 22

Example of correspondence relationships between input information sequence and complex signal points placed in each spatial layer

| First bit sequence | | | Second bit sequence | | Complex signal points placed in each spatial layer | |
|---|---|---|---|---|---|---|
| Bit #1 | Bit #2 | Bit #3 | Bit #4 | Bit #5 | s1 | s2 |
| 0 | 0 | 0 | 0 | 0 | sqrt(2) * (1 + 1j) | 0 + 0j |
| 0 | 0 | 0 | 0 | 1 | sqrt(2) * (−1 + 1j) | 0 + 0j |
| 0 | 0 | 0 | 1 | 0 | sqrt(2) * (−1 − 1j) | 0 + 0j |
| 0 | 0 | 0 | 1 | 1 | sqrt(2) * (1 − 1j) | 0 + 0j |
| 0 | 0 | 1 | 0 | 0 | 0 + 0j | sqrt(2) * (1 + 1j) |
| 0 | 0 | 1 | 0 | 1 | 0 + 0j | sqrt(2) * (−1 + 1j) |
| 0 | 0 | 1 | 1 | 0 | 0 + 0j | sqrt(2) * (−1 − 1j) |
| 0 | 0 | 1 | 1 | 1 | 0 + 0j | sqrt(2) * (1 − 1j) |
| 0 | 1 | 0 | 0 | 0 | 2 * (1 + 0j) | 0 + 0j |
| 0 | 1 | 0 | 0 | 1 | 2 * (0 + 1j) | 0 + 0j |
| 0 | 1 | 0 | 1 | 0 | 2 * (−1 + 0j) | 0 + 0j |
| 0 | 1 | 0 | 1 | 1 | 2 * (0 − 1j) | 0 + 0j |
| 0 | 1 | 1 | 0 | 0 | 0 + 0j | (2) * (1 + 0j) |
| 0 | 1 | 1 | 0 | 1 | 0 + 0j | (2) * (0 + 1j) |
| 0 | 1 | 1 | 1 | 0 | 0 + 0j | (2) * (−1 + 0j) |
| 0 | 1 | 1 | 1 | 1 | 0 + 0j | (2) * (0 − 1j) |
| 1 | 0 | 0 | 0 | 0 | sqrt(2) * (1 + 0j) | sqrt(2) * (1 + 0j) |
| 1 | 0 | 0 | 0 | 1 | sqrt(2) * (0 + 1j) | sqrt(2) * (0 + 1j) |
| 1 | 0 | 0 | 1 | 0 | sqrt(2) * (−1 + 0j) | sqrt(2) * (−1 + 0j) |
| 1 | 0 | 0 | 1 | 1 | sqrt(2) * (0 − 1j) | sqrt(2) * (0 − 1j) |
| 1 | 0 | 1 | 0 | 0 | sqrt(2) * (1 + 0j) | sqrt(2) * (−1 + 0j) |
| 1 | 0 | 1 | 0 | 1 | sqrt(2) * (0 + 1j) | sqrt(2) * (0 − 1j) |
| 1 | 0 | 1 | 1 | 0 | sqrt(2) * (−1 + 0j) | sqrt(2) * (1 + 0j) |
| 1 | 0 | 1 | 1 | 1 | sqrt(2) * (0 − 1j) | sqrt(2) * (0 + 1j) |
| 1 | 1 | 0 | 0 | 0 | (1 + 1j) | (1 + 1j) |
| 1 | 1 | 0 | 0 | 1 | (−1 + 1j) | (−1 + 1j) |
| 1 | 1 | 0 | 1 | 0 | (−1 − 1j) | (−1 − 1j) |
| 1 | 1 | 0 | 1 | 1 | (1 − 1j) | (1 − 1j) |
| 1 | 1 | 1 | 0 | 0 | (1 + 1j) | (−1 − 1j) |
| 1 | 1 | 1 | 0 | 1 | (−1 + 1j) | (1 − 1j) |
| 1 | 1 | 1 | 1 | 0 | (−1 − 1j) | (1 + 1j) |
| 1 | 1 | 1 | 1 | 1 | (1 − 1j) | (−1 + 1j) |

The first bit sequence includes a first bit that indicates whether or not a spatial layer to which zero (0+0j) is mapped exists among the plurality of spatial layers. The first bit in Table 22 is the bit #1. In the case where the bit #1 is 0, a spatial layer to which zero (0+0j) is mapped exists, whereas in the case where the bit #1 is 1, a spatial layer to which zero (0+0j) is mapped does not exist.

In the case where a spatial layer to which zero (0+0j) is mapped exists, the first bit sequence includes a second bit that indicates the spatial layer to which zero (0+0j) is mapped among the plurality of spatial layers. In other words, in the case where a spatial layer to which zero (0+0j) is mapped exists, the first bit sequence includes a second bit that indicates the spatial layer to which a non-zero complex signal point is mapped among the plurality of spatial layers. The second bit in Table 22 is the bit #3. In the case where the bit #1 is 0 and the bit #3 is 0, the complex signal point s2 placed in the spatial layer #2 is zero (0+0j). On the other hand, in the case where the bit #1 is 0 and the bit #3 is 1, the complex signal point s1 placed in the spatial layer #1 is zero (0+0j).

In the case where a spatial layer to which zero (0+0j) is mapped does not exist, the first bit sequence includes a third bit that indicates whether or not the same complex signal point is mapped to a plurality of spatial layers. The third bit in Table 22 is the bit #3. In the case where the bit #1 is 1 and the bit #3 is 0, the complex signal points s1 and s2 are the same. On the other hand, in the case where the bit #1 is 1 and the bit #3 is 1, the complex signal points s1 and s2 are different. In the case where the complex signal points s1 and s2 are different, it is desirable for these complex signal points to have a predetermined relationship. It is desirable for the predetermined relationship to be expressible with a linear conversion. The predetermined relationship may be a predetermined phase difference, a predetermined amplitude difference, or a combination of the two. For example, the predetermined relationship in the example illustrated in Table 22 is a phase difference of π radians (that is, 180 degrees). Specifically, referring to the row where the bit #1 is 1 and the bit #3 is 1 in Table 22, if a phase rotation of π radians is applied to the complex signal point s1, the result is equal to the complex signal point s2.

The first bit sequence includes a fourth bit that indicates the type of complex signal point set used in the modulation of the second bit sequence. The fourth bits in Table 22 are the bits #1 and #2. In the case where the bit #1 is 0 and the bit #2 is 0, the complex signal point set g1 illustrated in Table 23 below is used in the modulation of the bits #3 and #4. In the case where the bit #1 is 0 and the bit #2 is 1, the complex signal point set g2 illustrated in Table 24 below is used in the modulation of the bits #3 and #4. In the case where the bit #1 is 1 and the bit #2 is 0, the complex signal point set g3 illustrated in Table 25 below is used in the modulation of the bits #3 and #4. In the case where the bit #1 is 1 and the bit #2 is 1, the complex signal point set g4 illustrated in Table 26 below is used in the modulation of the bits #3 and #4. Here, it is desirable for the complex signal point sets g0 to g4 to have a predetermined relationship. It is desirable for the predetermined relationship to be expressible with a linear conversion. The predetermined relationship may be a predetermined phase difference, a predetermined amplitude difference, or a combination of the two.

TABLE 23

Complex signal point set g1 used in case where bit #1 is 0 and bit #2 is 0 in Table 22

| Bit #4 | Bit #5 | Complex signal point |
|---|---|---|
| 0 | 0 | sqrt (2) * (1 + 1j) |
| 0 | 1 | sqrt (2) * (−1 + 1j) |
| 1 | 0 | sqrt (2) * (−1 − 1j) |
| 1 | 1 | sqrt (2) * (1 − 1j) |

TABLE 24

Complex signal point set g2 used in case where bit #1 is 0 and bit #2 is 1 in Table 22

| Bit #4 | Bit #5 | Complex signal point |
|---|---|---|
| 0 | 0 | 2 * (1 + 0j) |
| 0 | 1 | 2 * (0 + 1j) |
| 1 | 0 | 2 * (−1 + 0j) |
| 1 | 1 | 2 * (0 − 1j) |

TABLE 25

Complex signal point set g3 used in case
where bit #1 is 1 and bit #2 is 0 in Table 22

| Bit #4 | Bit #5 | Complex signal point |
|---|---|---|
| 0 | 0 | sqrt (2) * (1 + 0j) |
| 0 | 1 | sqrt (2) * (0 + 1j) |
| 1 | 0 | sqrt (2) * (−1 + 0j) |
| 1 | 1 | sqrt (2) * (0 − 1j) |

TABLE 26

Complex signal point set g4 used in case
where bit #1 is 1 and bit #2 is 1 in Table 22

| Bit #4 | Bit #5 | Complex signal point |
|---|---|---|
| 0 | 0 | (1 + 1j) |
| 0 | 1 | (−1 + 1j) |
| 1 | 0 | (−1 − 1j) |
| 1 | 1 | (1 − 1j) |

Third Method

The third method is a method in which 3-bit information is imposed on how to use two spatial layers. In this method, the complex signal point set used for modulation of a plurality of non-zero complex signal points are different to each other. Hereinafter, this example will be described in detail with reference to FIGS. 38A and 38B.

Figure 38A:
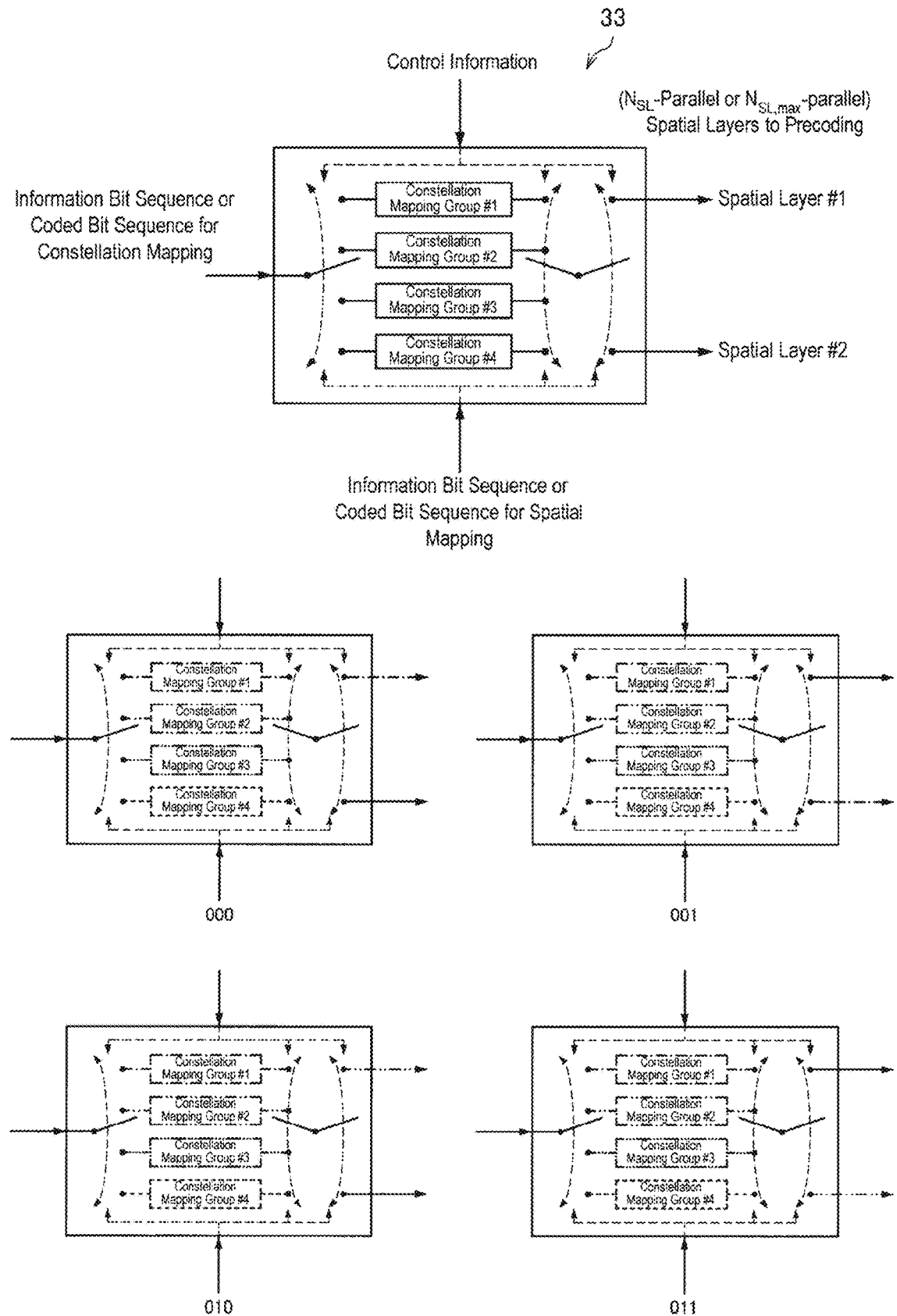
FIG. 38A is a diagram illustrating an example of combinations of first bit sequence candidates and spatial mapping patterns according to the second modification.

FIGS. 38A and 38B are diagrams illustrating an example of combinations of first bit sequence candidates and spatial mapping patterns according to a second modification. In the example illustrated in FIGS. 38A and 38B, the complex signal points belonging to any of the complex signal point sets g1 to g4 or zero (0+0j) are placed to two spatial layers #1 and #2. The differences between the types of arrows to each spatial layer represent the differences between the complex signal point sets containing the complex signal points mapped in each spatial layer. In the present example, information is imposed on whether or not a spatial layer to which zero (0+0j) is mapped exists among the plurality of spatial layers, whether or not a predetermined linear conversion is applied to the complex signal point mapped to the spatial layers, and the complex signal point set used for modulation. In the present example, such information imposed on the spatial mapping pattern is 3-bit information. Specifically, the information "000" is expressed by placing a complex signal point belonging to the complex signal point set g1 in the spatial layer #1, and placing zero (0+0j) in the spatial layer #2. The information "001" is expressed by placing zero (0+0j) in the spatial layer #1 and placing a complex signal point belonging to the complex signal point set g1 in the spatial layer #2. The information "010" is expressed by placing a complex signal point belonging to the complex signal point set g2 in the spatial layer #1, and placing zero (0+0j) in the spatial layer #2. The information "011" is expressed by placing zero (0+0j) in the spatial layer #1 and placing a complex signal point belonging to the complex signal point set g2 in the spatial layer #2. The information "100" is expressed by placing a complex signal point belonging to the complex signal point set g3 in the spatial layer #1, placing a complex signal point belonging to the complex signal point set g4 in the spatial layer #2, and not applying a predetermined linear conversion to the complex signal point placed in the spatial layer #2. The information "101" is expressed by placing a complex signal point belonging to the complex signal point set g3 in the spatial layer #1, placing a complex signal point belonging to the complex signal point set g4 in the spatial layer #2, and applying a predetermined linear conversion to the complex signal point placed in the spatial layer #2. The information "110" is expressed by placing a complex signal point belonging to the complex signal point set g4 in the spatial layer #1, placing a complex signal point belonging to the complex signal point set g3 in the spatial layer #2, and not applying a predetermined linear conversion to the complex signal point placed in the spatial layer #2. The information "111" is expressed by placing a complex signal point belonging to the complex signal point set g4 in the spatial layer #1, placing a complex signal point belonging to the complex signal point set g3 in the spatial layer #2, and applying a predetermined linear conversion to the complex signal point placed in the spatial layer #2. Here, the predetermined linear conversion in the examples illustrated in FIGS. 38A and 38B is a phase rotation by $\pi$ radians.

Table 27 below illustrates an example of correspondence relationships between the input information sequence and the complex signal points placed in each spatial layer according to the example illustrated in FIGS. 38A and 38B. Table 27 illustrates an example in which a 5-bit input information sequence is modulated into two complex signal points s1 and s2 placed in the two spatial layers #1 and #2. Note that the complex signal point s1 is placed in the spatial layer #1 while the complex signal point s2 is placed in the spatial layer #2. Bits #1 to #3 correspond to the first bit sequence, while bits #4 and #5 correspond to the second bit sequence. Note that in the present example, because the second bit sequence is 2 bits, a complex signal point set using QPSK as a base is used for modulation.

TABLE 27

Example of correspondence relationships
between input information sequence and
complex signal points placed in each spatial layer

| Information to be imposed | | | | | Complex signal points | |
|---|---|---|---|---|---|---|
| First bit sequence | | | Second bit sequence | | | |
| Bit #1 | Bit #2 | Bit #3 | Bit #4 | Bit #5 | s1 | s2 |
| 0 | 0 | 0 | 0 | 0 | sqrt(2) * (1 + 1j) | 0 + 0j |
| 0 | 0 | 0 | 0 | 1 | sqrt(2) * (−1 + 1j) | 0 + 0j |
| 0 | 0 | 0 | 1 | 0 | sqrt(2) * (−1 − 1j) | 0 + 0j |
| 0 | 0 | 0 | 1 | 1 | sqrt(2) * (1 − 1j) | 0 + 0j |
| 0 | 0 | 1 | 0 | 0 | 0 + 0j | sqrt(2) * (1 + 1j) |
| 0 | 0 | 1 | 0 | 1 | 0 + 0j | sqrt(2) * (−1 + 1j) |
| 0 | 0 | 1 | 1 | 0 | 0 + 0j | sqrt(2) * (−1 − 1j) |
| 0 | 0 | 1 | 1 | 1 | 0 + 0j | sqrt(2) * (1 − 1j) |
| 0 | 1 | 0 | 0 | 0 | 2 * (1 + 0j) | 0 + 0j |
| 0 | 1 | 0 | 0 | 1 | 2 * (0 + 1j) | 0 + 0j |
| 0 | 1 | 0 | 1 | 0 | 2 * (−1 + 0j) | 0 + 0j |
| 0 | 1 | 0 | 1 | 1 | 2 * (0 − 1j) | 0 + 0j |
| 0 | 1 | 1 | 0 | 0 | 0 + 0j | (2) * (1 + 0j) |
| 0 | 1 | 1 | 0 | 1 | 0 + 0j | (2) * (0 + 1j) |
| 0 | 1 | 1 | 1 | 0 | 0 + 0j | (2) * (−1 + 0j) |
| 0 | 1 | 1 | 1 | 1 | 0 + 0j | (2) * (0 − 1j) |
| 1 | 0 | 0 | 0 | 0 | sqrt(2) * (1 + 0j) | (1 + 1j) |
| 1 | 0 | 0 | 0 | 1 | sqrt(2) * (0 + 1j) | (−1 + 1j) |
| 1 | 0 | 0 | 1 | 0 | sqrt(2) * (−1 + 0j) | (−1 − 1j) |
| 1 | 0 | 0 | 1 | 1 | sqrt(2) * (0 − 1j) | (1 − 1j) |
| 1 | 0 | 1 | 0 | 0 | sqrt(2) * (1 + 0j) | (−1 − 1j) |
| 1 | 0 | 1 | 0 | 1 | sqrt(2) * (0 + 1j) | (1 − 1j) |
| 1 | 0 | 1 | 1 | 0 | sqrt(2) * (−1 + 0j) | (1 + 1j) |

TABLE 27-continued

Example of correspondence relationships
between input information sequence and
complex signal points placed in each spatial layer

| Information to be imposed | | | | | Complex signal points placed in each spatial layer | |
|---|---|---|---|---|---|---|
| First bit sequence | | | Second bit sequence | | | |
| Bit #1 | Bit #2 | Bit #3 | Bit #4 | Bit #5 | s1 | s2 |
| 1 | 0 | 1 | 1 | 1 | sqrt(2) * (0 − 1j) | (−1 + 1j) |
| 1 | 1 | 0 | 0 | 0 | (1 + 1j) | sqrt(2) * (1 + 0j) |
| 1 | 1 | 0 | 0 | 1 | (−1 + 1j) | sqrt(2) * (0 + 1j) |
| 1 | 1 | 0 | 1 | 0 | (−1 − 1j) | sqrt(2) * (−1 + 0j) |
| 1 | 1 | 0 | 1 | 1 | (1 − 1j) | sqrt(2) * (0 − 1j) |
| 1 | 1 | 1 | 0 | 0 | (1 + 1j) | sqrt(2) * (−1 + 0j) |
| 1 | 1 | 1 | 0 | 1 | (−1 + 1j) | sqrt(2) * (0 − 1j) |
| 1 | 1 | 1 | 1 | 0 | (−1 − 1j) | sqrt(2) * (1 + 0j) |
| 1 | 1 | 1 | 1 | 1 | (1 − 1j) | sqrt(2) * (0 + 1j) |

The first bit sequence includes a first bit that indicates whether or not a spatial layer to which zero (0+0j) is mapped exists among the plurality of spatial layers. The first bit in Table 27 is the bit #1. In the case where the bit #1 is 0, a spatial layer to which zero (0+0j) is mapped exists, whereas in the case where the bit #1 is 1, a spatial layer to which zero (0+0j) is mapped does not exist.

In the case where a spatial layer to which zero (0+0j) is mapped exists, the first bit sequence includes a second bit that indicates the spatial layer to which zero (0+0j) is mapped among the plurality of spatial layers. In other words, in the case where a spatial layer to which zero (0+0j) is mapped exists, the first bit sequence includes a second bit that indicates the spatial layer to which a non-zero complex signal point is mapped among the plurality of spatial layers. The second bit in Table 27 is the bit #3. In the case where the bit #1 is 0 and the bit #3 is 0, the complex signal point s2 placed in the spatial layer #2 is zero (0+0j). On the other hand, in the case where the bit #1 is 0 and the bit #3 is 1, the complex signal point s1 placed in the spatial layer #1 is zero (0+0j).

The first bit sequence includes a fourth bit that indicates the type of complex signal point set used in the modulation of the second bit sequence. The fourth bits in Table 27 are the bits #1 and #2. In the case where the bit #1 is 0 and the bit #2 is 0, the complex signal point set g1 illustrated in Table 23 above is used in the modulation of the bits #3 and #4. In the case where the bit #1 is 0 and the bit #2 is 1, the complex signal point set g2 illustrated in Table 24 above is used in the modulation of the bits #3 and #4. In the case where the bit #1 is 1 and the bit #2 is 0, the complex signal point set g3 illustrated in Table 25 above is used in the modulation of the bits #3 and #4. In the case where the bit #1 is 1 and the bit #2 is 1, the complex signal point set g4 illustrated in Table 26 above is used in the modulation of the bits #3 and #4. Here, it is desirable for the complex signal point sets g0 to g4 to have a predetermined relationship. It is desirable for the predetermined relationship to be expressible with a linear conversion. The predetermined relationship may be a predetermined phase difference, a predetermined amplitude difference, or a combination of the two.

In the case where a spatial layer to which zero (0+0j) is mapped does not exist, the first bit sequence includes a fifth bit that indicates whether or not the predetermined linear conversion is applied to the complex signal point. The fifth bit in Table 27 is the bit #3. In the case where the bit #1 is 1 and the bit #3 is 0, the predetermined linear conversion is not applied to the complex signal point s2. On the other hand, in the case where the bit #1 is 1 and the bit #3 is 1, the predetermined linear conversion is applied to the complex signal point s2. The predetermined linear conversion may be a predetermined phase rotation, a predetermined amplitude increase or decrease, or a combination of the two. For example, the predetermined linear conversion in the example illustrated in Table 27 is a phase rotation of $\pi$ radians (that is, 180 degrees). For example, the phase difference between the complex signal point s2 in the case where the input information sequence is (1, 0, 0, 0, 0) and the complex signal point s2 in the case where the input information sequence is (1, 0, 1, 0, 0) is $\pi$ radians. With this arrangement, an effect of widening the Euclidean distance of a signal point combining the complex signal points s1 and s2 can be expected.

Supplement

In the first to third methods above, the predetermined relationship between complex signal point sets is described as being desirably expressible with linear conversion, but the predetermined relationship may also be thought of in a different way. As an example, the predetermined relationship between complex signal point sets may also be thought of as a relationship having a different way of allocating the real part and the imaginary part of the complex signal point sets. For example, whereas a signal component is allocated to each of the real part and the imaginary part in the complex signal point set g1 illustrated in Table 20 above, a signal component is allocated only to the real part or the imaginary part in the complex signal point set g2 illustrated in Table 21 above.

About Euclidean Distance Between Complex Signal Point Sequences

Tables 19, 22, and 27 above illustrate examples of correspondence relationships between the input information sequence and the complex signal points placed in each spatial layer according to each method. In all of the methods, with regard to complex signal point sequences containing complex signal points placed in each of the spatial layers, it is desirable for the Euclidean distance or the minimum Euclidean distance between a plurality of complex signal point sequences to be equal to or greater than a predetermined threshold. This is because in the modulation methods of the related art (such as QPSK, for example), the minimum Euclidean distance between a certain single complex signal point (that is, a complex scalar) and a different single complex signal point is taken into account (that is, treated as important).

Assume that a complex vector with L elements (that is, a complex signal point sequence) has been defined in D ways. For example, in the case of Table 19, L=2 and D=16, while in the case of Tables 22 and 27, L=2 and D=32. Of these, the Euclidean distance $E_{m,n}$ between two different complex vectors $s_m$ and $s_n$ is defined by the following formula.

$$E_{m,n} = \sqrt{\sum_{l=1}^{L} |s_{m,l} - s_{n,l}|^2} \tag{57}$$

Here, $s_{m,l}$ and $s_{n,l}$ are the lth elements of the complex vectors $s_m$ and $s_n$, respectively. It is desirable for the Euclidean distance $E_{m,n}$ to be equal to or greater than a predetermined threshold $E_{th}$ for all pairs of complex vectors. In other words, it is desirable for the following formula to hold true.

$$E_{m,n} \geq E_{th}, \text{ where } 1 \leq m,n \leq L, m \neq n \quad (58)$$

Alternatively, it is desirable for the minimum Euclidean distance $E_{min}$ of the Euclidean distance $E_{m,n}$ for all pairs of complex vectors to be equal to or greater than a predetermined threshold $E_{th}$. In other words, it is desirable for the following formula to hold true.

$$E_{min} \geq E_{th} \quad (59)$$
$$\text{where } E_{min} = \min_{1 \leq m,n \leq L, m \neq n} E_{m,n}$$

Here, the minimum Euclidean distance $E_{min,g}$ between complex signal points (that is, complex scalars) inside a certain complex signal point set g among the complex signal point sets used when defining the target complex vectors may be used as the predetermined threshold $E_{th}$. Alternatively, a value $\delta E_{min,g}$ obtained by applying a coefficient $\delta$ (where $\delta \geq 0$) to the minimum Euclidean distance $E_{min,g}$ may be used as the predetermined threshold $E_{th}$.

Effects of Modification

Comparing FIG. 14 to FIG. 36, the information imposed on how to use the spatial layers is 2 bits for both, but the number of spatial layers that are used is 4 in FIGS. 14 and 2 in FIG. 36. Also, comparing FIG. 14 to FIGS. 37A and 37B and FIGS. 38A and 38B, the number of spatial layers that are used is 4 for both, but the information imposed on how to use the spatial layers is 2 bits in FIG. 14 and 3 bits in FIGS. 37A and 37B and FIGS. 38A and 38B. In other words, the present modification is capable of increasing the amount of information that can be imposed per number of spatial layers compared to the modulation method described with reference to FIGS. 12 to 14.

4. APPLICATION EXAMPLES

The technology according to the present disclosure can be applied to various products. The transmission device 100 or the reception device 200 may be realized as any type of an evolved Node B (eNB) such as a micro eNB, or a small eNB. The small eNB may be an eNB that covers a cell, such as a pico eNB, a micro eNB, or a home (femto) eNB, smaller than a macrocell. Instead, the transmission device 100 or the reception device 200 may be realized as another type of base station such as a NodeB or a base transceiver station (BTS). The transmission device 100 or the reception device 200 may include a main entity (also referred to as a base station device) that controls wireless communication and one or more remote radio heads (RRHs) disposed at different locations from the main entity. Further, various types of terminals to be described below may operate as the transmission device 100 or the reception device 200 by performing a base station function temporarily or semi-permanently.

Further, for example, the transmission device 100 or the reception device 200 may be realized as a mobile terminal such as a smartphone, a tablet personal computer (PC), a notebook PC, a portable game terminal, a portable/dongle mobile router or a digital camera, or an in-vehicle terminal such as a car navigation apparatus. Further, the transmission device 100 or the reception device 200 may be realized as a terminal that performs machine to machine (M2M) communication (also referred to as a machine type communication (MTC) terminal). Moreover, the transmission device 100 or the reception device 200 may be a wireless communication module mounted on the terminal (for example, an integrated circuit module configured on one die).

4.1. Application Examples for Base Station

First Application Example

Figure 39:
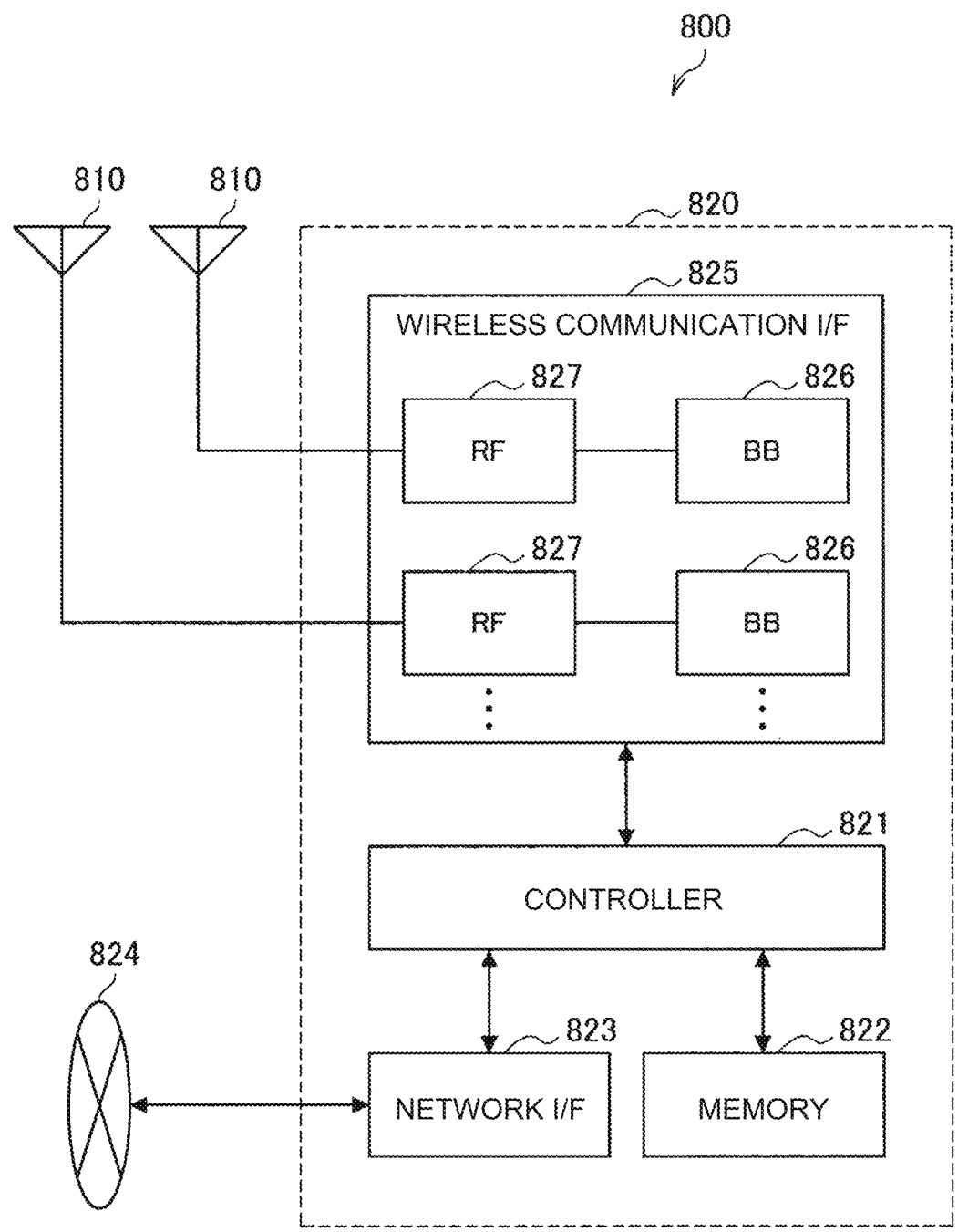
FIG. 39 is a block diagram illustrating a first example of a schematic configuration of an eNB.

FIG. 39 is a block diagram illustrating a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (e.g., a plurality of antenna elements constituting a MIMO antenna) and is used for the base station device 820 to transmit and receive a wireless signal. The eNB 800 may include the plurality of the antennas 810 as illustrated in FIG. 39, and the plurality of antennas 810 may, for example, correspond to a plurality of frequency bands used by the eNB 800. It should be noted that while FIG. 39 illustrates an example in which the eNB 800 includes the plurality of antennas 810, the eNB 800 may include the single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station device 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include the plurality of BB processors 826 as illustrated in FIG. 39, and the plurality of BB processors 826 may, for example, correspond to a plurality of frequency bands used by the eNB 800. Further, the wireless communication interface 825 may also include a plurality of the RF circuits 827, as illustrated in FIG. 39, and the plurality of RF circuits 827 may, for example, correspond to a plurality of antenna elements. Note that FIG. 39 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 39, one or more constituent elements (the information sharing unit 141 and/or the transmission signal processing unit 143) included in the control unit 140 described with reference to FIG. 5 and/or one or more constituent elements (the information sharing unit 241 and/or the reception signal processing unit 243) included in the control unit 240 described with reference to FIG. 6 may be implemented in the wireless communication interface 825. Alternatively, at least some of the constituent elements may be implemented in the controller 821. As one example, a module including a part or the whole of (for example, the BB processor 826) of the wireless communication interface 825 and/or the controller 821 may be mounted on the eNB 800. The one or more constituent elements may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 800, and the wireless communication interface 825 (for example, the BB processor 826) and/or the controller 821 may execute the program. In this way, the eNB 800, the base station device 820, or the module may be provided as a device including the one or more constituent elements and a program causing the processor to function as the one or more constituent elements may be provided. In addition, a readable recording medium on which the program is recorded may be provided.

Further, in the eNB 800 illustrated in FIG. 39, the wireless communication unit 120 described with reference to FIG. 5 and/or the wireless communication unit 220 described with reference to FIG. 6 may be implemented in the wireless communication interface 825 (for example, the RF circuit 827). Further, the antenna unit 110 and/or the antenna unit 210 may be implemented in the antenna 810. Further, the storage unit 130 and/or the storage unit 230 may be implemented in the memory 822.

Second Application Example

Figure 40:
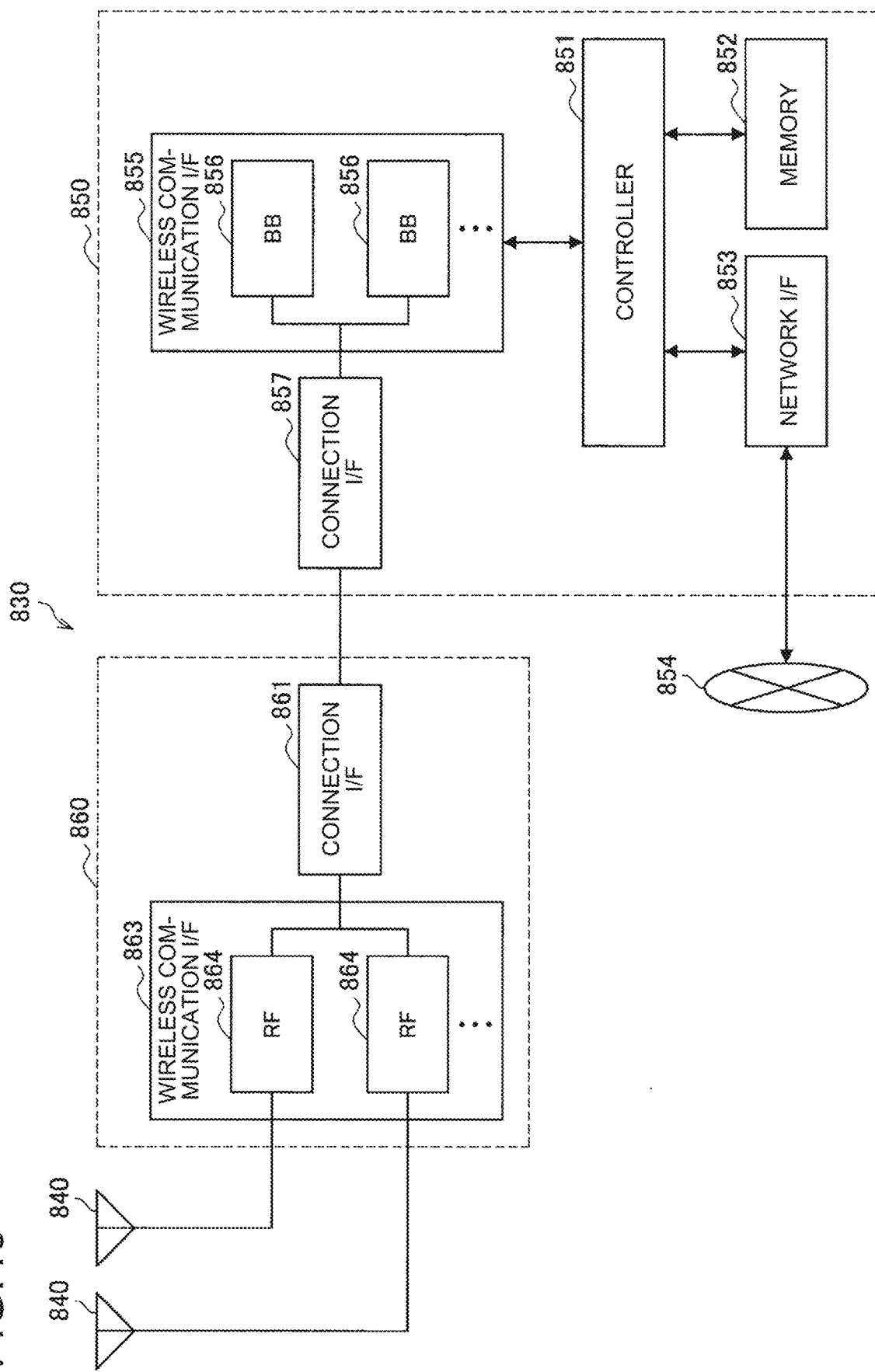
FIG. 40 is a block diagram illustrating a second example of the schematic configuration of the eNB.

FIG. 40 is a block diagram illustrating a second example of a schematic configuration of an eNB to which the technology according to the present disclosure may be applied. An eNB 830 includes one or more antennas 840, a base station device 850, and an RRH 860. Each of the antennas 840 and the RRH 860 may be connected to each other via an RF cable. Further, the base station device 850 and the RRH 860 may be connected to each other by a high speed line such as optical fiber cables.

Each of the antennas 840 includes a single or a plurality of antenna elements (e.g., a plurality of antenna elements constituting a MIMO antenna), and is used for the RRH 860 to transmit and receive a wireless signal. The eNB 830 may include a plurality of the antennas 840 as illustrated in FIG. 40, and the plurality of antennas 840 may, for example, correspond to a plurality of frequency bands used by the eNB 830. Note that FIG. 40 illustrates an example in which the eNB 830 includes the plurality of antennas 840, but the eNB 830 may include the single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 39.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 39 except that the BB processor 856 is connected to an RF circuit 864 of the RRH 860 via the connection interface 857. The wireless communication interface 855 may include a plurality of the BB processors 856, as illustrated in FIG. 40, and the plurality of BB processors 856 may, for example, correspond to a plurality of frequency bands used by the eNB 830. Note that FIG. 40 illustrates an example in which the wireless communication interface 855 includes the plurality of BB processors 856, but the wireless communication interface 855 may include the single BB processor 856.

The connection interface 857 is an interface for connecting the base station device 850 (wireless communication interface 855) to the RRH 860. The connection interface 857 may be a communication module for communication on the high speed line which connects the base station device 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier, and the like, and transmits and receives a wireless signal via the antenna 840. The wireless communication interface 863 may include a plurality of the RF circuits 864 as illustrated in FIG. 40, and the plurality of RF circuits 864 may, for example, correspond to a plurality of antenna elements. Note that FIG. 40 illustrates an example in which the wireless communication interface 863 includes the plurality of RF circuits 864, but the wireless communication interface 863 may include the single RF circuit 864.

In the eNB 830 illustrated in FIG. 40, one or more constituent elements (the information sharing unit 141 and/or the transmission signal processing unit 143) included in the control unit 140 described with reference to FIG. 5 and/or one or more constituent elements (the information sharing unit 241 and/or the reception signal processing unit 243) included in the control unit 240 described with reference to FIG. 6 may be implemented in the wireless communication interface 855 and/or the wireless communication interface 863. Alternatively, at least some of the constituent elements may be implemented in the controller 851. As one example, a module including a part or the whole of (for example, the BB processor 856) of the wireless communication interface 855 and/or the controller 851 may be mounted on the eNB 830. The one or more constituent elements may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 830, and the wireless communication interface 855 (for example, the BB processor 856) and/or the controller 851 may execute the program. In this way, the eNB 830, the base station device 850, or the module may be provided as a device including the one or more constituent elements and a program causing the processor to function as the one or more constituent elements may be provided. In addition, a readable recording medium on which the program is recorded may be provided.

Further, in the eNB 830 illustrated in FIG. 40, for example, the wireless communication unit 120 described with reference to FIG. 5 and/or the wireless communication unit 220 described with reference to FIG. 6 may be implemented in the wireless communication interface 863 (for example, the RF circuit 864). Further, the antenna unit 110 and/or the antenna unit 210 may be implemented in the antenna 840. Further, the storage unit 130 and/or the storage unit 230 may be implemented in the memory 852.

4.2. Application Examples for Terminal Device

First Application Example

Figure 41:
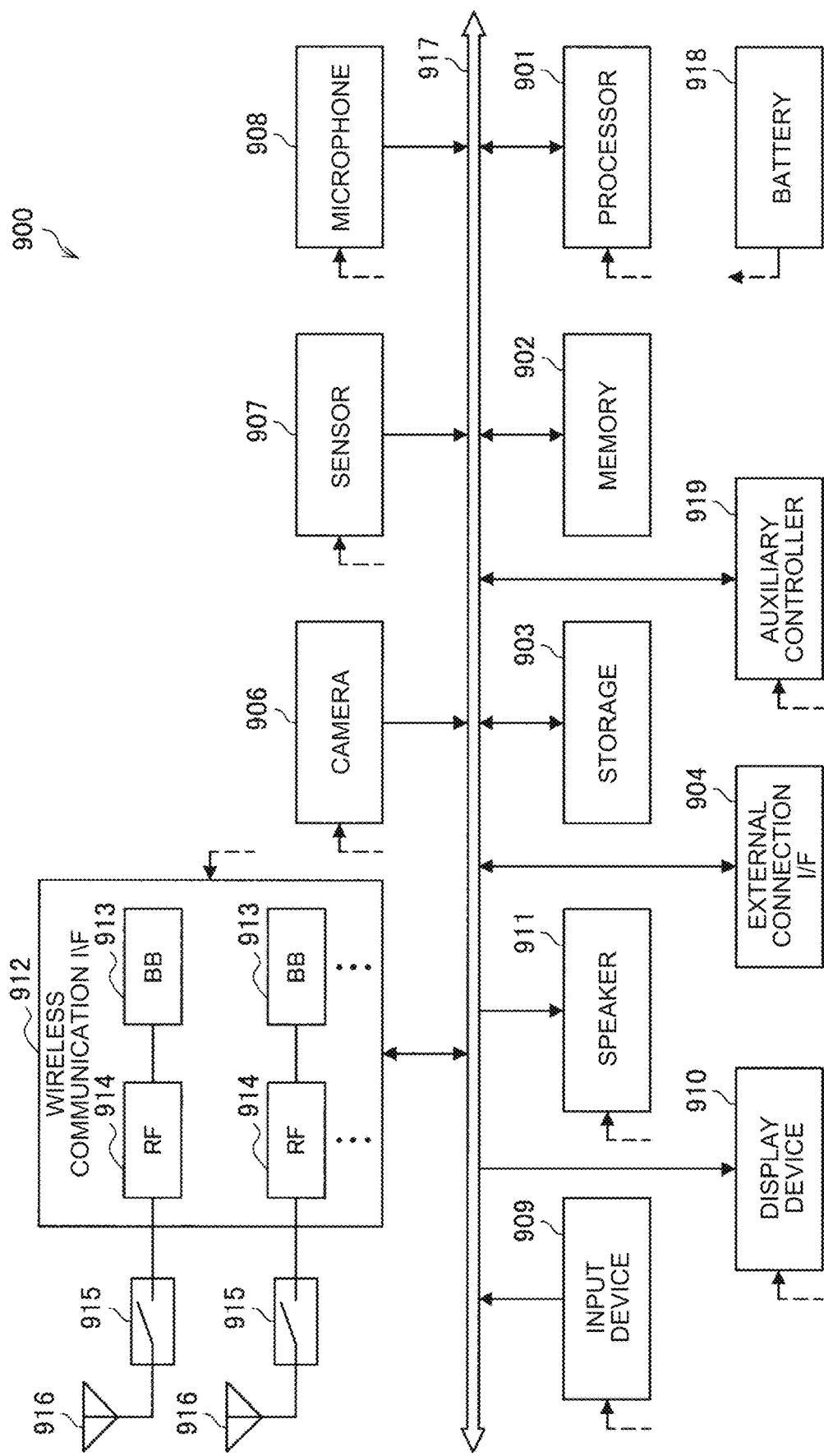
FIG. 41 is a block diagram illustrating an example of a schematic configuration of a smartphone.

FIG. 41 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 41. Note that FIG. 41 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field wireless communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 41. Note that FIG. 41 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 41 via a feeder line that is partially illustrated in the figure as a dashed line. The auxiliary controller 919, for example, operates a minimally necessary function of the smartphone 900 in a sleep mode.

In the smartphone 900 illustrated in FIG. 41, one or more constituent elements (the information sharing unit 141 and/or the transmission signal processing unit 143) included in the control unit 140 described with reference to FIG. 5 and/or one or more constituent elements (the information sharing unit 241 and/or the reception signal processing unit 243) included in the control unit 240 described with reference to FIG. 6 may be implemented in the wireless communication interface 912. Alternatively, at least some of the constituent elements may be implemented in the processor 901 or the auxiliary controller 919. As one example, a module including a part or the whole of (for example, the BB processor 913) of the wireless communication interface 912, the processor 901, and/or the auxiliary controller 919 may be mounted on the smartphone 900. The one or more constituent elements may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the smartphone 900, and the wireless communication interface 912 (for example, the BB processor 913), the processor 901, and/or the auxiliary controller 919 may execute the program. In this way, the smartphone 900 or the module may be provided as a device including the one or more constituent elements and a program causing the processor to function as the one or more constituent elements may be provided. In addition, a readable recording medium on which the program is recorded may be provided.

Further, in the smartphone 900 illustrated in FIG. 41, the wireless communication unit 120 described with reference to FIG. 5 and/or the wireless communication unit 220 described with reference to FIG. 6 may be implemented in the wireless communication interface 912 (for example, the RF circuit 914). Further, the antenna unit 110 and/or the antenna unit 210 may be implemented in the antenna 916. Further, the storage unit 130 and/or the storage unit 230 may be implemented in the memory 902.

Second Application Example

Figure 42:
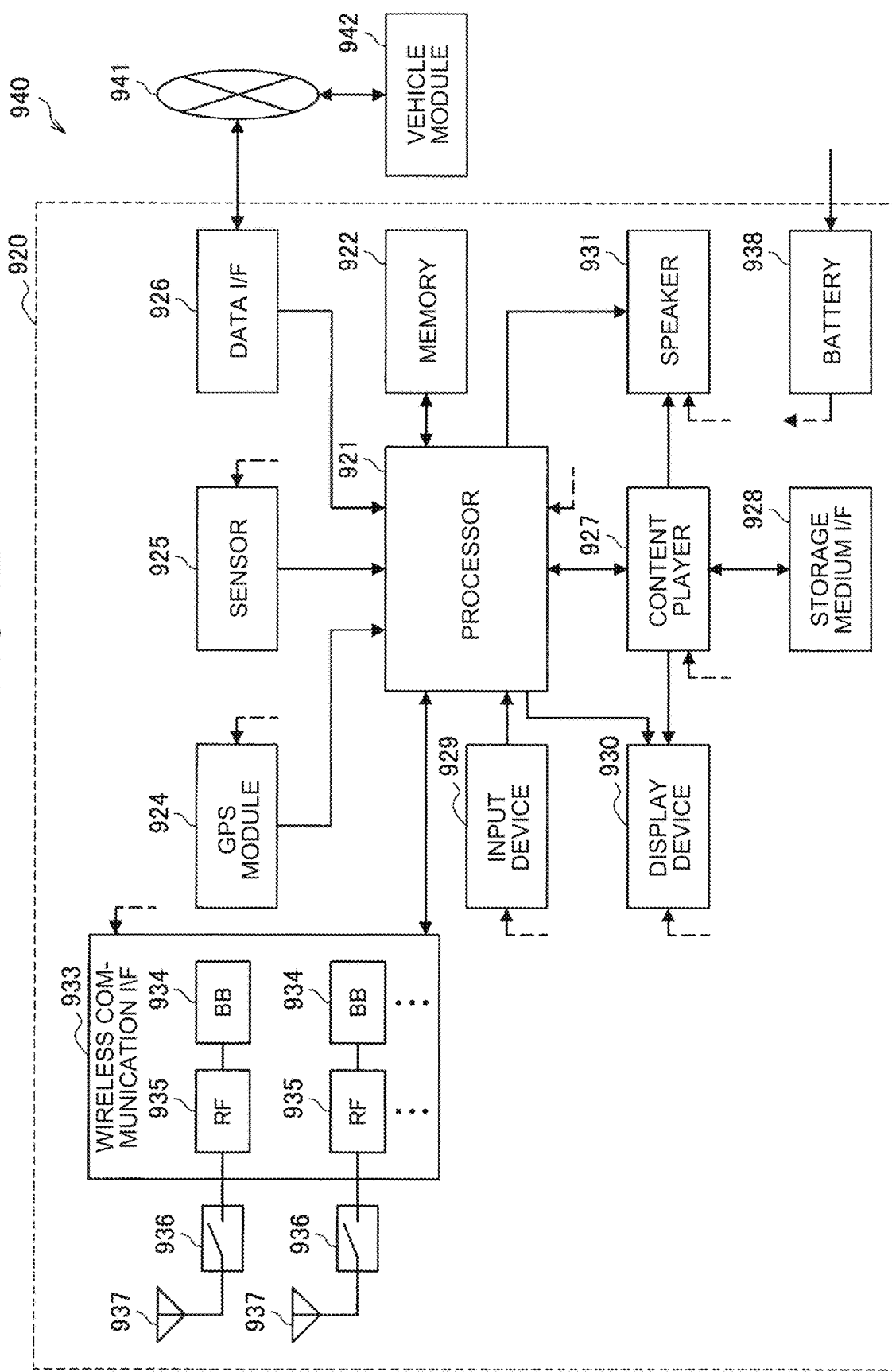
FIG. 42 is a block diagram illustrating an example of a schematic configuration of a car navigation apparatus.

FIG. 42 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 42. Note that FIG. 42 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field wireless communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 42. Note that FIG. 42 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 42 via a feeder line that is partially illustrated in the figure as a dashed line. Further, the battery 938 accumulates the electric power supplied from the vehicle.

In the car navigation apparatus 920 illustrated in FIG. 42, one or more constituent elements (the information sharing unit 141 and/or the transmission signal processing unit 143) included in the control unit 140 described with reference to FIG. 5 and/or one or more constituent elements (the information sharing unit 241 and/or the reception signal processing unit 243) included in the control unit 240 described with reference to FIG. 6 may be implemented in the wireless communication interface 933. Alternatively, at least some of the constituent elements may be implemented in the processor 921. As one example, a module including a part or the whole of (for example, the BB processor 934) of the wireless communication interface 933 and/or the processor 921 may be mounted on the car navigation apparatus 920. The one or more constituent elements may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the car navigation apparatus 920, and the wireless communication interface 933 (for example, the BB processor 934) and/or the processor 921 may execute the program. In this way, the car navigation apparatus 920 or the module may be provided as a device including the one or more constituent elements and a program causing the processor to function as the one or more constituent elements may be provided. In addition, a readable recording medium on which the program is recorded may be provided.

Further, in the car navigation apparatus 920 illustrated in FIG. 42, for example, the wireless communication unit 120 described with reference to FIG. 5 and/or the wireless communication unit 220 described with reference to FIG. 6 may be implemented in the wireless communication interface 933 (for example, the RF circuit 935). Further, the antenna unit 110 and/or the antenna unit 210 may be implemented in the antenna 937. Further, the storage unit 130 and/or the storage unit 230 may be implemented in the memory 922.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

5. CONCLUSION

The foregoing references FIGS. 1 to 42 to describe one embodiment of the present disclosure in detail. As described above, the transmission device 100 according to the present embodiment may perform modulation using a precoding matrix. Specifically, the transmission device 100 applies a precoding matrix on the basis of the first bit sequence to the complex signal point sequence converted from the second bit sequence. Here, the precoding matrix applied to the complex signal point sequence corresponds to the first bit sequence in a predetermined combination of a first bit sequence candidate and each element of a set of precoding matrices. With this arrangement, it is possible to impose the first bit sequence on the precoding matrices.

Also, the transmission device 100 according to the present embodiment may perform new spatial modulation. Specifically, the transmission device 100 performs spatial layer mapping that maps a complex signal point sequence converted from the second bit sequence to at least one of a plurality of spatial layers on the basis of the first bit sequence. Here, the mapping pattern with respect to spatial layers corresponds to the first bit sequence in a plurality of predetermined combinations of a first bit sequence candidate and the mapping pattern. With this arrangement, it is possible to impose the first bit sequence on the mapping pattern of the spatial layers.

According to the present embodiment, information is imposed on the precoding matrices and the mapping pattern with respect to spatial layers, on which information is not imposed in MIMO of the related art. Consequently, it is possible to attain an improvement in MIMO resource efficiency and better transmission and reception characteristics. Furthermore, it is possible to avoid or alleviate an increase in the PAPR and a burden on the analog/RF circuit associated with antenna switching, which is a problem in the spatial modulation of the related art.

The preferred embodiments of the present disclosure have been described in detail above with reference to the accompanying drawings, but the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

In addition, the processing described with reference to the flowcharts and sequence diagrams in the present specification are not necessarily executed in the illustrated order. Some processing Steps may be performed in parallel. Additional process steps may be employed, and some process steps may be omitted.

Further, the effects described in this specification are merely illustrative or exemplified effects, and are not limitative. That is, the technology according to the present disclosure can exhibit other effects that are apparent to those skilled in the art from the description of the present specification in addition to or instead of the above effects.

Note that the following configurations come under the technical scope of the present disclosure.

(1)

A transmission device comprising:

a signal processing unit that applies a precoding matrix on the basis of a first bit sequence to a complex signal point sequence converted from a second bit sequence, wherein the precoding matrix applied to the complex signal point sequence corresponds to the first bit sequence in a predetermined combination of a first bit sequence candidate and each element of a set of precoding matrices.

(2)

The transmission device according to (1), wherein elements at a specific position in a plurality of precoding matrices included in the set are equal to each other.

(3)

The transmission device according to (1) or (2), wherein two different elements in a precoding matrix at least have a phase difference that is an integer multiple of a first value or an amplitude ratio that is an integer multiple or an integral submultiple of a second value.

(4)

The transmission device according to any one of (1) to (3), wherein the set is defined for each combination of a number of antennas and a number of spatial layers, and a set with fewer elements is a subset of a set with more elements.

(5)

A transmission device comprising:

a signal processing unit that performs a spatial layer mapping that maps a complex signal point sequence converted from a second bit sequence to at least one of a plurality of spatial layers on the basis of a first bit sequence, wherein a mapping pattern with respect to spatial layers corresponds to the first bit sequence in a plurality of predetermined combinations of a first bit sequence candidate and the mapping pattern.

(6)

The transmission device according to (5), wherein the mapping pattern is a pattern indicating which complex signal point set from among a plurality of complex signal point sets contains, as elements, each of the complex signal points mapped to two or more spatial layers among the plurality of spatial layers.

(7)

The transmission device according to (6), wherein the signal processing unit selects the mapping pattern on the basis of the first bit sequence, and converts the second bit sequence into the complex signal point sequence containing complex signal points selected from each of the plurality of complex signal point sets on the basis of the mapping pattern.

(8)

The transmission device according to (6), wherein the signal processing unit converts the second bit sequence into a temporary complex signal point sequence on the basis of a predetermined complex signal point set, and generates the complex signal point sequence by applying arithmetic processing based on the first bit sequence to each of the plurality of complex signal points included in the temporary complex signal point sequence.

(9)

The transmission device according to any one of (6) to (8), wherein the plurality of complex signal point sets exist in a linear relationship with each other.

(10)

The transmission device according to any one of (6) to (9), wherein the plurality of complex signal point sets have a same number of elements as each other or a difference of 1 in the number of elements between each other.

(11)

The transmission device according to any one of (6) to (10), wherein the plurality of complex signal point sets include complex signal points expressed by at least one of $2^m$ frequency shift keying (FSK), $2^m$ amplitude shift keying (ASK), $2^m$ phase shift keying (PSK), or $2^m$ quadrature amplitude modulation (QAM) as elements, where m is an integer equal to or greater than zero.

(12)

The transmission device according to any one of (6) to (11), wherein one complex signal point set among the plurality of complex signal point sets contains $2^m$ elements or $1+2^m$ elements, where m is an integer equal to or greater than zero.

(13)

The transmission device according to (12), wherein in a case where the complex signal point set contains $1+2^m$ elements, the complex signal point set includes zero (0+0j) as an element.

(14)

The transmission device according to any one of (6) to (12), wherein one complex signal point set among the plurality of complex signal point sets contains 1 element.

(15)

The transmission device according to (5), wherein the mapping pattern is a pattern indicating which spatial layers among the plurality of spatial layers that non-zero complex signal points are to be mapped to.

(16)

The transmission device according to (5), wherein the first bit sequence includes a bit indicating whether or not a spatial layer to which zero (0+0j) is mapped exists among the plurality of spatial layers.

(17)

The transmission device according to (16), wherein the first bit sequence includes a bit indicating that a spatial layer to which zero (0+0j) is mapped exists among the plurality of spatial layers.

(18)

The transmission device according to (16) or (17), wherein the first bit sequence includes a bit indicating whether or not a same complex signal point is mapped to a plurality of spatial layers, or whether or not a predetermined linear conversion is applied to the complex signal point.

(19)

A method, executed by a processor, comprising:

applying a precoding matrix on the basis of a first bit sequence to a complex signal point sequence converted from a second bit sequence, wherein the precoding matrix applied to the complex signal point sequence corresponds to the first bit sequence in a predetermined combination of a first bit sequence candidate and each element of a set of precoding matrices.

(20)

A method, executed by a processor, comprising:

performing a spatial layer mapping that maps a complex signal point sequence converted from a second bit sequence to at least one of a plurality of spatial layers on the basis of a first bit sequence, wherein a mapping pattern with respect to spatial layers corresponds to the first bit sequence in a plurality of predetermined combinations of a first bit sequence candidate and the mapping pattern.

(21)

A recording medium storing a program for causing a computer to function as:

a signal processing unit that applies a precoding matrix on the basis of a first bit sequence to a complex signal point sequence converted from a second bit sequence, wherein the precoding matrix applied to the complex signal point sequence corresponds to the first bit sequence in a predetermined combination of a first bit sequence candidate and each element of a set of precoding matrices.

(22)
A recording medium storing a program
for causing a computer to function as:
a signal processing unit that performs a spatial layer mapping that maps a complex signal point sequence converted from a second bit sequence to at least one of a plurality of spatial layers on the basis of a first bit sequence, wherein
a mapping pattern with respect to spatial layers corresponds to the first bit sequence in a plurality of predetermined combinations of a first bit sequence candidate and the mapping pattern.

REFERENCE SIGNS LIST

1 SYSTEM
2 BASE STATION
3 TERMINAL DEVICE
4 CELL
100 TRANSMISSION DEVICE
110 ANTENNA UNIT
120 WIRELESS COMMUNICATION UNIT
130 STORAGE UNIT
140 CONTROL UNIT
141 INFORMATION SHARING UNIT
143 TRANSMISSION SIGNAL PROCESSING UNIT
200 RECEPTION DEVICE
210 ANTENNA UNIT
220 WIRELESS COMMUNICATION UNIT
230 STORAGE UNIT
240 CONTROL UNIT
241 INFORMATION SHARING UNIT
243 RECEPTION SIGNAL PROCESSING UNIT

The invention claimed is:
1. A transmission device comprising:
a scrambling and interleaving circuit;
a constellation mapping circuit;
a precoding circuit that:
   receives a first bit sequence,
   based on the first bit sequence, selects a precoding matrix from a set of precoding matrices, and
   applies the selected precoding matrix to a complex signal point sequence to produce a precoded complex signal point sequence,
wherein the scrambling and interleaving circuit:
   receives an information bit sequence,
   scrambles and interleaves the information bit sequence to produce a second bit sequence different from the first bit sequence, and
   outputs the second bit sequence to the constellation mapping circuit,
wherein the constellation mapping circuit converts the second bit sequence to the complex signal point sequence, and outputs the complex signal point sequence to the precoding circuit,
wherein the precoding matrix applied to the complex signal point sequence corresponds to the first bit sequence according to a predetermined mapping of first bit sequence candidates and elements of the set of precoding matrices; and
a transceiver that transmits the precoded complex signal point sequence.
2. The transmission device according to claim 1, wherein elements at a specific position in a plurality of precoding matrices included in the set of precoding matrices are equal to each other.

3. The transmission device according to claim 1, wherein two different elements in the precoding matrix at least have a phase difference that is an integer multiple of a first value or an amplitude ratio that is an integer multiple or an integral submultiple of a second value.
4. The transmission device according to claim 1, wherein
   the set of precoding matrices is defined for each combination of a number of antennas and a number of spatial layers, and
   a precoding matrix of the set of precoding matrices with fewer elements is a subset of a precoding matrix of the set of precoding matrices with more elements.
5. A transmission device comprising: a scrambling and interleaving circuit; a constellation mapping circuit; a precoding circuit that; based on a first bit sequence, selects a spatial layer from a plurality of spatial layers, and applies the selected spatial layer to a complex signal point sequence to produce spatially modulated data, wherein the scrambling and interleaving circuit; receives an information bit sequence, scrambles and interleaves the information bit sequence to produce a second bit sequence different from the first bit sequence, and outputs the second bit sequence to the constellation mapping circuit, wherein the constellation mapping circuit converts the second bit sequence to the complex signal point sequence, and outputs the complex signal point sequence to the preceding circuit, wherein the spatial layer applied to the complex signal point sequence corresponds to the first bit sequence according to a predetermined mapping of first bit sequence candidates and elements of the plurality of spatial layers; and a transmitter that transmits the spatially modulated data.
6. The transmission device according to claim 5, wherein the predetermined mapping is a mapping indicating which complex signal point set, from among a plurality of complex signal point sets, contains, as elements, at least one complex signal point mapped to each of two or more spatial layers among the plurality of spatial layers.
7. The transmission device according to claim 6, wherein the constellation mapping circuit:
   converts the second bit sequence into a temporary complex signal point sequence based on a predetermined complex signal point set, and
   generates the complex signal point sequence by applying arithmetic processing based on the first bit sequence to each of the plurality of complex signal points included in the temporary complex signal point sequence.
8. The transmission device according to claim 6, wherein each of the plurality of complex signal point sets exist in a linear relationship with another of the plurality of complex signal point sets.
9. The transmission device according to claim 6, wherein each of the plurality of complex signal point sets has a same number of elements as another of the plurality of complex signal point sets or has a difference of 1 in the number of elements between each other.
10. The transmission device according to claim 6, wherein each of the plurality of complex signal point sets includes complex signal points expressed by at least one of $2^m$ frequency shift keying (FSK), $2^m$ amplitude shift keying (ASK), $2^m$ phase shift keying (PSK), or $2^m$ quadrature amplitude modulation (QAM) as elements, where m is an integer equal to or greater than zero.
11. The transmission device according to claim 6, wherein one complex signal point set among the plurality of complex signal point sets contains $2^m$ elements or $1+2^m$ elements, where m is the integer equal to or greater than zero.

12. The transmission device according to claim 11, wherein in a case where the complex signal point set contains 1+2^m elements, the complex signal point set includes zero (0+0j) as an element.

13. The transmission device according to claim 6, wherein one complex signal point set among the plurality of complex signal point sets contains 1 element.

14. The transmission device according to claim 5, wherein the predetermined mapping is a mapping indicating which spatial layers, among the plurality of spatial layers, have non-zero complex signal points.

15. The transmission device according to claim 5, wherein the first bit sequence includes a bit indicating whether or not a spatial layer to which zero (0+0j) is mapped exists among the plurality of spatial layers.

16. The transmission device according to claim 15, wherein the first bit sequence includes a bit indicating that a spatial layer to which zero (0+0j) is mapped exists among the plurality of spatial layers.

17. The transmission device according to claim 15, wherein the first bit sequence includes a bit indicating whether or not a same complex signal point is mapped to a plurality of spatial layers, or whether or not a predetermined linear conversion is applied to the complex signal point.

18. A method, executed by a processor, comprising:
receiving an information bit sequence;
scrambling and interleaving the information bit sequence in order to generate a second bit sequence,
converting the second bit sequence to a complex signal point sequence;
receiving a first hit sequence different from the second bit sequence;
based on the first bit sequence, selecting a precoding matrix from a set of precoding matrices;
applying the selected precoding matrix to the complex signal point sequence to produce a precoded complex signal point sequence,
wherein the precoding matrix applied to the complex signal point sequence corresponds to the first bit sequence according to a predetermined mapping of first bit sequence candidates and elements of the set of precoding matrices; and
transmitting the precoded complex signal point sequence.

19. A method, executed by a processor, comprising:
receiving an information bit sequence;
scrambling and interleaving the information bit sequence in order to generate a second bit sequence,
converting the second bit sequence to a complex signal point sequence;
receiving a first bit sequence different from the second bit sequence;
based on the first bit sequence, selecting a spatial layer from a plurality of spatial layers;
applying the spatial layer to a complex signal point sequence to produce spatially modulated data,
wherein the spatial layer applied to the complex signal point sequence corresponds to the first bit sequence according to a predetermined mapping of first bit sequence candidates and elements of the plurality of spatial layers; and
transmitting the spatially modulated data.

20. A non-transitory computer readable produce storing a program for causing a computer to perform a method, the method comprising:
receiving an information hit sequence;
scrambling and interleaving the information bit sequence in order to generate a second bit sequence,
converting the second bit sequence to a complex signal point sequence,
receiving a first bit sequence different from the second bit sequence;
based on the first bit sequence, selecting a precoding matrix from a set of precoding matrices;
applying the selected precoding matrix to the complex signal point sequence to produce a precoded complex signal point sequence,
wherein the precoding matrix applied to the complex signal point sequence corresponds to the first bit sequence according to a predetermined mapping of first bit sequence candidates and elements of the set of precoding matrices; and
transmitting the precoded complex signal point sequence.

21. A non-transitory computer readable produce storing a program for causing a computer to perform a method, the method comprising:
receiving an information bit sequence;
scrambling and interleaving the information bit sequence in order to generate a second bit sequence,
converting the second bit sequence to a complex signal point sequence;
receiving a first bit sequence different from the second bit sequence;
based on the first bit sequence, selecting a spatial layer from a plurality of spatial layers;
applying the spatial layer to a complex signal point sequence to produce spatially modulated data,
wherein the spatial layer applied to the complex signal point sequence corresponds to the first bit sequence according to a predetermined mapping of first bit sequence candidates and elements of the plurality of spatial layers; and
transmitting the spatially modulated data.

* * * * *